US008188709B2

(12) United States Patent
Onishi et al.

(10) Patent No.: US 8,188,709 B2
(45) Date of Patent: May 29, 2012

(54) POWER TRANSMISSION CONTROL DEVICE, POWER TRANSMITTING DEVICE, NON-CONTACT POWER TRANSMITTING SYSTEM, AND ELECTRONIC INSTRUMENT

(75) Inventors: Kota Onishi, Nagoya (JP); Masayuki Kamiyama, Nagoya (JP); Nobutaka Shiozaki, Nagoya (JP); Takahiro Kamijo, Fujimi-cho (JP); Minoru Hasegawa, Suwa (JP); Haruhiko Sogabe, Chino (JP)

(73) Assignee: Seiko Epson Corporation, Tokyo (JP)

( * ) Notice: Subject to any disclaimer, the term of this patent is extended or adjusted under 35 U.S.C. 154(b) by 690 days.

(21) Appl. No.: 12/350,511

(22) Filed: Jan. 8, 2009

(65) Prior Publication Data
US 2009/0174364 A1    Jul. 9, 2009

(30) Foreign Application Priority Data

Jan. 9, 2008  (JP) ................. 2008-002321
Nov. 10, 2008  (JP) ................. 2008-287487

(51) Int. Cl.
*H02J 7/00*   (2006.01)
*H04M 11/00*  (2006.01)
*H04B 11/00*  (2006.01)
*H01F 27/42*  (2006.01)

(52) U.S. Cl. ........ 320/108; 320/107; 320/109; 320/114; 320/115; 320/139; 455/69; 455/411; 307/104

(58) Field of Classification Search ............... 320/108
See application file for complete search history.

(56) References Cited

U.S. PATENT DOCUMENTS

| 5,551,066 A | * | 8/1996 | Stillman et al. ............. 455/69 |
| 5,581,451 A | * | 12/1996 | Ochiai ................. 363/21.16 |
| 5,600,225 A | * | 2/1997 | Goto ..................... 320/108 |
| 6,016,046 A | * | 1/2000 | Kaite et al. ............... 320/108 |

(Continued)

FOREIGN PATENT DOCUMENTS

| JP | A-2006-60909 | 3/2006 |
| WO | WO 2004/073166 A2 | 8/2004 |

OTHER PUBLICATIONS

U.S. Appl. No. 12/350,495, filed Jan. 8, 2009 in the name of Kota Onishi et al.

(Continued)

*Primary Examiner* — Yalkew Fantu
(74) *Attorney, Agent, or Firm* — Oliff & Berridge, PLC

(57) ABSTRACT

A power transmission control device used for a non-contact power transmission system includes an operation mode switching terminal that receives an operation mode switch control signal that switches a mode between an automatic mode and a switch mode, a power transmitting device starting normal power transmission in the automatic mode after installation of a power-receiving-side instrument that includes a power receiving device in an area in which power transmitted via non-contact power transmission can be received has been automatically detected, the normal power transmission supplying power to a load of the power-receiving-side instrument, and the power transmitting device starting the normal power transmission in the switch mode after an operation trigger switch has been turned ON, an operation trigger terminal that receives an operation trigger signal that occurs due to an operation of the operation trigger switch, and a power-transmitting-side control circuit that controls power transmission to the power receiving device and changes an operation mode of the power transmitting device based on the operation mode switch control signal.

17 Claims, 30 Drawing Sheets

U.S. PATENT DOCUMENTS

| | | | |
|---|---|---|---|
| 6,118,249 | A | 9/2000 | Brockmann et al. |
| 6,370,043 | B1 * | 4/2002 | Yasumura .................. 363/21.02 |
| 6,697,272 | B2 * | 2/2004 | Nanbu et al. .................... 363/97 |
| 6,917,182 | B2 * | 7/2005 | Burton et al. ................. 320/108 |
| 7,109,682 | B2 * | 9/2006 | Takagi et al. ................. 320/108 |
| 2007/0139000 | A1 | 6/2007 | Kozuma et al. |
| 2009/0001932 | A1 | 1/2009 | Kamijo et al. |
| 2009/0174264 | A1 * | 7/2009 | Onishi et al. ................. 307/104 |

OTHER PUBLICATIONS

U.S. Appl. No. 12/163,136, filed Jun. 27, 2008 in the name of Takahiro Kamijo et al.

European Search Report issued in European Application No. 09000208.0 mailed Nov. 28, 2011.

* cited by examiner

FIG. 23A
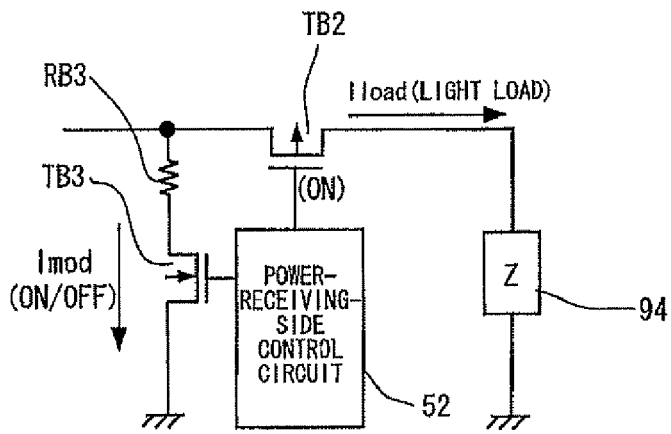
FIG. 23B
FIG. 23C
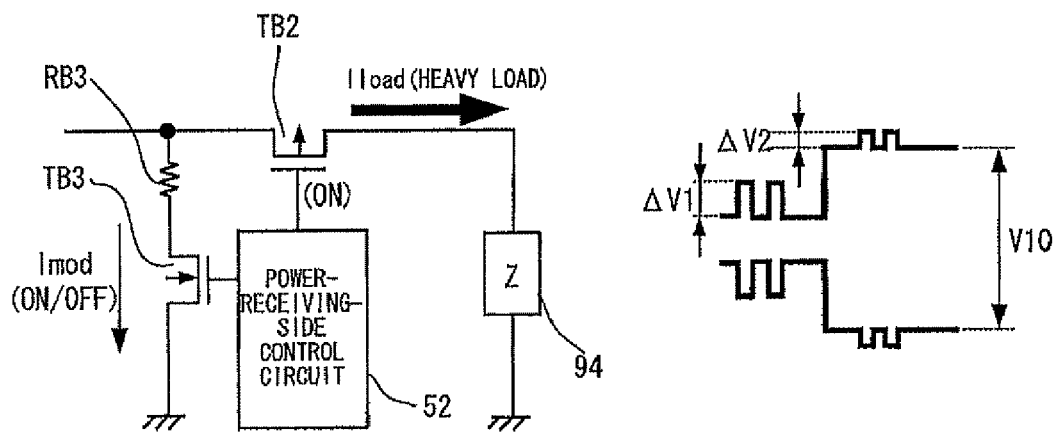
FIG. 23D
FIG. 23E
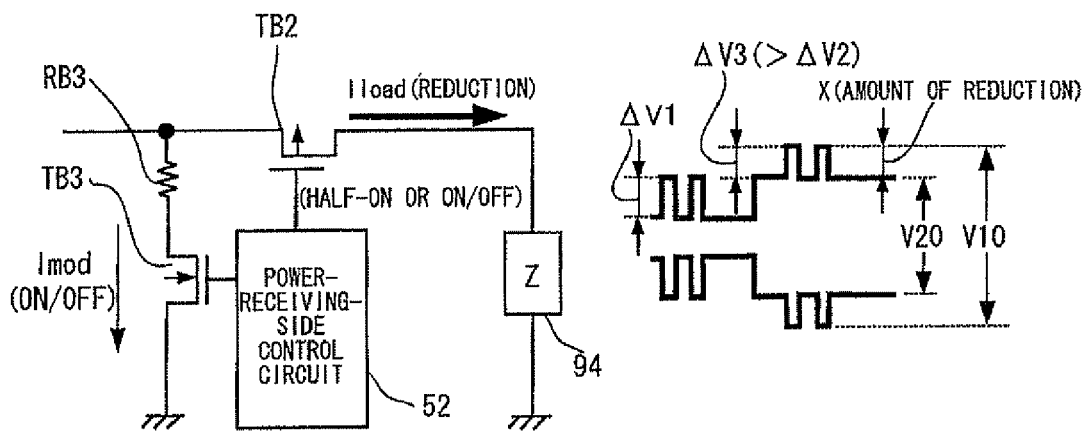

f0: RESONANCE FREQUENCY WHEN LOAD IS CONNECTED
f1: FREQUENCY WHEN TRANSMITTING "1"
f2: FREQUENCY WHEN TRANSMITTING "0"
f3: FREQUENCY DURING POWER-SAVING MODE

POWER TRANSMISSION CONTROL DEVICE, POWER TRANSMITTING DEVICE, NON-CONTACT POWER TRANSMITTING SYSTEM, AND ELECTRONIC INSTRUMENT

Japanese Patent Application No. 2008-002321 filed on Jan. 9, 2008 and Japanese Patent Application No. 2008-287487 filed on Nov. 10, 2008, are hereby incorporated by reference in their entirety.

BACKGROUND

The present invention relates to a power transmission control device, a power transmitting device, a non-contact power transmission system, an electronic instrument, and the like.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., cordless telephone handset or watch), and the like have been proposed.

JP-A-2006-60909 discloses a non-contact power transmission device using a primary coil and a secondary coil, for example.

A non-contact power transmitting device is strongly desired to consume only a small amount of power in order to increase the life of a battery of an electronic instrument, for example. Therefore, it is important to suppress unnecessary power transmission from a power-transmitting-side instrument to a power-receiving-side instrument as much as possible.

A non-contact power transmitting device is desired to achieve a high degree of safety and reliability. For example, when power is transmitted to a non-standard power-receiving-side instrument, the instrument may break down.

Even when power is transmitted to a power-receiving-side instrument that conforms to a specific standard, power transmission must be stopped when the power transmission environment is inappropriate. For example, when power is transmitted in a state in which a metal foreign object is present, abnormal heat generation may occur. In this case, power transmission must be stopped. A metal foreign object may be small or medium-sized, or may be large (e.g., a thin sheet that is present over the entire area between a power-transmitting-side instrument and a power-receiving-side instrument). Therefore, it is desirable to take appropriate safety measures irrespective of the size or type of foreign object.

A non-contact power transmitting device is also desired to improve convenience to the user. Moreover, it is important to reduce the size and the cost of a non-contact power transmitting device by reducing the number of parts.

It is also important to provide a convenience and flexible non-contact power transmission system in order to satisfy the needs of customers who utilize a non-contact power transmission system. Customers have various needs.

For example, some customers desire a system that allows the user to control the operation/non-operation of the system subjectively by causing an operation switch to be turned ON/OFF (i.e., a system having a switch mode), and other customers desire an automatic system (i.e., a system having an automatic mode) since operating a switch is troublesome. Customers may desire to appropriately select the switch mode or the automatic mode corresponding to the system installation environment, for example. It is important to appropriately deal with various needs of customers in order to ensure widespread use of the non-contact power transmission system.

SUMMARY

According to one aspect of the invention, there is provided a power transmission control device provided in a power transmitting device of a non-contact power transmission system, the non-contact power transmission system performing non-contact power transmission from the power transmitting device to a power receiving device via a primary coil and a secondary coil that are electromagnetically coupled, the power transmission control device comprising:

an operation mode switch terminal that receives an operation mode switch control signal, the operation mode switch control signal switching an automatic mode to a switch mode, the power transmitting device starting normal power transmission in the automatic mode after installation of a power-receiving-side instrument that includes the power receiving device, in an area in which power transmitted via non-contact power transmission can be received, has been automatically detected, the power transmitting device supplying power to a load of the power-receiving-side instrument at the normal power transmission, and the power transmitting device starting the normal power transmission in the switch mode after an operation trigger switch has been turned ON;

an operation trigger terminal that receives an operation trigger signal, the operation trigger signal occurring due to an operation of the operation trigger switch; and a power-transmitting-side control circuit that controls power transmission to the power receiving device and changes an operation mode of the power transmitting device based on the operation mode switch control signal.

According another aspect of the invention, there is provided a power transmission control device provided in a power transmitting device that transmits power to a power receiving device, the power transmission control device comprising:

a first terminal that receives a first signal;

a second terminal that receives a second signal; and a power-transmitting-side control circuit that controls the power transmitting device, the power-transmission-side control circuit causing the power transmitting device to operate in a first operation mode or a second operation mode based on the first signal, the power transmitting device set in the first operation mode performing power transmission that supplies power to a load electrically connected to the power receiving device after installation of the power receiving device in a power reception area has been automatically detected, and the power transmitting device set in the second operation mode performing the power transmission after the second signal has been input to the second terminal.

According to another aspect of the invention, there is provided a power transmitting device comprising:

one of the above power transmission control devices; and a power transmitting section that generates an alternating-current voltage and supplies the alternating-current voltage to the primary coil.

According to another aspect of the invention, there is provided an electronic instrument comprising:

the above power transmitting device;

an operation mode switch that generates the operation mode switch control signal; and the operation trigger switch.

According to another aspect of the invention, there is provided a non-contact power transmission system performing non-contact power transmission, the system comprising:

a power transmitting device; and
a power receiving device,
the power transmitting device including a power-transmitting-side control device that controls power transmission to the power receiving device based on an induced voltage in a primary coil, the primary coil being electromagnetically coupled to a secondary coil,
the power-transmitting-side control device including:
an operation mode switch terminal that receives an operation mode switch control signal, the operation mode switch control signal switching an automatic mode to a switch mode, the power transmitting device set in the automatic mode automatically detecting installation of a power-receiving-side instrument that includes the power receiving device, performing an ID authentication process, and starting normal power transmission, and the power transmitting device set in the switch mode starting power transmission when an operation trigger switch has been turned ON, performing the ID authentication process, and starting the normal power transmission;
an operation trigger terminal that receives an operation trigger signal, the operation trigger signal occurring due to an operation of the operation trigger switch; and
a power-transmitting-side control circuit that controls power transmission to the power receiving device and changes an operation mode of the power transmitting device based on the operation mode switch control signal,
the power receiving device including a power supply control section that controls power supply to a load, and a power reception control device that controls the power receiving device,
the power-transmitting-side control circuit of the power transmitting device causing the power transmitting device to perform intermittent temporary power transmission when the automatic mode has been selected based on the operation mode switch control signal, and detecting installation of a power-receiving-side instrument that includes the power receiving device depending on whether or not ID authentication information has been received from the power receiving device that has received the intermittent temporary power transmission within a given period of time from a start time of the intermittent temporary power transmission, causing the power transmitting device to perform the normal power transmission to the power receiving device when the installation of the power-receiving-side instrument has been detected on condition that the ID authentication process has been completed successfully, causing the power transmitting device to perform the intermittent temporary power transmission when the ID authentication information has not been received from the power receiving device within the given period of time from the start time of the intermittent temporary power transmission or the ID authentication process has not been completed successfully; and
the power-transmitting-side control circuit causing the power transmitting device to perform the intermittent temporary power transmission that enables the ID authentication process to the power receiving device when a switch provided in a power-transmitting-side instrument has been turned ON when the switch mode has been selected based on the operation mode switch control signal, performing the ID authentication process based on the ID authentication information when the ID authentication information has been received from the power receiving device that has received the intermittent temporary power transmission within a given period of time from a start time of the intermittent temporary power transmission, causing the power transmitting device to perform the normal power transmission to the power receiving device after the ID authentication process has been completed successfully, and causing the power transmitting device to return to an initial state when the ID authentication information has not been received from the power receiving device within the given period of time from the start time of the intermittent temporary power transmission or the ID authentication process has not been completed successfully, the power transmitting device waiting for the switch to be turned ON in the initial state without performing the intermittent temporary power transmission.

BRIEF DESCRIPTION OF THE DRAWINGS

FIGS. 23A to 23E are views illustrative of a load reduction operation.

DESCRIPTION OF EXEMPLARY EMBODIMENTS

Figure 1A:
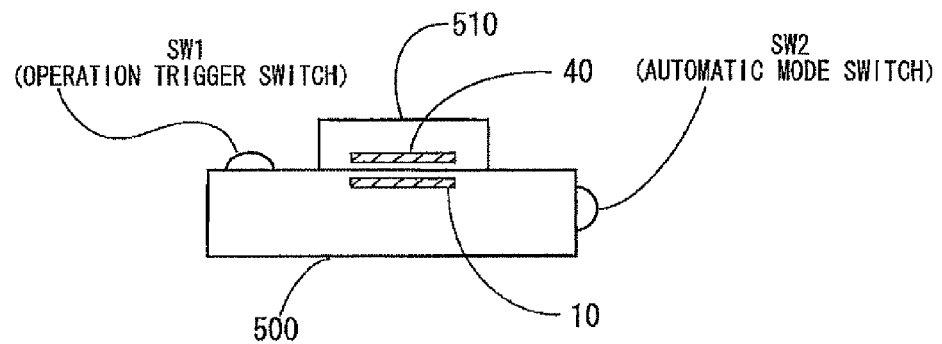
FIG. 1A to 1C are views showing an outline of a configuration example of a non-contact power transmission system that allows switching between a switch mode and an automatic mode.

Several embodiments of the invention may provide non-contact power transmission technology that allows a mode to be appropriately switched between an automatic mode and a switch mode corresponding to the needs of customer so that convenience to the user can be improved and power consumption can be reduced, for example. Several embodiments of the invention may provide highly reliable non-contact power transmission technology provided with appropriate safety measures, for example.

(1) According to one embodiment of the invention, there is provided a power transmission control device provided in a power transmitting device of a non-contact power transmission system, the non-contact power transmission system performing non-contact power transmission from the power transmitting device to a power receiving device via a primary coil and a secondary coil that are electromagnetically coupled, the power transmission control device comprising:

an operation mode switch terminal that receives an operation mode switch control signal, the operation mode switch control signal switching an automatic mode to a switch mode, the power transmitting device starting normal power transmission in the automatic mode after installation of a power-receiving-side instrument that includes the power receiving device in an area in which power transmitted via non-contact power transmission can be received has been automatically detected, the power transmitting device supplying power to a load of the power-receiving-side instrument at the normal power transmission, and the power transmitting device starting the normal power transmission in the switch mode after an operation trigger switch has been turned ON;

an operation trigger terminal that receives an operation trigger signal, the operation trigger signal occurring due to an operation of the operation trigger switch; and a power-transmitting-side control circuit that controls power transmission to the power receiving device and changes an operation mode of the power transmitting device based on the operation mode switch control signal.

The power transmission control device according to this embodiment allows switching between the switch mode (i.e., a mode in which a given operation starts when the operation trigger switch has been turned ON) an the automatic mode (i.e., a mode in which installation of the power-transmitting-side instrument is automatically detected to start a given operation) by supplying the operation mode switch signal to the power-transmitting-side control circuit.

In the switch mode, the user places the power-receiving-side instrument at a given position, and presses (turns ON) the operation trigger switch at an appropriate timing to start power transmission. The user can compulsorily stop power transmission by operating the operation trigger switch to input the operation trigger signal to the power-transmitting-side control circuit. In the switch mode, the user can utilize the non-contact power transmission system set in the switch mode as the user wishes. Since the power transmitting device does not perform power transmission before the operation trigger switch is turned ON, unnecessary power consumption can be prevented.

In the automatic mode, since the power transmission control device automatically detects installation of the power-receiving-side instrument and starts normal power transmission, the user need not operate a switch or the like. Therefore, the convenience of the non-contact power transmission system is improved. A non-contact power transmission system that can flexibly deal with various needs is implemented by enabling switching between the operation modes.

(2) In the power transmission control device, the power-transmitting-side control circuit may cause the power transmitting device to perform intermittent temporary power transmission when the automatic mode has been selected based on the operation mode switch control signal, may detect a response from the power receiving device that has received the intermittent temporary power transmission to detect the installation of the power-receiving-side instrument, may cause the power transmitting device to continuously perform the normal power transmission when the installation of the power-receiving-side instrument has been detected, and may cause the power transmitting device to continuously perform the intermittent temporary power transmission when the installation of the power-receiving-side instrument has not been detected; and the power-transmitting-side control circuit may cause the power transmitting device to repeatedly start and stop power transmission to the power receiving device each time the operation trigger signal is input to the operation trigger terminal when the switch mode has been selected based on the operation mode switch control signal.

According to this embodiment, the power-transmitting-side control circuit causes the power transmitting device to perform intermittent temporary power transmission, and automatically detects installation of the power-receiving-side instrument by detecting a response from the power receiving device. Intermittent temporary power transmission is performed until installation of the power-receiving-side instrument is detected. When the switch mode has been selected, power transmission (temporary power transmission) to the power receiving device starts when the user has pressed (turns ON) the operation trigger switch. When the user has again operated the operation trigger switch, power transmission (including temporary power transmission and normal power transmission) is compulsorily stopped. The above-described operation is repeated each time the operation trigger switch is turned ON.

(3) In the power transmission control device, the power-transmitting-side control circuit may perform an ID authentication process before the normal power transmission regardless of whether the automatic mode or the switch mode has been selected to determine whether or not the power-receiving-side instrument has adaptability to the non-contact power transmission system, and may cause the power transmitting device to perform the normal power transmission when the ID authentication process has been completed successfully.

Since the ID authentication process based on the ID authentication information (e.g., a manufacturer number, an instrument ID number, and power rating information) transmitted from the power receiving device is performed before normal power transmission, a situation in which power is transmitted to an inappropriate target is reliably prevented so that reliability and safety are significantly improved.

(4) In the non-contact power transmission system, the power-transmitting-side control circuit may cause the power transmitting device to perform the intermittent temporary power transmission when the automatic mode has been selected based on the operation mode switch control signal, may detect the installation of the power-receiving-side instrument depending on whether or not ID authentication information has been received from the power receiving device within a given period of time from a start time of the intermittently temporary power transmission, may cause the power transmitting device to perform the normal power transmission to the power receiving device when the installation of the power-receiving-side instrument has been detected on condition that the ID authentication process has been completed successfully, and may cause the power transmitting device to continuously perform the intermittent temporary power transmission when the ID authentication information has not been received from the power receiving device within the given period of time from the start time of the temporary power transmission or the ID authentication process has not been completed successfully.

In the automatic mode, the power-transmitting-side control circuit intermittently performs temporary power transmission, and detects installation of the power-receiving-side instrument depending on whether or not the ID authentication information has been received from the power receiving device within a given period of time from the start time of temporary power transmission. Specifically, when the power-receiving-side instrument has been installed, the ID authentication information is transmitted from the power-receiving-side instrument within a given period of time when performing temporary power transmission. Therefore, installation of the power-receiving-side instrument can be detected by determining whether or not the ID authentication information has been transmitted from the power-receiving-side instrument within a given period of time. The term "temporary power transmission in the automatic mode" refers to power transmission (e.g., intermittent power transmission) performed before normal power transmission (i.e., power transmission that supplies power to the load) to the power receiving device.

(5) In the power transmission control device, the power-transmitting-side control circuit may cause the power transmitting device to stop the normal power transmission and perform power transmission for removal detection after full-charging and power transmission for recharge necessity determination after full-charging when the power-transmitting-side control circuit has detected a full-charge notification from the power receiving device during the normal power transmission, may cause the power transmitting device to perform the intermittent temporary power transmission when removal of the power receiving device has been detected based on a signal transmitted from the power receiving device that has received the power transmission for removal detection after fall-charging, and may cause the power transmitting device to resume the normal power transmission when the power-transmitting-side control circuit has determined that recharging is necessary based on a signal transmitted from the power receiving device that has received the power transmission for recharge necessity determination after full-charging.

According to this embodiment, the power-transmitting-side control circuit monitors the load state in the automatic mode after the load of the power-receiving-side instrument has been fully charged to automatically manage recharging. Specifically, when the power-receiving-side instrument remains after full-charging, the load (battery) is discharged with the passage of time so that recharging may be required. Therefore, the power transmitting device performs power transmission other than normal power transmission (may be intermittent power transmission or weak continuous power transmission at a different frequency) after a full-charge state has been detected to automatically determine whether or not the load must be recharged, and resumes normal power transmission when recharging is necessary. This enables the load to be automatically recharged. Accordingly, even if the power-receiving-side instrument is allowed to stand for a long time after fall-charging, the battery has been necessarily fully charged when the user uses the power-receiving-side instrument. This prevents a situation in which the battery becomes charged insufficiently due to discharge. Therefore, convenience to the user can be improved.

Note that it is unnecessary to manage recharging when the power-receiving-side instrument has been removed after full-charging. Therefore, power transmission (may be intermittent power transmission or weak continuous power transmission at a different frequency) for removal detection after full-charging is also performed. It may be determined that the power-receiving-side instrument has been removed when no response is transmitted from the power-receiving-side instrument after intermittent power transmission for removal detection has been performed. When removal of the power-receiving-side instrument has been detected, the power-transmitting-side control circuit causes the power transmitting device to return to the initial state.

The term "full charge" used herein may be broadly interpreted as "a state in which the load of the power receiving device is in a given state", for example. Therefore, the term "load" is not limited to a battery. For example, a given circuit of the power-receiving-side instrument may serve as a load. For example, a state in which a given circuit that has operated by receiving power from the power transmitting device need not operate corresponds to a state in which the load has been fully charged. Such a case is also included in the technical scope of the aspect of the invention.

(6) In the power transmission control device, the power-transmitting-side control circuit may cause the power transmitting device to perform the intermittent temporary power transmission that enables the ID authentication process to the power receiving device when the operation trigger switch provided in a power-transmitting-side instrument has been turned ON when the switch mode has been selected based on the operation mode switch control signal, may perform the ID authentication process based on ID authentication information when the ID authentication information has been received from the power receiving device that has received the intermittent temporary power transmission within a given period of time from a start time of the intermittent temporary power transmission, may cause the power transmitting device to perform the normal power transmission to the power receiving device when the ID authentication process has been completed successfully, and may cause the power transmitting device to stop the temporary power transmission and return to an initial state when the ID authentication information has not been received from the power receiving device within the given period of time from the start time of the temporary power transmission or the ID authentication process has not been completed successfully, the power transmitting device waiting for the operation trigger switch to be turned ON in the initial state without performing the intermittent temporary power transmission.

In the switch mode, temporary power transmission from the power-transmitting-side instrument to the power-receiving-side instrument starts when the operation trigger switch provided in the power-transmitting-side instrument has been turned ON (triggered by the switch). Note that temporary power transmission in the switch mode refers to power transmission (e.g., continuous power transmission) before normal power transmission for enabling ID authentication.

The user may presses the operation trigger switch after placing the power-receiving-side instrument, or placing the power-receiving-side instrument after pressing the operation trigger switch, for example. In either case, since power transmission (including temporary power transmission) starts when the user has pressed the operation trigger switch (i.e., the user has indicated his intention to start charging), a situation in which power transmission starts by surprise is prevented so that the user feels more reassured.

When the power-receiving-side instrument has been placed, the operation trigger switch may be turned ON due to the weight of the power-receiving-side instrument. In this case, the user need not press the switch. According to this configuration, power need not be transmitted before the operation trigger switch is turned ON (i.e., it is unnecessary to perform intermittent temporary power transmission for detecting installation of the power-receiving-side instrument). A reduction in power consumption and an increase in safety can be achieved by omitting unnecessary power transmission.

(7) In the power transmission control device,
the power-transmitting-side control circuit may cause the power transmitting device to stop the normal power transmission and return to the initial state when a full-charge notification has been received from the power receiving device after the normal power transmission has started.

Since normal power transmission is stopped based on the full-charge notification (power transmission stop request in a broad sense) from the power-receiving-side instrument, unnecessary power transmission does not occur so that heat generation is prevented. This further improves safety while further reducing power consumption.

(8) In the power transmission control device,
the power-transmitting-side control circuit may determine the presence or absence of a foreign object based on a change of waveform of an induced voltage signal of the primary coil, and may cause the power transmission device to stop the normal power transmission when a foreign object has been detected during the normal power transmission.

(9) In the power transmission control device,
the power-transmitting-side control circuit may detect the presence or absence of a takeover state, the takeover state being a state that the power transmission device continuously performing the normal power transmission while erroneously recognizing a foreign object placed between the primary coil and the secondary coil as the power-receiving-side instrument, and may cause the power transmitting device to stop the normal power transmission when the takeover state has been detected during the normal power transmission.

The takeover state is detected during normal power transmission to further improve safety and the reliability of the non-contact power transmission system. The takeover state is considered to be a special form of foreign object insertion. The takeover state refers to a state in which the power-transmitting-side instrument continuously performs normal power transmission while erroneously regarding a foreign object as the power-receiving-side instrument.

For example, when a thin metal sheet has been inserted between the primary coil and the secondary coil to block the primary coil and the secondary coil, since a considerable load is always present with respect to the power-transmitting-side instrument, it is difficult to detect removal of the power-receiving-side instrument, for example. Specifically, since the power transmitting device detects a load corresponding to the power-receiving-side instrument after the power-receiving-side instrument has been removed, the power transmitting device cannot detect removal of the power-receiving-side instrument and cannot stop normal power transmission. In this case, the temperature of the metal sheet may increase to a large extent, whereby abnormal heat generation, ignition, instrument breakdown, a skin burn, or the like may occur.

Therefore, a takeover detection function is provided in addition to the foreign object detection function and the removal detection function, and normal power transmission is promptly stopped when the takeover state has been detected. This further improves the safety and the reliability of the non-contact power transmission system.

(10) In the power transmission control device,
the power-transmitting-side control circuit may detect an intermittent change in a power-receiving-side load, and may detect the presence or absence of the takeover state based on the presence or absence of an intermittent change in the power-receiving-side load during the normal power transmission.

When the takeover state has occurred, signal transmission from the power-receiving-side instrument to the power-transmitting-side instrument is blocked by the foreign object so that the signal cannot reach the power-transmitting-side instrument. Whether or not the takeover state has occurred is detected by transmitting a signal from the power-receiving-side instrument to the power-transmitting-side instrument and determining whether or not the power-transmitting-side instrument can detect the signal utilizing this principle.

For example, the power receiving device transmits a signal (physical signal) to the power transmitting device by means of load modulation through the secondary coil and the primary coil, and whether or not the takeover state has occurred is detected by determining whether or not the power transmitting device can detect the signal (physical signal). Note that the takeover state detection method is not limited thereto. For example, a light-emitting means may be provided in the power receiving device, and a light-receiving means may be provided in the power transmitting device. Whether or not the takeover state has occurred may be detected by determining whether or not the power transmitting device can detect light (including infrared light) emitted from the power receiving device. Alternatively, whether or not external light (ambient light) reaches the power transmitting device without being blocked by a foreign object may be detected. Whether or not the takeover state has occurred may be detected by determining whether or not the power transmitting device can detect sound from the power receiving device at a predetermined level instead of utilizing an electrical signal or light.

(11) According to another embodiment of the invention, there is provided a power transmission control device provided in a power transmitting device that transmits power to a power receiving device, the power transmission control device comprising:

a first terminal that receives a first signal;
a second terminal that receives a second signal; and
a power-transmitting-side control circuit that controls the power transmitting device, the power-transmission-side control circuit causing the power transmitting device to operate in a first operation mode or a second operation mode based on the first signal, the power transmitting device set in the first operation mode performing power transmission that supplies power to a load electrically connected to the power receiving device after installation of the power receiving device in a power reception area has been automatically detected, and the power transmitting device set in the second operation mode performing the power transmission after the second signal has been input to the second terminal.

In the power transmission control device according to this embodiment, the first terminal that receives the first signal and the second terminal that receives the second signal are provided. The first operation mode and the second operation mode are provided as the operation mode. The first operation mode or the second operation mode is selected based on the first signal input to the first terminal. Since the operation mode can be changed, a convenient power transmission system that can flexibly deal with various needs is implemented.

In the first operation mode, the power transmitting device performs power transmission that supplies power to the load electrically connected to the power receiving device after installation of the power receiving device in a power reception area has been automatically detected. In the second mode, the power transmitting device transmits power after the second signal has been input to the second terminal.

In the first operation mode, power transmission automatically starts upon detection that the power receiving device has been placed at the power reception position. Therefore, the convenience of the power transmission system is improved. In the second operation mode, the power transmission timing can be arbitrarily controlled by controlling the input timing of the second signal to the second terminal. Since the power transmitting device does not perform power transmission before the second signal is input to the second terminal, unnecessary power consumption does not occur.

(12) According to another embodiment of the invention, there is provided a power transmitting device comprising:

one of the above power transmission control devices; and
a power transmitting section that generates an alternating-current voltage and supplies the alternating-current voltage to the primary coil.

This implements a novel power transmitting device that allows the mode to be switched between the automatic mode and the switch mode.

(13) According to another embodiment of the invention, there is provided an electronic instrument comprising:

the above power transmitting device;
an operation mode switch that generates the operation mode switch control signal; and
the operation trigger switch.

For example, the user can appropriately switch the mode between the automatic mode and the switch mode by providing the operation mode switch, the operation trigger switch, and the power transmitting device in a charger (cradle) (i.e., power-transmitting-side instrument).

(14) In the electronic instrument,
the operation mode switch may be provided in an area in which a user can operate the operation mode switch.

Therefore, the user can arbitrarily select the switch mode or the automatic mode by directly operating the operation mode switch. This improves the convenience of the non-contact power transmission system.

(15) In the electronic instrument,
the operation mode switch may be provided in an area in which a user cannot operate the operation mode switch.

According to this embodiment, the user cannot directly operate the operation mode switch. According to this embodiment, the manufacturer determines whether or not to select the automatic mode before shipping the power-transmitting-side instrument for example. This embodiment is suitable when unspecified users utilize the non-contact power transmission system, for example. Specifically, when unspecified users utilize the non-contact power transmission system, the user may be confused if each user selects the automatic mode or the switch mode. Therefore, it is desirable that the manufacturer determine the automatic mode or the switch mode before shipment to prevent confusion and allow the user to easily understand the system.

(16) The electronic instrument may further comprise,
a plurality of operation mode switches.

It is possible to deal with the needs of various users by increasing the number of types of automatic modes. In the first automatic mode, the power transmitting device automatically performs a series of operations including detection of installation of the power-receiving-side instrument, temporary power transmission, ID authentication, normal power transmission, removal detection, foreign object detection, full-charge detection, and suspension of normal power transmission. In the second automatic mode, the power transmitting device can also automatically perform recharge management after full-charging.

(17) According to another embodiment of the invention, there is provided a non-contact power transmission system performing non-contact power transmission, the system comprising a power transmitting device and a power receiving device, the power transmitting device including a power-transmitting-side control device that controls power transmission to the power receiving device based on an induced voltage in a primary coil, the primary coil being electromagnetically coupled to a secondary coil, the power-transmitting-side control device including:
an operation mode switch terminal that receives an operation mode switch control signal, the operation mode switch control signal switching an automatic mode to a switch mode, the power transmitting device set in the automatic mode automatically detecting installation of a power-receiving-side instrument that includes the power receiving device, performing an ID authentication process, and starting normal power transmission, and the power transmitting device set in the switch mode starting power transmission when an operation trigger switch has been turned ON, performing the ID authentication process, and starting the normal power transmission;

an operation trigger terminal that receives an operation trigger signal, the operation trigger signal occurring due to an operation of the operation trigger switch; and a power-transmitting-side control circuit that controls power transmission to the power receiving device and changes an operation mode of the power transmitting device based on the operation mode switch control signal, the power receiving device including a power supply control section that controls power supply to a load, and a power reception control device that controls the power receiving device, the power-transmitting-side control circuit of the power transmitting device causing the power transmitting device to perform intermittent temporary power transmission when the automatic mode has been selected based on the operation mode switch control signal, and detecting installation of a power-receiving-side instrument that includes the power receiving device depending on whether or not ID authentication information has been received from the power receiving device that has received the intermittent temporary power transmission within a given period of time from a start time of the intermittent temporary power transmission, causing the power transmitting device to perform the normal power transmission to the power receiving device when the installation of the power-receiving-side instrument has been detected on condition that the ID authentication process has been completed successfully, causing the power transmitting device to perform the intermittent temporary power transmission when the ID authentication information has not been received from the power receiving device within the given period of time from the start time of the intermittent temporary power transmission or the ID authentication process has not been completed successfully; and the power-transmitting-side control circuit causing the power transmitting device to perform the intermittent temporary power transmission that enables the ID authentication process to the power receiving device when a switch provided in a power-transmitting-side instrument has been turned ON when the switch mode has been selected based on the operation mode switch control signal, performing the ID authentication process based on the ID authentication information when the ID authentication information has been received from the power receiving device that has received the intermittent temporary power transmission within a given period of time from a start time of the intermittent temporary power transmission, causing the power transmitting device to perform the normal power transmission to the power receiving device after the ID authentication process has been completed successfully, and causing the power transmitting device to return to an initial state when the ID authentication information has not been received from the power receiving device within the given period of time from the start time of the intermittent temporary power transmission or the ID authentication process has not been completed successfully, the power transmitting device waiting for the switch to be turned ON in the initial state without performing the intermittent temporary power transmission.

Therefore, non-contact power transmission technology that allows a mode to be appropriately switched between the automatic mode and the switch mode corresponding to the needs of customer so that convenience to the user can be improved and power consumption can be reduced can be provided. Moreover, highly reliable non-contact power transmission technology provided with appropriate safety measures can be provided.

(18) In the non-contact power transmission system, when the automatic mode has been selected based on the operation mode switch control signal, the power-transmitting-side control circuit may cause the power transmitting device to stop the normal power transmission and perform power transmission for removal detection after full-charging and power transmission for recharge necessity determination after full-charging when the power-transmitting-side control circuit has detected a full-charge notification transmitted from the power receiving device during the normal power transmission, may cause the power transmitting device to perform the intermittent temporary power transmission when removal of the power receiving device has been detected based on a signal transmitted from the power receiving device that has received the power transmission for removal detection after full-charging, and may cause the power transmitting device to resume the normal power transmission when the power-transmitting-side control circuit has determined that recharging is necessary based on a signal transmitted from the power receiving device that has received the power transmission for recharge necessity determination after full-charging.

According to the above configuration, battery management after full-charging can be automatically performed when the automatic mode has been selected. Therefore, a more convenient non-contact power transmission system is implemented.

As described above, at least one embodiment of the invention can provide non-contact power transmission technology that is highly convenient to the user and can reduce power consumption, for example. At least one embodiment of the invention can provide highly reliable non-contact power transmission technology provided with appropriate safety measures.

Preferred embodiments of the invention are described below with reference to the drawings. Note that the following embodiments do not in any way limit the scope of the invention defined by the claims laid out herein. Note that all elements of the following embodiments should not necessarily be taken as essential requirements for the invention.

First Embodiment

Figure 1B:
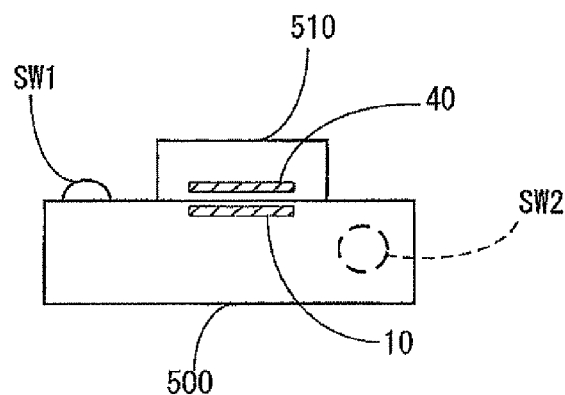
Figure 1C:
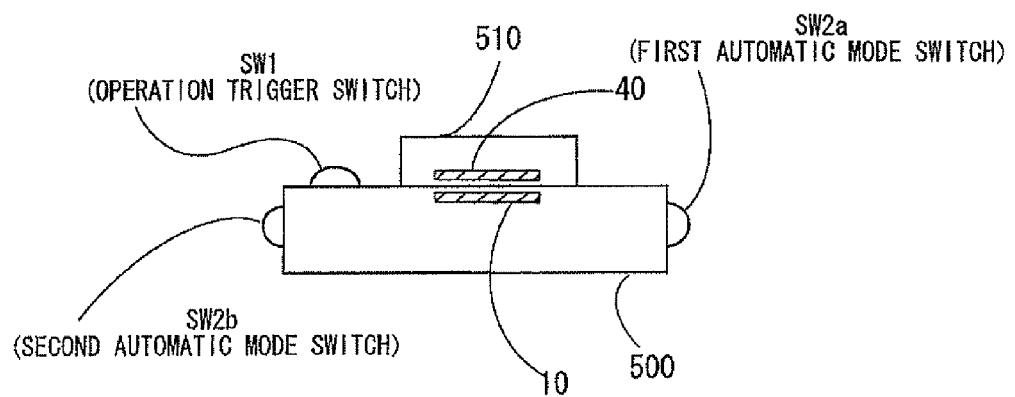

FIG. 1A to 1C are views showing an outline of a configuration example of a non-contact power transmission system that allows switching between a switch mode and an automatic mode. The non-contact power transmission system shown in FIG. 1A includes a power-transmitting-side instrument (e.g., charger (cradle)) 500, and a power-receiving-side instrument (e.g., portable telephone) 510 that is placed on the power-transmitting-side instrument 500 to charge a secondary battery (battery) via non-contact power transmission. The power-transmitting-side instrument 500 includes a power transmitting device 10. The power-receiving-side instrument 510 includes a power receiving device 40. The power receiving device 40 may be externally provided to the power-receiving-side instrument 510 using an adaptor or the like.

The non-contact power transmission system shown in FIG. 1A allows switching between the switch mode and the automatic mode. An operation trigger switch SW1 is provided on the end of the main surface of the power-receiving-side instrument 510, and an automatic mode switch SW2 is provided on the side surface of the power-receiving-side instrument 510. The automatic mode switch SW2 functions as an operation mode switch for changing the operation mode of the power transmitting device 10. As the switches SW1 and SW2, a mechanical momentary switch may be used, for example. Note that the switches SW1 and SW2 are not limited thereto. Various switches such as a relay switch and a magnet switch may also be used.

The switch mode is a mode that allows the user to arbitrarily determine the power transmission start/stop timing by operating the operation trigger switch SW1. In the switch mode, the power transmitting device 10 automatically stops normal power transmission when a full-charge state has been detected, and returns to an initial state (i.e., a state in which the power transmitting device 10 waits for the operation trigger switch SW1 to be turned ON). When the user has pressed the operation trigger switch SW1 during normal power transmission, normal power transmission performed by the power transmitting device 10 is compulsorily stopped, and the power transmitting device 10 returns to the initial state (i.e., a state in which the power transmitting device 10 waits for the operation trigger switch SW1 to be turned ON).

In the automatic mode, when the user has placed the power-receiving-side instrument 510 on the power-transmitting-side instrument 500, the power transmitting device 10 automatically detects the installation of the power-receiving-side instrument 510, and automatically performs temporary power transmission, ID authentication, normal power transmission, removal detection, foreign object detection, full-charge detection, suspension of normal power transmission, and the like. After the power transmitting device 10 has stopped normal power transmission upon detection of a full-charge state, the power transmitting device 10 may automatically perform recharge necessity determination, recharging, and removal detection after full-charging.

The non-contact power transmission system shown in FIG. 1A allows the user to arbitrarily select the switch mode or the automatic mode. The automatic mode switch SW2 functions as an operation mode switch for switching the ON/OFF state of the automatic mode. When the automatic mode has been selected using the automatic mode switch SW2, a power transmission control device (power transmission control IC) 20 is set in the automatic mode. When the automatic mode is not selected, the switch mode is enabled. The operation trigger switch SW1 is disabled when the automatic mode has been selected. In this case, the operation of the power transmitting device 10 is not affected even if the operation trigger switch SW1 has been pressed.

When the automatic mode is not selected (i.e., the automatic mode is canceled), the switch mode is automatically selected. The operation trigger switch SW1 is enabled when the switch mode has been selected. The power transmitting device 10 starts or stops power transmission each time the user presses the operation trigger switch SW1.

In the automatic mode, it suffices that the user merely place the power-receiving-side instrument 510 on the power-transmitting-side instrument 500 without operating a switch or the like. Therefore a burden is not imposed on the user so that the convenience of the system is improved.

On the other hand, since the user can determine the power transmission start/stop timing in the switch mode, the user can utilize the system as the user wishes. Therefore, a highly convenient system is implemented. In the switch mode, power transmission is not performed until the user presses (turns ON) the operation trigger switch SW1. Since the power transmitting device 10 stops normal power transmission and returns to the initial state when a full-charge state has been detected, power transmission is not performed until the user presses the operation trigger switch SW1. Therefore, since power is not unnecessarily consumed, power consumption can be reduced.

In the non-contact power transmission system shown in FIG. 1B, the automatic mode switch SW2 is included in the power-transmitting-side instrument 500. In the non-contact power transmission system shown in FIG. 1B, the manufacturer determines whether or not to select the automatic mode before shipping the power-transmitting-side instrument 500, for example. When selecting the automatic mode, a manufacturer's worker operates the automatic mode switch SW2 to activate the automatic mode. The user cannot select or unselect the automatic mode. The non-contact power transmission system shown in FIG. 1B is suitable when unspecified users utilize the system, for example. Specifically, when unspecified users utilize the system, the user may be confused if each user selects the automatic mode or the switch mode. Therefore, it is desirable that the manufacturer determine the automatic mode or the switch mode before shipment to prevent confusion and allow the user to easily understand the system.

The non-contact power transmission system shown in FIG. 1C is a modification of the system shown in FIG. 1A. The system shown in FIG. 1C has two automatic mode switches. Specifically, a first automatic mode switch SW2*a* and a second automatic mode switch SW2*b* are provided on the side surfaces of the power-transmitting-side instrument 500. The system shown in FIG. 1C allows the user to select the type of the automatic mode.

In the automatic mode selected using the first automatic mode switch SW2*a*, the power transmitting device 10 automatically performs detection of installation of the power-receiving-side instrument 510, temporary power transmission, ID authentication, normal power transmission, removal detection, foreign object detection, full-charge detection, and suspension of normal power transmission. In the automatic mode selected using the second automatic mode switch SW2*b*, the power transmitting device 10 also automatically performs recharge management after fall-charging. For example, when the second automatic mode has been selected using the second automatic mode switch SW2*b*, the power transmitting device 10 automatically performs a series of operations including detection of installation of the power-receiving-side instrument 510, temporary power transmission, ID authentication, normal power transmission, removal detection, foreign object detection, full-charge detection, suspension of normal power transmission, recharge necessity determination after fall-charging, recharging, and removal detection after full-charging.

A user who desires to use the power-receiving-side instrument 510 immediately after full-charging presses (turns ON) the first automatic mode switch SW2*a* when utilizing the automatic mode. A user who will not use the power-receiving-side instrument 510 for a long period of time presses (turns ON) the second automatic mode switch SW2*b*. Specifically, the type of automatic mode can be appropriately selected corresponding to each user. Note that the type of automatic mode is not limited to the above example. Three or more automatic modes may be provided, and the number of automatic mode switches may be increased corresponding to the automatic modes. An automatic mode in which only recharge monitoring after full-charging is performed may be provided. Specifically, the automatic mode corresponding to the second automatic mode switch SW2*b* may be specialized in recharge monitoring after full-charging. For example, a user who will not use a portable terminal for a long period of time places the portable terminal on the power-transmitting-side instrument 500, and presses the second automatic mode switch SW2*b*. When a battery of the portable terminal has been discharged and requires recharging, the battery of the portable terminal is automatically recharged. Therefore, the battery of the portable terminal can be necessarily fully charged.

Examples of an electronic instrument to which the invention is suitably applied and the principle of non-contact power transmission technology are described below.

Figure 2A:
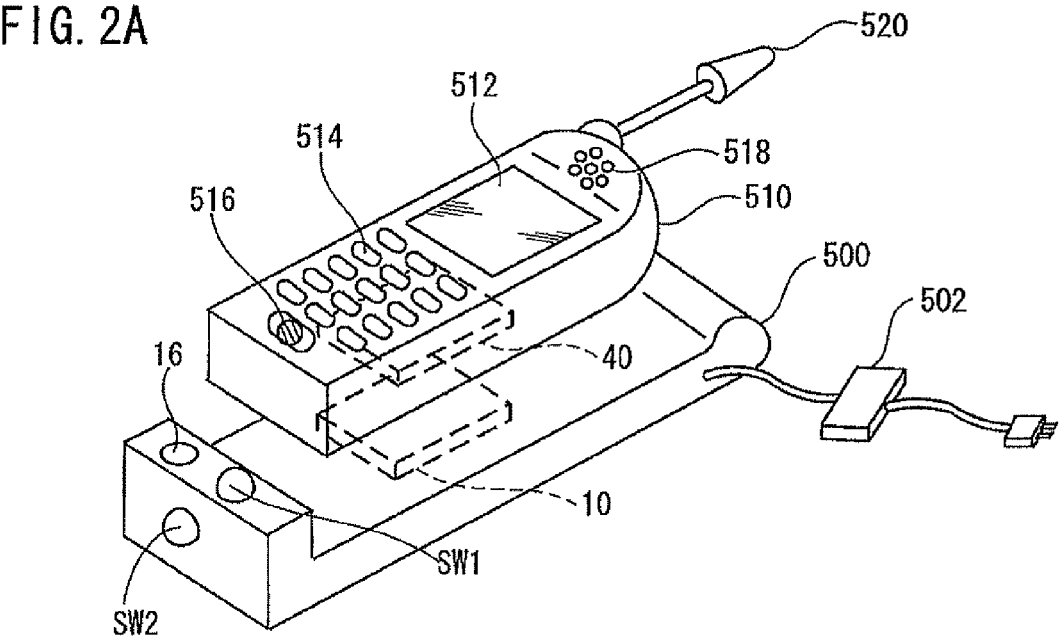
FIGS. 2A to 2C are views illustrative of examples of an electronic instrument to which non-contact power transmission technology is applied, and the principle of non-contact power transmission using an induction transformer.
Figure 2B:
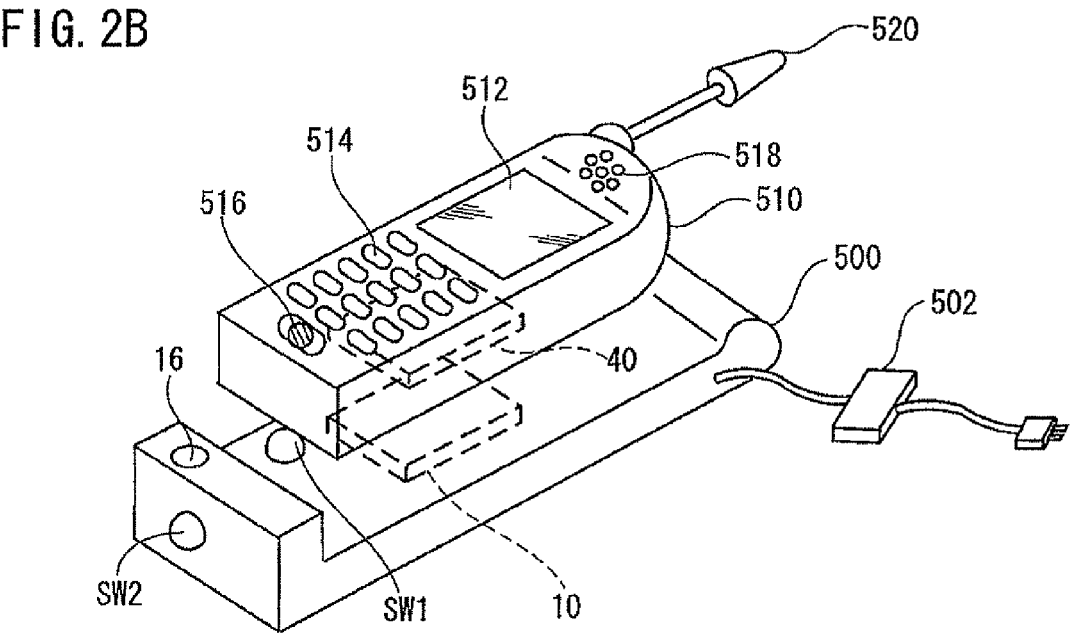
Figure 2C:
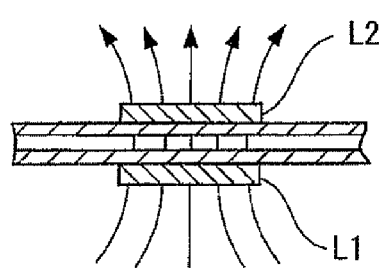

Examples of electronic instrument and principle of non-contact power transmission FIGS. 2A to 2C are views illustrative of examples of an electronic instrument to which the non-contact power transmission technology is applied, and the principle of non-contact power transmission using an induction transformer.

As shown in FIGS. 2A and 2B, a charger (cradle) 500 (i.e., power-transmitting-side electronic instrument) includes a power transmitting device (e.g., power transmitting module including a power-transmitting-side control circuit (power-transmitting-side control IC)) 10.

The charger (cradle) 500 also includes an operation trigger switch SW1 that causes (triggers) power transmission to start or stop, an automatic mode switch SW2, and a display section (e.g., LED) 16 that is turned ON when the charger transmits power and allows identification of the automatic mode/switch mode due to a change in the color of emitted light.

In the charger (cradle) 500 shown in FIG. 2A, the operation trigger switch SW1 is provided in an area outside an area in which a power-receiving-side electronic instrument (portable telephone) 510 is placed. The user who desires to charge the portable telephone 510 presses the operation trigger switch SW1 when the automatic mode is not selected. This causes the power transmitting device 10 to start power transmission (temporary power transmission for position detection and ID authentication). When the operation trigger switch SW1 has been pressed during power transmission (including temporary power transmission and normal power transmission), power transmission is compulsorily stopped.

In the charger (cradle) 500 shown in FIG. 2B, the operation trigger switch SW1 is provided in an area in which the power-receiving-side electronic instrument (portable telephone) 510 is placed. Therefore, when the portable telephone 510 is placed on the charger (cradle) 500, the operation trigger switch SW1 is automatically pressed (turned ON) due to the weight of the charger (cradle) 500. This causes the charger (cradle) 500 to start power transmission (temporary power transmission for position detection and ID authentication). When the operation trigger switch SW1 has been pressed during power transmission (including temporary power transmission and normal power transmission) (e.g., when the portable telephone 510 has been removed from the charger (cradle) 500 and then placed on the charger (cradle) 500 so that the operation trigger switch SW1 has been pressed again), power transmission is compulsorily stopped.

In FIG. 2B, the operation trigger switch SW1 causes power transmission to start in the same manner as in FIG. 2A, but is not used to detect the presence of the portable telephone 510 (removal of the portable telephone 510 is basically determined based on an induced voltage in a primary coil: described later). Note that the operation trigger switch SW1 may also have a function of detecting the presence of the portable telephone 510.

The portable telephone (i.e., power-receiving-side instrument) 510 includes a power receiving device (e.g., power receiving module including a power-receiving-side control circuit (power-receiving-side control IC)) 40. The portable telephone 510 also includes a display section 512 (e.g., LCD), an operation section 514 that includes a button or the like, a microphone 516 (sound input section), a speaker 518 (sound output section), and an antenna 520.

Power is supplied to the charger 500 through an AC adaptor 502. The power supplied to the charger 500 is transmitted from the power transmitting device 10 to the power receiving device 40 by means of non-contact power transmission. This makes it possible to charge a battery of the portable telephone 510, or operate a device provided in the portable telephone 510.

As schematically shown in FIG. 2C, power transmission from the power transmitting device 10 to the power receiving device 40 is implemented by electromagnetically coupling a primary coil L1 (power-transmitting-side coil) provided in the power transmitting device 10 and a secondary coil L2 (power-receiving-side coil) provided in the power receiving device 40 to form a power transmission transformer. This enables non-contact power transmission, Note that the electronic instrument to which this embodiment is applied is not limited to the portable telephone 510. For example, this embodiment may be applied to various other electronic instruments such as a wristwatch, a cordless telephone, a shaver an electric toothbrush, a wrist computer, a handy terminal, a portable information terminal, and a power-assisted bicycle.

Examples of particularly suitable electronic instruments include a portable terminal (including a portable telephone terminal, PDA terminal, and portable personal computer terminal) and a watch. Since the power receiving device according to the invention has a simple configuration and a reduced size, the power receiving device can be incorporated in a portable terminal or the like. The charging time of a secondary battery provided in an electronic instrument can be reduced using the power receiving device according to the invention due to low loss. Moreover, since the power receiving device according to the invention reduces heat generation, the reliability of an electronic instrument is improved from the viewpoint of safety.

In particular, since a large amount of charging current flows through a portable terminal (including a portable telephone terminal, PDA terminal, and portable personal computer terminal) under heavy load, heat may be generated to a large extent. Therefore, the features of the invention (i.e., low loss and low heat generation) can be sufficiently utilized for such a portable terminal.

Figure 3:
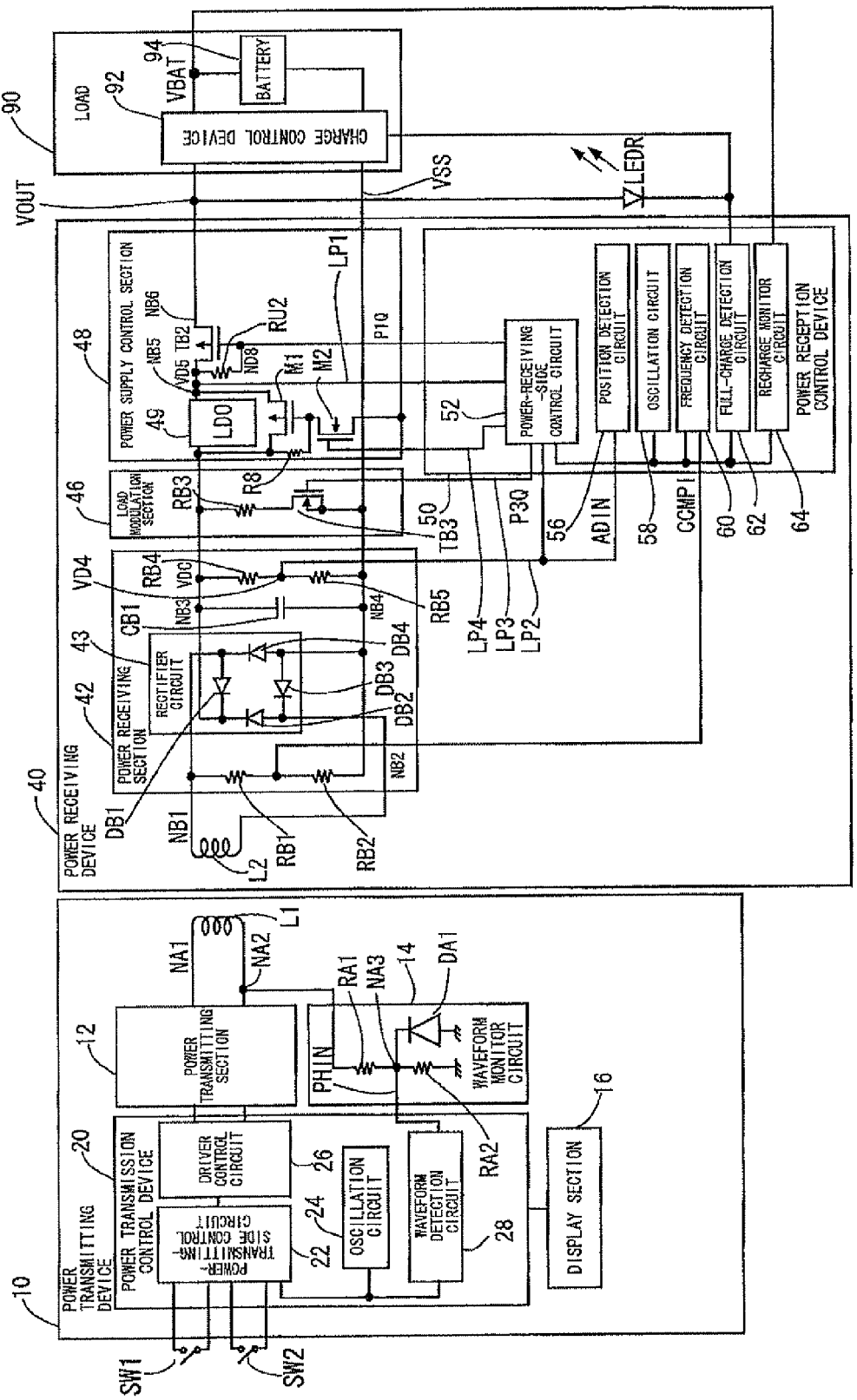
FIG. 3 is a circuit diagram showing an example of a specific configuration of each section of a non-contact power transmission system that includes a power transmitting device and a power receiving device.

Internal configuration examples of power transmitting device and power receiving device FIG. 3 is a circuit diagram showing an example of a specific configuration of each section of a non-contact power transmission system that includes a power transmitting device and a power receiving device. As shown in FIG. 3, the power transmitting device 10 includes a power transmission control device 20, a power transmitting section 12, a waveform monitor circuit 14, the operation trigger switch SW1, and the automatic mode switch SW2. The power transmission control device 20 includes a power-transmitting-side control circuit 22, an oscillation circuit 24, a driver control circuit 26, and a waveform detection circuit 28.

The power receiving device 40 includes a power receiving section 42, a load modulation section 46, a power supply control section 48, and a power reception control device 50. A load 90 includes a charge control device 92 and a battery (secondary battery) 94. The details are given below. A power-transmitting-side electronic instrument such as the charger 500 includes at least the power transmitting device 10 shown in FIG. 3. A power-receiving-side electronic instrument such as the portable telephone 510 includes at least the power receiving device 40 and the load 90. The configuration shown in FIG. 3 implements a non-contact power transmission (contactless power transmission) system that transmits power from the power transmitting device 10 to the power receiving device 40 by electromagnetically coupling the primary coil L1 and the secondary coil L2 to supply power (voltage VOUT) to the load 90 from a voltage output node NB6 of the power receiving device 40.

The power transmitting device 10 (power transmitting module or primary module) may include the primary coil L1, the power transmitting section 12, the waveform monitor circuit 14, the display section 16, and the power transmission control device 20. The power transmitting device 10 and the power transmission control device 20 are not limited to the configuration shown in FIG. 3. Various modifications may be made such as omitting some (e.g., display section and waveform monitor circuit) of the elements, adding other elements, or changing the connection relationship. The power transmitting section 12 generates an alternating-current voltage having a given frequency during power transmission, and generates an alternating-current voltage having a frequency that differs depending on data during data transfer. The power transmitting section 12 supplies the alternating-current voltage to the primary coil L1.

Figure 4A:
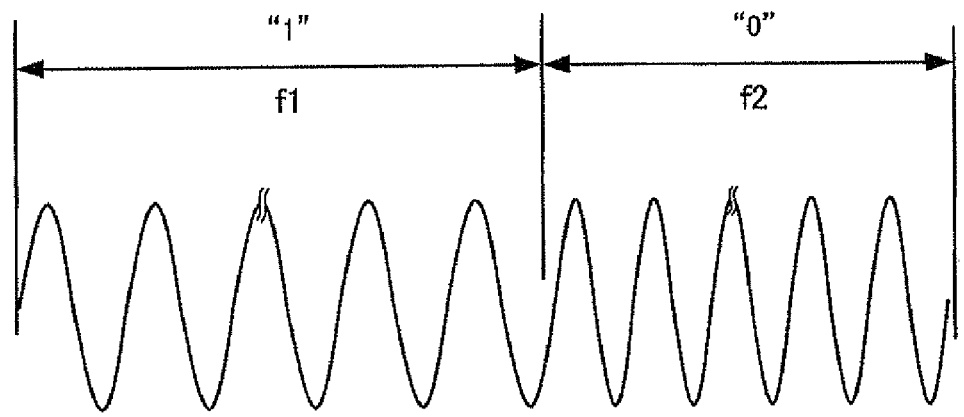
FIGS. 4A and 4B are views illustrative of the principle of information transmission between a power-transmitting-side instrument and a power-receiving-side instrument.
Figure 4B:
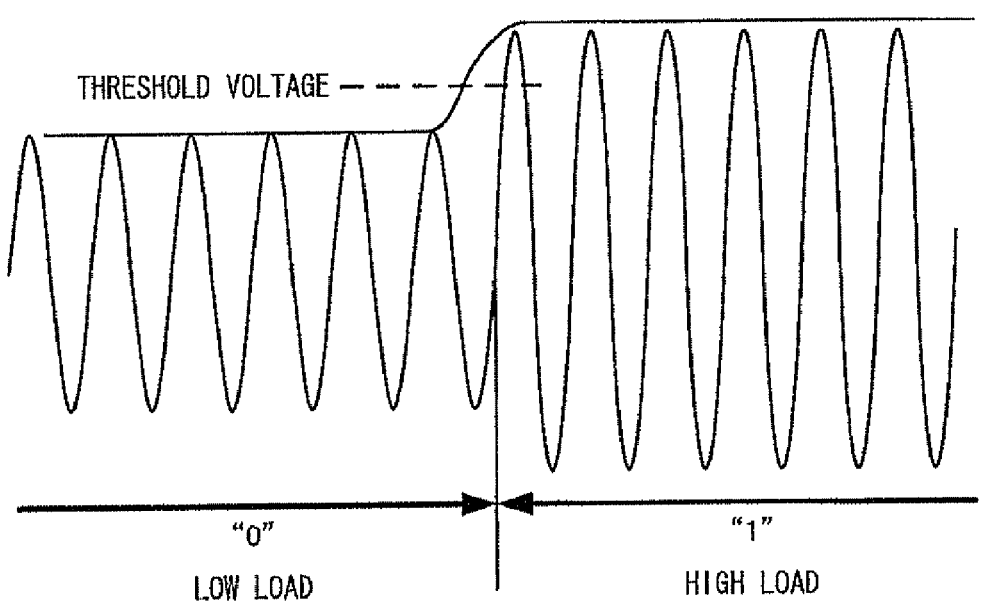

FIGS. 4A and 4B are views illustrative of an example of the principle of information transmission between the power-transmitting-side instrument and the power-receiving-side instrument. Information is transmitted from the primary-side instrument to the secondary-side instrument utilizing frequency modulation. Information is transmitted from the secondary-side instrument to the primary-side instrument utilizing load modulation. As shown in FIG. 4A, the power transmitting device 10 generates an alternating-current voltage having a frequency f1 when transmitting data "1" to the power receiving device 40, and generates an alternating-current voltage having a frequency f2 when transmitting data "0" to the power receiving device 40, for example. As shown in FIG. 4B, the power receiving device 40 can switch the load state between a low-load state and a high-load state by load modulation to transmit data "0" or "1" to the primary-side instrument (power transmitting device 10).

Again referring to FIG. 3, the power transmitting section 12 may include a first power transmitting driver that drives one end of the primary coil L1, a second power transmitting driver that drives the other end of the primary coil L1, and at least one capacitor that forms a resonant circuit with the primary coil L1. Each of the first and second power transmitting drivers included in the power transmitting section 12 is an inverter circuit (or buffer circuit) that includes a power MOS transistor, for example, and is controlled by the driver control circuit 26 of the power transmission control device 20.

The primary coil L1 (power-transmitting-side coil) is electromagnetically coupled to the secondary coil L2 (power-receiving-side coil) to form a power transmission transformer. For example, when power transmission is necessary, the portable telephone 510 is placed on the charger 500 so that a magnetic flux of the primary coil L1 passes through the secondary coil L2, as shown in FIG. 1. When power transmission is unnecessary, the charger 500 and the portable telephone 510 are physically separated so that a magnetic flux of the primary coil L1 does not pass through the secondary coil L2.

The waveform monitor circuit 14 is a circuit that detects an induced voltage in the primary coil L1. The waveform monitor circuit 14 includes resistors RA1 and RA2, and a diode DA1 provided between a connection node NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to the waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 controls the power transmitting device 10. The power transmission control device 20 may be implemented by an integrated circuit device (IC) or the like. The power transmission control device 20 includes the power-transmitting-side control circuit 22, the oscillation circuit 24, the driver control circuit 26, and the waveform detection circuit 28.

The power-transmitting-side control circuit 22 controls the power transmitting device 10 and the power transmission control device 20. The power-transmitting-side control circuit 22 may be implemented by a gate array, a microcomputer, or the like.

Specifically, the power-transmitting-side control circuit 22 performs sequence control and a determination process necessary for power transmission, load detection, frequency modulation, foreign object detection, removal (detachment) detection, and the like. The power-transmitting-side control circuit 22 starts temporary power transmission for position detection and ID) authentication targeted at the power receiving device 40 when the switch (SW) has been turned ON (described later).

The oscillation circuit 24 is formed by a crystal oscillation circuit or the like, and generates a primary-side clock signal. The driver control circuit 26 generates a control signal at a desired frequency based on the clock signal generated by the oscillation circuit 24, a frequency setting signal output from the control circuit 22, and the like, and outputs the generated control signal to the power transmitting drivers (not shown) of the power transmitting section 12 to control the operations of the power transmitting drivers.

The waveform detection circuit 28 monitors the waveform of the signal PHIN that corresponds to an induced voltage at one end of the primary coil L1, and performs load detection, foreign object detection, and the like. For example, when the load modulation section 46 of the power receiving device 40 has performed load modulation for transmitting data to the power transmitting device 10, the signal waveform of the induced voltage in the primary coil L1 changes correspondingly.

As shown in FIG. 4B, the amplitude (peak voltage) of the signal waveform decreases when the load modulation section 46 of the power receiving device 40 reduces the load in order to transmit data "0", and increases when the load modulation section 46 increases the load in order to transmit data "1", for example. Therefore, the waveform detection circuit 28 can determine whether the data transmitted from the power receiving device 40 is "0" or "1" by determining whether or not the peak voltage has exceeded a threshold voltage by performing a peak-hold process on the signal waveform of the induced voltage, for example. Note that the waveform detection method is not limited to the above-described method. For example, the waveform detection circuit 28 may determine whether the power-receiving-side load has increased or decreased utilizing a physical quantity other than the peak voltage.

The power receiving device 40 (power receiving module or secondary module) may include the secondary coil L2, the power receiving section 42, the load modulation section 46, the power supply control section 48, and a power reception control device 50. Note that the power receiving device 40 and the power reception control device 50 are not limited to the configuration shown in FIG. 3. Various modifications may be made such as omitting some of the elements, adding other elements, or changing the connection relationship.

The power receiving section 42 converts an alternating-current induced voltage in the secondary coil L2 into a direct-current voltage. A rectifier circuit 43 included in the power receiving section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power receiving section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power receiving section 42 are provided between the node NB3 (direct-current voltage VDC) and the node NB4 (VSS). A divided voltage VD4 obtained by dividing the voltage between the nodes NB3 and NB4 using the resistors RB4 and RB5 is input to a power-receiving-side control circuit 52 and a position detection circuit 56 through a signal line LP2. The divided voltage VD4 is input to the position detection circuit 56 as a position detection signal input (ADIN).

The load modulation section 46 performs a load modulation process. Specifically, when the power receiving device 40 transmits the desired data to the power transmitting device 10, the load modulation section 46 variably changes the load of the load modulation section 46 (secondary side) corresponding to the transmission target data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-con-trolled based on a control signal P3Q supplied from the power-receiving-side control circuit 52 of the power reception control device 50 through a signal line LP3. When performing the load modulation process by ON/OFF-controlling the transistor TB3 and transmitting a signal to the power transmitting device in an authentication stage before normal power transmission starts, a transistor TB2 of the power supply control section 48 is turned OFF so that the load 90 is not electrically connected to the power receiving device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 is equivalent to the resistor RB3 (high load).

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A switch circuit formed using a PMOS transistor (M1) is provided between the input terminal and the output terminal of the regulator (LDO) 49. A path that bypasses the regulator (LDO) 49 is formed by causing the PMOS transistor (M1) (switch circuit) to be turned ON. For example, since a power loss increases due to the equivalent impedance of the regulator 49 and heat generation increases under heavy load (e.g., when it is necessary to cause an almost constant large current to steadily flow in the initial stage of charging a secondary battery exhausted to a large extent), a current is supplied to the load through a path that bypasses the regulator.

An NMOS transistor (M2) and a pull-up resistor R8 that function as a bypass control circuit are provided to ON/OFF-control the PMOS transistor (M1) (switch circuit).

The NMOS transistor (M2) is turned ON when a high-level control signal is supplied to the gate of the NMOS transistor (M2) through a signal line LP4. This causes the gate of the PMOS transistor (M1) to be set at a low level so that the PMOS transistor (M1) is turned ON. As a result, a path that bypasses the regulator (LDO) 49 is formed. When the NMOS transistor (M2) is turned OFF, the gate of the PMOS transistor (M1) is maintained at a high level through the pull-up resistor R8. Therefore, the PMOS transistor (M1) is turned OFF so that the bypass path is not formed.

The NMOS transistor (M2) is ON/OFF-controlled by the power-receiving-side control circuit 52 included in the power reception control device 50.

The transistor TB2 (P-type CMOS transistor) is provided between a power supply voltage (VD5) generation node NB5 (output node of the regulator 49) and the node NB6 (voltage output node of the power receiving device 40), and is controlled based on a signal P1Q output from the power-receiving-side control circuit 52 of the power reception control device 50. Specifically, the transistor TB2 is turned ON when normal power transmission is performed after completion (establishment) of ID authentication.

A pull-up resistor RU2 is provided between the power supply voltage generation node NB5 and a node NB8 of the gate of the transistor TB2.

The power reception control device 50 controls the power receiving device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-receiving-side) to control circuit 52, the position detection circuit 56, an oscillation circuit 58, the frequency detection circuit 60, a full-charge detection circuit 62, and a recharge monitor circuit 64.

The power-receiving-side control circuit 52 controls the power receiving device 40 and the power reception control device 50. The power-receiving-side control circuit 52 may be implemented by a gate array, a microcomputer, or the like. The power-receiving-side control circuit 52 operates based on a constant voltage (VD5) at the output terminal of the series regulator (LDO) 49 as a power supply voltage. The power supply voltage (VD5) is supplied to the power-receiving-side control circuit 52 through a power supply line LP1.

The power-receiving-side control circuit 52 performs sequence control and a determination process necessary for ID authentication, position detection, frequency detection, full-charge detection, recharge determination, load modulation for authentication communication, load modulation for communication that enables detection of foreign object insertion, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is appropriate.

Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmitting device 10 is "1" or "0".

The full-charge detection circuit 62 (charge detection circuit) detects whether or not the battery 94 of the load 90 has been fully charged (charge state). Specifically, the full-charge detection circuit 62 detects the full-charge state by detecting whether a light-emitting device (LEDR) used to indicate the charge state is turned ON or OFF, for example. The full-charge detection circuit 62 determines that the battery 94 has been fully charged (charging has been completed) when the light-emitting device (LEDR) has been turned OFF for a given period of time (e.g., five seconds).

When the power-receiving-side instrument 510 is allowed to stand on the cradle 500 for a long time after fall-charging, a battery voltage VBAT decreases due to discharge. The recharge monitor circuit 64 determines whether or not recharging is necessary based on the battery voltage VBAT. For example, the recharge monitor circuit 64 determines that recharging is necessary when the battery voltage VBAT has become lower than a threshold voltage.

The load 90 includes the charge control device 92 that controls charging of the battery 94 and the like. The charge control device 92 detects a full-charge state based on the ON/OFF state of the light-emitting device (LEDR). The charge control device 92 (charge control IC) may be implemented by an integrated circuit device or the like. The battery 94 may be provided with the function of the charge control device 92 (e.g., smart battery). Note that the load 90 is not limited to a secondary battery. For example, a given circuit may serve as a load when the circuit operates.

Installation of operation trigger switch and automatic mode switch

Figure 5:
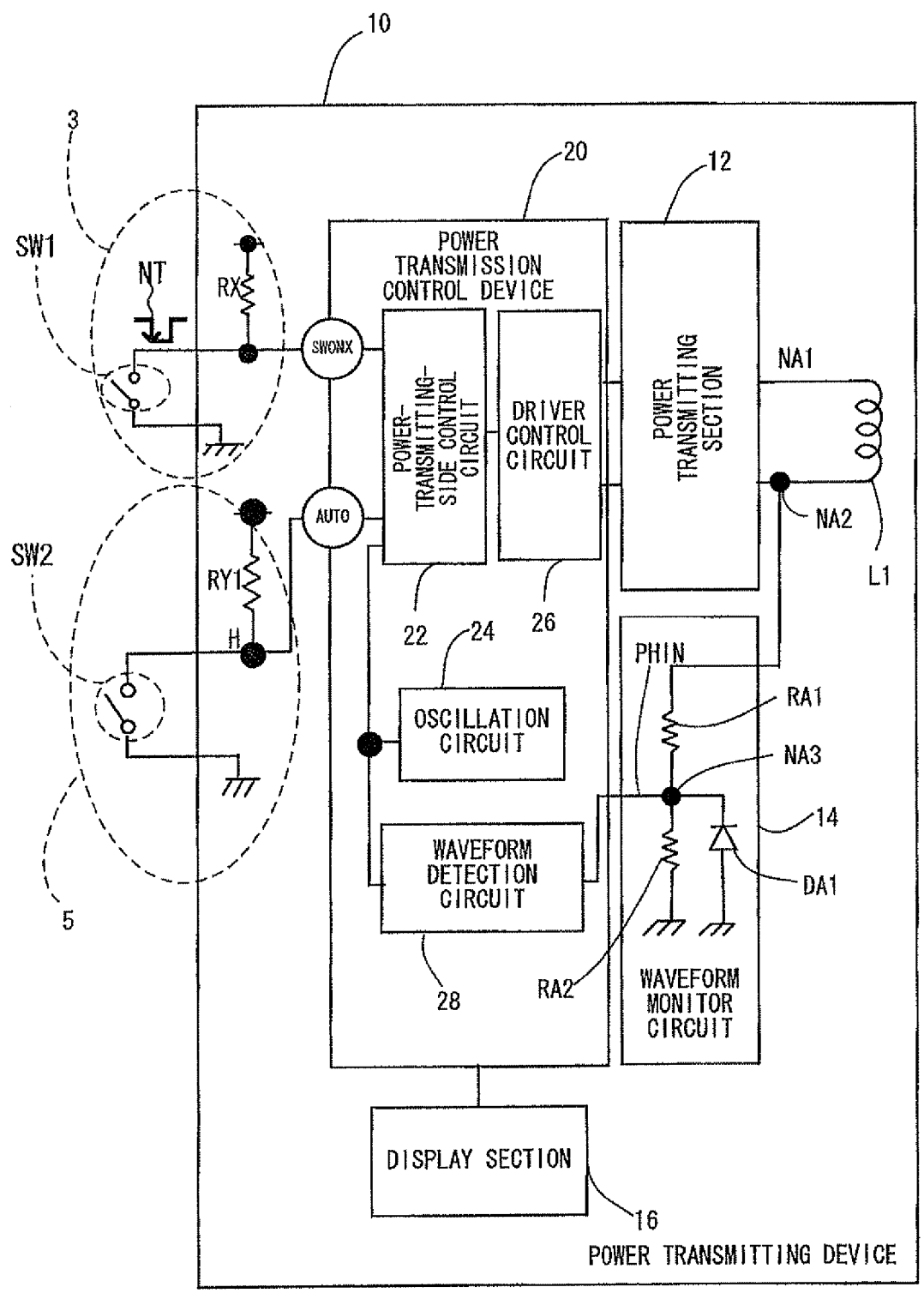
FIG. 5 is a view showing an example of installation of an operation trigger switch and an automatic mode switch.
Figure 6:
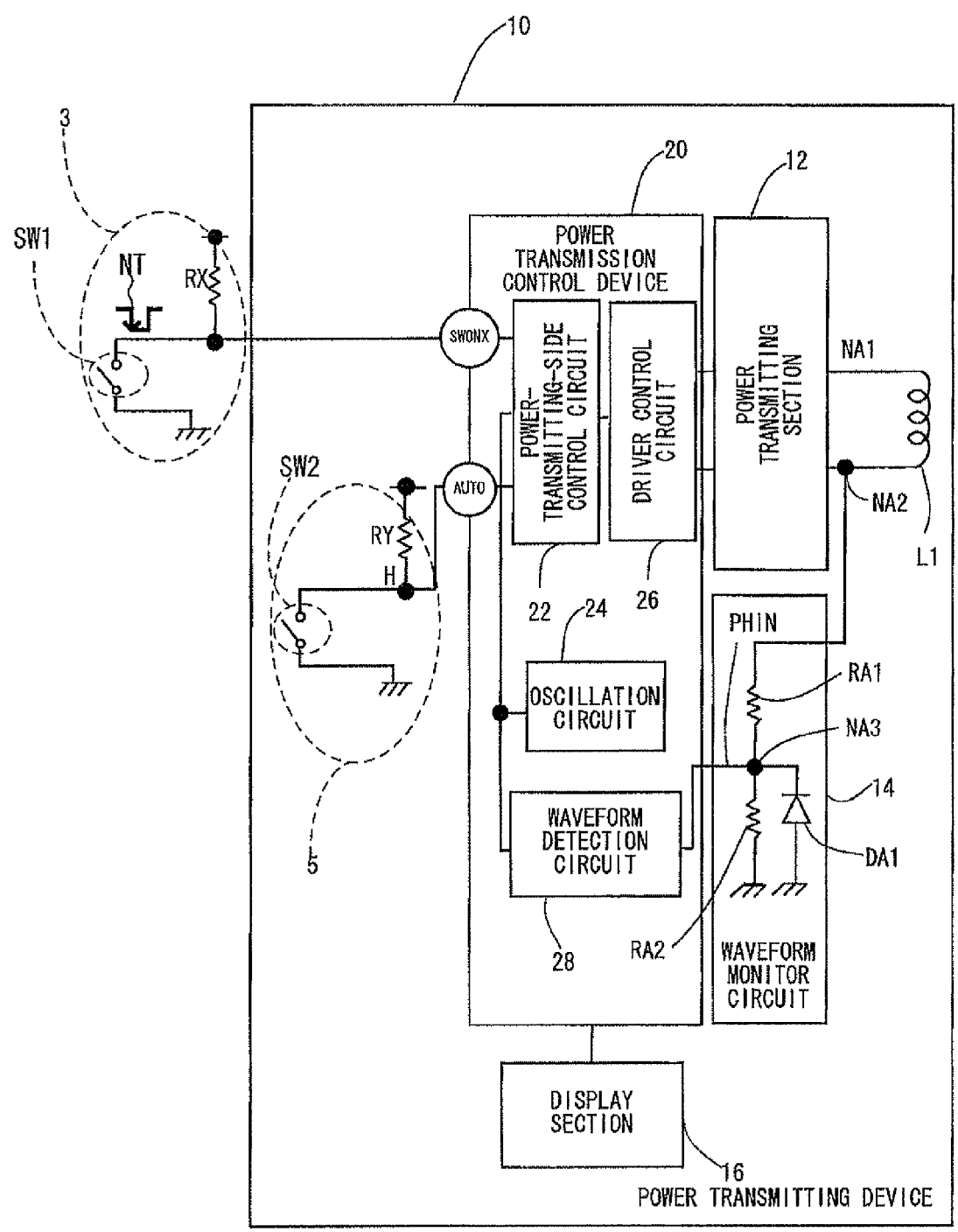
FIG. 6 is a view showing another example of installation of the operation trigger switch and the automatic mode switch.
Figure 7:
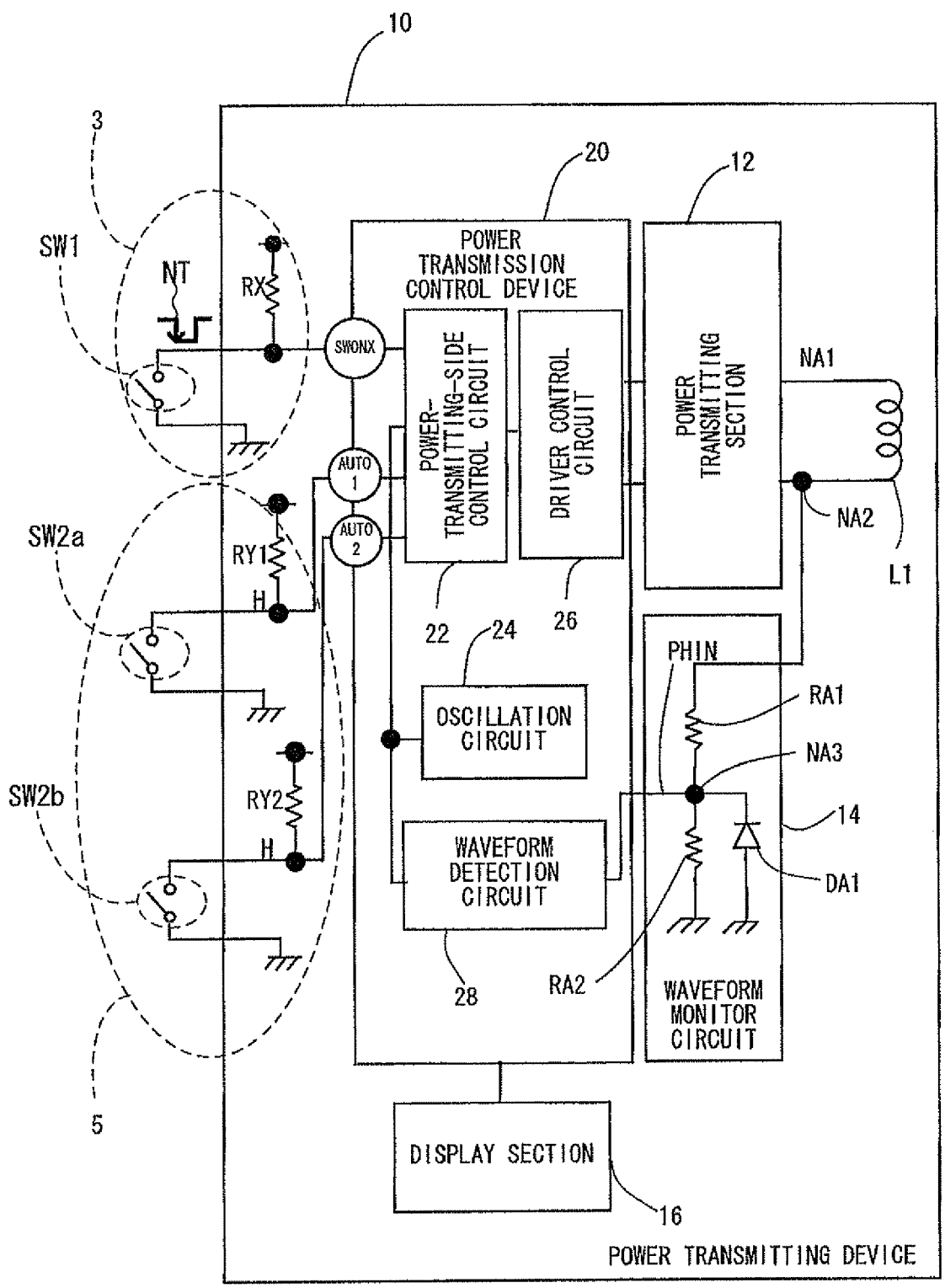
FIG. 7 is a view showing a further example of installation of the operation trigger switch and the automatic mode switch.

FIGS. 5 to 7 are views showing specific installation examples of the operation trigger switch and the automatic mode switch. FIG. 5 shows the internal configuration of the power transmitting device 10 included in the system shown in FIG. 1A.

In FIG. 5, the power transmission control device (power transmission control IC) 20 has an operation trigger input terminal SWONX and an automatic mode terminal AUTO. One end of the operation trigger switch SW1 is connected to the operation trigger input terminal SWONX. One end of the operation trigger switch SW1 is pulled up using a pull-up resistor RX. Therefore, when the operation trigger switch SW1 is open, the operation trigger input terminal SWONX is maintained at the H level. The other end of the operation trigger switch SW1 is grounded. Therefore, when the operation trigger switch SW1 is closed, the operation trigger input terminal SWONX is set at the L level. The power-transmitting-side control circuit 22 repeatedly starts/stops power transmission corresponding to each negative edge NT of an operation trigger.

One end of the automatic mode switch SW2 is connected to the automatic mode terminal AUTO. One end of the automatic mode switch SW2 is pulled up using a pull-up resistor RY1. Therefore, when the automatic mode switch SW2 is open, the automatic mode terminal AUTO is maintained at the H level. The other end of the automatic mode switch SW2 is grounded. Therefore, when the automatic mode switch SW2 is closed, the automatic mode terminal AUTO is set at the L level. The power-transmitting-side control circuit 22 is set in the automatic mode when the automatic mode terminal AUTO is set at the H level, and automatically performs a series of operations including installation detection, temporary power transmission, ID authentication, normal power transmission, removal detection, foreign object detection, full-charge detection, suspension of normal power transmission, and the like. The automatic mode is disabled (OFF) when the automatic mode terminal AUTO is set at the L level. The operation trigger mode is enabled (active) when the automatic mode is disabled. Therefore, input of the negative edge NT from the operation trigger switch SW1 is enabled so that the power-transmitting-side control circuit 22 repeatedly starts/stops power transmission corresponding to each negative edge NT, as described above.

In FIG. 5, the operation trigger switch SW1 and the pull-up resistor RX form an operation trigger circuit 3. When the automatic mode is inactive, the operation trigger circuit 3 provides an operation trigger that instructs the power transmission control device 20 (power transmission control IC) to start/stop power transmission. The automatic mode switch SW2 and the pull-up resistor RY1 form an automatic mode circuit 5. The automatic mode circuit 5 functions as an operation mode switch circuit that switches the ON/OFF state of the automatic mode. Specifically, the power transmission control device 20 (power transmission control IC) is set in the automatic mode when the output from the automatic mode circuit 5 is set at the H level. The automatic mode is canceled and the switch mode is enabled when the output from the automatic mode circuit 5 is set at the L level.

FIG. 6 shows the internal configuration of the power transmitting device 10 included in the system shown in FIG. 1B. In FIG. 6, the automatic mode circuit 5 (including the automatic mode switch SW2) is provided in the power transmitting device 10. A manufacturer's worker selects the automatic mode using the automatic mode circuit 5 before shipment, for example.

FIG. 7 shows the internal configuration of the power transmitting device 10 included in the system shown in FIG. 1C. In FIG. 7, the automatic mode circuit 5 includes the first automatic mode switch SW2$a$ and the second automatic mode switch SW2$b$. When the first automatic mode switch SW2$a$ is turned ON, the power-transmitting-side control circuit 22 automatically performs a series of operations including detection of installation of the power-receiving-side instrument 510, temporary power transmission, ID authentication, normal power transmission, removal detection, foreign object detection, full-charge detection, and suspension of normal power transmission, as described above. When the second automatic mode switch SW2$b$ is turned ON, the power-transmitting-side control circuit 22 automatically performs a series of operations including detection of installation of the power-receiving-side instrument 510, temporary power transmission, ID authentication, normal power transmission, removal detection, foreign object detection, full-charge detection, suspension of normal power transmission, recharge necessity determination after full-charging, recharging, and removal detection after full-charging. Note that the power transmission control device (power transmission control IC) 20 shown in FIG. 7 has two automatic mode terminals (AUTO1 and AUTO2).

Second Embodiment

This embodiment illustrates the operation of the on-contact power transmission system when the automatic mode is selected.

Outline of operation of power transmitting device in automatic mode

Figure 8:
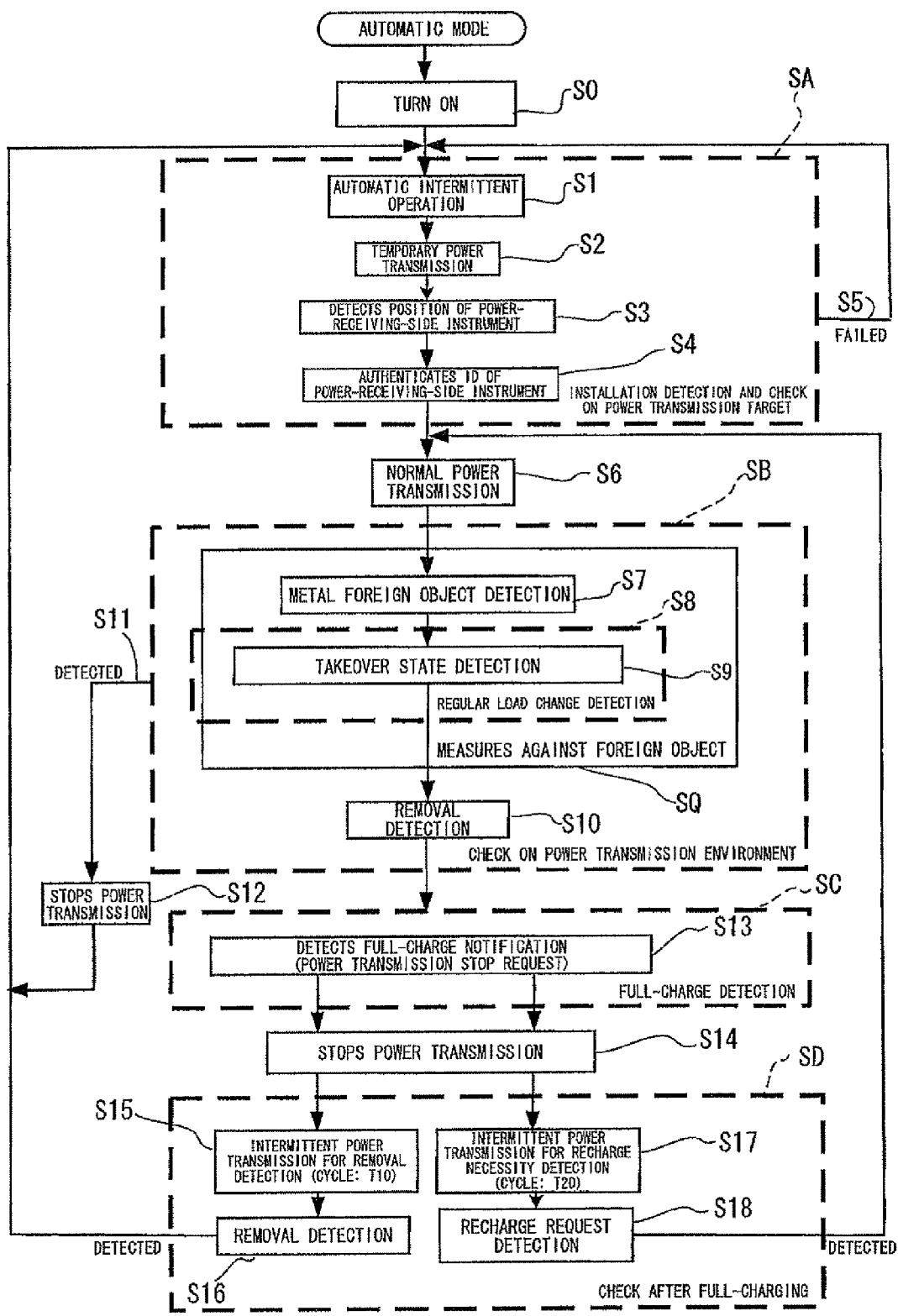
FIG. 8 is a flowchart showing an outline of an example of the operation of a power transmitting device.

FIG. 8 is a flowchart showing an outline of an example of the operation of the power transmitting device in the automatic mode. The power-transmitting-side control circuit 22 of the power transmitting device 10 according to the invention automatically detects installation of the power-receiving-side instrument 510, and manages recharging after full-charging, as described above. An operation mode in which the power transmitting device 10 automatically performs a series of operations is referred to as "automatic mode".

The operation of the power transmitting device 10 in the automatic mode is roughly divided into installation detection and a check on the power transmission target (step SA), a check on the power transmission environment during normal power transmission (step SB), full-charge detection (step SC), and monitoring after full-charging (step SD) (these steps are enclosed by bold dotted lines in FIG. 8). These steps are described below.

When the power transmitting device 10 has been turned ON (step S0), the power transmitting device 10 performs installation detection and a check on the power transmission target (step SA). The step SA includes steps S1 to S4. In the steps S1 and S2, the power transmitting device 10 performs intermittent temporary power transmission by automatically and intermittently driving the primary coil L1 in a given cycle (e.g., 0.3 seconds). The power transmitting device 10 then checks whether or not the power-receiving-side instrument 510 is placed at an appropriate position (step S3), and performs ID authentication on the power-receiving-side instrument 510 (or the power receiving device 40) to determine whether or not the power-receiving-side instrument 510 is an appropriate power transmission target (step S4).

When the position of the power receiving device 40 has been detected successfully (step S3), the power receiving device 40 transmits ID authentication information to the power transmitting device 10 within a given period of time. The power transmitting device 10 detects installation of the power-receiving-side instrument 510 by checking whether or not the ID authentication information is transmitted from the power receiving device within a given period of time after the intermittent temporary power transmission timing. When the power transmitting device 10 cannot detect installation of the power-receiving-side instrument 510 or has failed in ID authentication (step S4) (step S5), the power transmitting device 10 stops temporary power transmission, and intermittently performs temporary power transmission (initial state).

Figure 16:
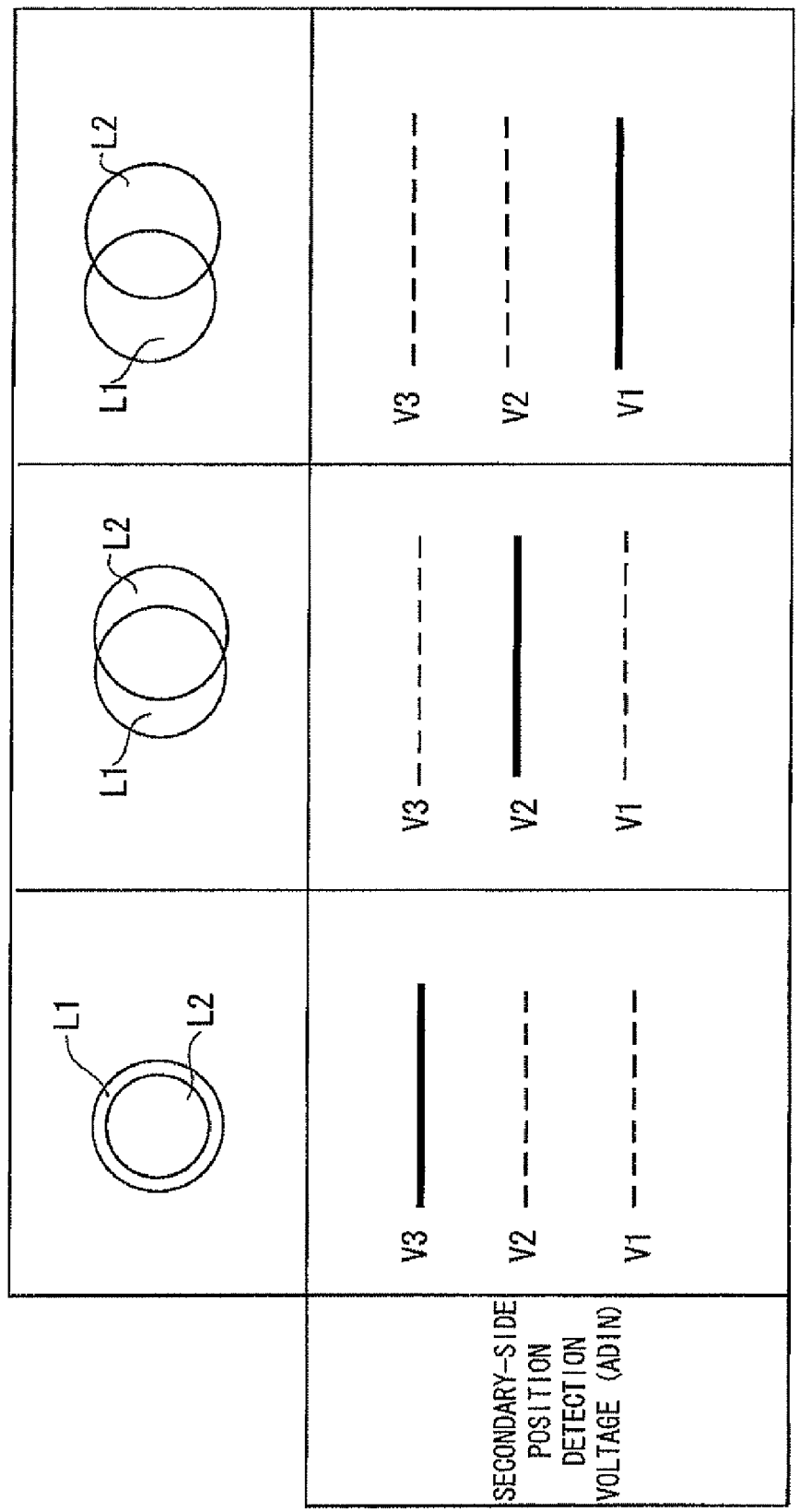
FIG. 16 is a view illustrative of the position detection principle.
Figure 17C:
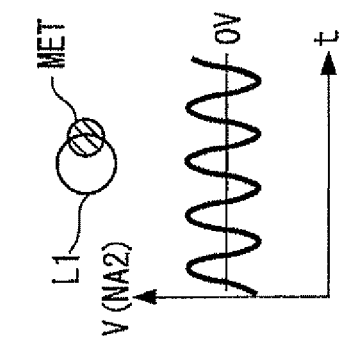
FIGS. 17A to 17F are views illustrative of the principle of metal foreign object (conductive foreign object) detection.
Figure 17B:
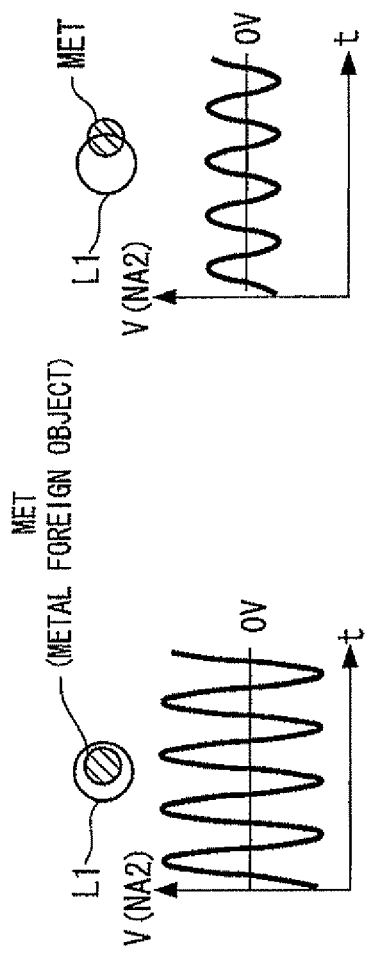
Figure 17A:
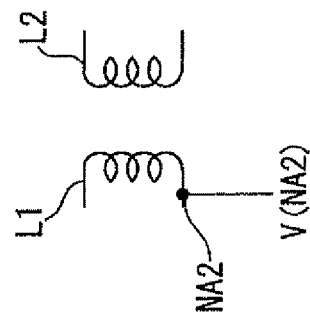
Figure 17F:
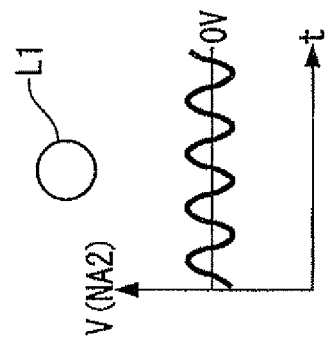
Figure 17E:
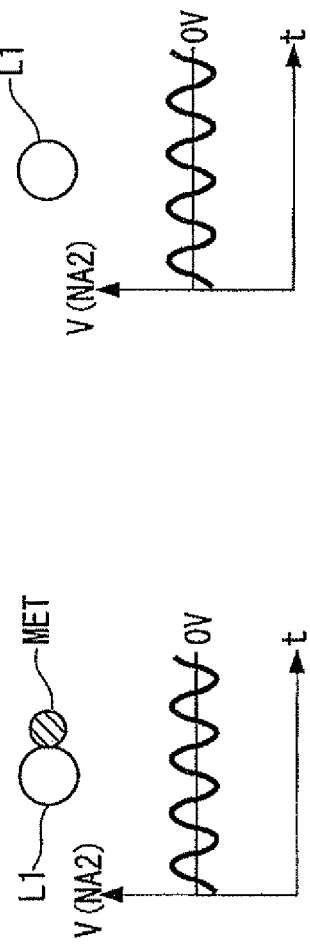
Figure 17D:
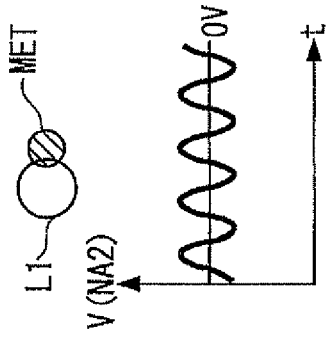

The position detection circuit 56 included in the power receiving device 40 shown in FIG. 3 checks whether or not the power-receiving-side instrument 510 is placed at an appropriate position (position detection) (step S3) based on a direct-current voltage (ADIN) obtained by rectifying the induced voltage in the secondary coil (L2), for example. FIG. 16 is a view illustrative of the position detection principle. As shown in FIG. 16, the voltage level of the direct-current voltage ADIN changes corresponding to the positional relationship between the primary coil (L1) and the secondary coil (L2).

For example, a direct-current voltage (ADIN) at a given level (level V3) cannot be obtained when the power-receiving-side instrument is placed at an inappropriate position (i.e., the power-receiving-side instrument is determined to be placed at an inappropriate position). The position detection result may be transmitted from the power receiving device 40 to the power transmitting device 10 utilizing load modulation, for example. The power receiving device 40 may notify the power transmitting device 10 that the power-receiving-side instrument is placed at an inappropriate position by not transmitting the ID authentication information to the power transmitting device 10 within a given period of time after receiving temporary power transmission.

Again referring to FIG. 8, when the power transmitting device 10 has succeeded in ID authentication (step S4), the power transmitting device 10 starts normal power transmission (step S6). The power transmitting device 10 performs metal foreign object detection (step S7) and takeover state detection by means of regular load change detection (steps S8 and S9) during normal power transmission. The power transmitting device 10 also detects removal (leave) of the power-receiving-side instrument 510 (step S10). When the power transmitting device 10 has detected a metal foreign object, a takeover state, or removal of the power-receiving-side instrument 510 (step S11), the power transmitting device 10 stops normal power transmission, and returns to the step S1 (automatic intermittent operation).

A metal foreign object (step S7) and a takeover state (step S10) may be detected based on a change in the waveform of an induced voltage signal of the primary coil (L1). The details are described below.

FIGS. 17A to 17F are views illustrative of the principle of metal foreign object (conductive foreign object) detection. FIGS. 17B to 17F show changes in an induced voltage signal (V(NA2)) of the primary coil L1 shown in FIG. 17A corresponding to the relative positions of the primary coil and a metal foreign object (conductive foreign object) MET. As shown in FIGS. 17B to 17F, the waveform (amplitude) of the induced voltage signal V(NA2) when the metal foreign object MET is absent (FIG. 17F) differs from the waveform (amplitude) of the induced voltage signal V(NA2) when the metal foreign object (MET) is present (FIGS. 17B to 17E). Therefore, the presence or absence of the metal foreign object (MET) can be detected by monitoring the waveform of the induced voltage signal V(NA2) of the primary coil (L1) using the waveform monitor circuit 14 (see FIG. 3). The term "waveform monitoring" includes monitoring the amplitude, monitoring the phases of a current and a voltage, and the like.

Figure 18A:
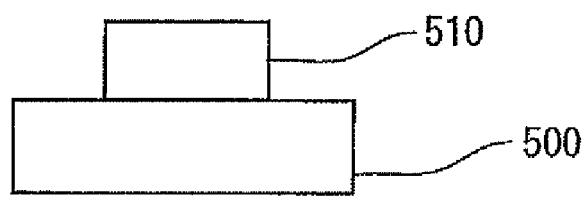
FIGS. 18A to 18D are views illustrative of the principle of removal (leave) detection.
Figure 18B:
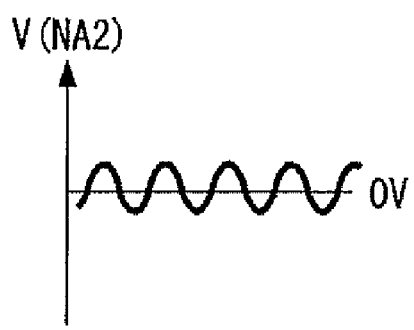
Figure 18C:
Figure 18D:
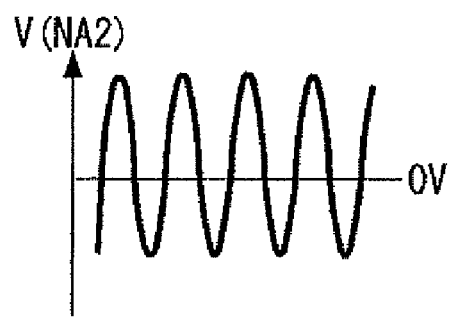

FIGS. 18A to 18D are views illustrative of the principle of removal detection. When the power-receiving-side instrument 510 is placed as shown in FIG. 18A, the induced voltage signal V(NA2) of the primary coil (L1) has a waveform shown in FIG. 18B. When the power-receiving-side instrument 510 has been removed as shown in FIG. 18C, the induced voltage signal V(NA2) of the primary coil (L1) has a waveform shown in FIG. 18D. The waveform (amplitude) shown in FIG. 18D clearly differs from the waveform shown in FIG. 18B. Therefore, whether or not the power-receiving-side instrument has been removed can be detected by monitoring the waveform of the induced voltage signal V(NA2) of the primary coil (L1) using the waveform monitor circuit 14 (see FIG. 3).

Whether or not a takeover state has occurred may be detected (step S9 in FIG. 8) by determining whether or not the power-transmitting-side instrument can detect an intermittent (e.g., regular) load modulation signal from the power-receiving-side instrument (described later).

Again referring to FIG. 8, when the power-transmitting-side control circuit 22 of the power transmitting device 10 has detected the full-charge notification (that indicates that the battery has been fully charged) transmitted from the receiving device 40 (step S13), the power-transmitting-side control circuit 22 stops normal power transmission (step S14), and transitions to the monitoring step after full-charging (step SD).

The full-charge detection circuit 62 included in the power receiving device 40 shown in FIG. 3 detects whether or not the battery 94 has been fully charged. When the full-charge detection circuit 62 has detected that the battery 94 has been fully charged, the power-receiving-side control circuit 52 included in the power receiving device 40 transmits the full-charge notification to the power transmitting device 10. When the power-transmitting-side control circuit 22 of the power transmitting device 10 has detected the full-charge notification transmitted from the power receiving device 40, the power-transmitting-side control circuit 22 performs the monitoring step after full-charging (step SD).

The monitoring step after full-charging (step SD) includes an intermittent power transmission step in a cycle T1 (step S15), a removal detection step (step S16) (steps S15 and S16 are used to detect removal after full-charging), an intermittent power transmission step in a cycle T2 (step S17), and a recharge request detection step (step S18) (steps S17 and S18 are used to detect whether or not recharging is necessary). Therefore, the power-transmitting-side control circuit 22 can monitor the load state after the load (battery) 94 of the power-receiving-side instrument 510 has been fully charged to automatically resume recharging.

Specifically, when the power-receiving-side instrument 510 remains on the cradle 500 after full-charging, the load (battery) 94 is discharged with the passage of time so that recharging may be required. Therefore, the power-transmitting-side control circuit 22 performs intermittent power transmission in an appropriate cycle after a full-charge state has been detected instead of normal power transmission to automatically determine whether or not the load must be recharged, and resumes normal power transmission (step S6) when recharging is necessary. Therefore, the load (battery) 94 is automatically recharged. Accordingly, even if the power-receiving-side instrument 510 is allowed to stand for a long time after full-charging, the load (battery) 94 has been necessarily fully charged when the user uses the power-receiving-side instrument 510. This prevents a situation in which the battery becomes charged insufficiently due to discharge. Therefore, convenience to the user can be improved.

Note that it is unnecessary to manage recharging when the power-receiving-side instrument has been removed after full-charging. Therefore, it is desirable that the power-transmitting-side control circuit 22 perform intermittent power transmission for removal detection after full-charging in addition to intermittent power transmission for recharge management (step S15). For example, it may be determined that the power-receiving-side instrument 510 has been removed when no response is transmitted from the power-receiving-side instrument 510 after intermittent power transmission for removal detection has been performed. When the power-transmitting-side control circuit 22 included in the power transmitting device 10 has detected removal of the power-receiving-side instrument 510, the power-transmitting-side control circuit 22 returns to the initial state (i.e., a state in which intermittent temporary power transmission is performed). It is unnecessary to frequently perform intermittent power transmission for removal detection and intermittent power transmission for recharge management. It is desirable to perform intermittent power transmission for removal detection and intermittent power transmission for recharge management in an appropriate cycle in order to prevent an unnecessary increase in power consumption. Therefore, intermittent power transmission for removal detection is performed in the first cycle T10, and intermittent power transmission for recharge management is performed in the second cycle T20.

The first cycle T10 and the second cycle T20 are provided because it is desirable to optimize the cycle corresponding to the objective. Note that the first cycle T10 and the second cycle T20 may be the same. The term "full charge" used herein may be broadly interpreted as "a state in which the load of the power receiving device 40 is in a given state", for example. Therefore, the term "load" is not limited to a battery. For example, a given circuit of the power-receiving-side instrument 510 may serve as a load. For example, a state in which a given circuit that has operated by receiving power from the power transmitting device need not operate corresponds to a state in which the load has been fully charged. Such a case is also included in the technical scope of the aspect of the invention.

It is desirable that the cycle of intermittent temporary power transmission (i.e., the cycle of the automatic intermittent operation in the step S1 shown in FIG. 8) be very short (e.g., 0.5 seconds) in order to quickly detect installation of the power-receiving-side instrument 510. On the other hand, the cycle of removal detection after full-charging may be longer than the cycle of temporary power transmission. Specifically, unnecessary power consumption increases if removal detection is frequently performed. Therefore, the first cycle T10 of removal detection after full-charging is set at a value (e.g., 5 seconds) longer than the cycle of temporary power transmission to suppress an increase in power consumption. Whether or not recharging after full-charging is necessary may be detected at a lower frequency as compared with removal detection after full-charging (i.e., it takes time until the battery that has been fully charged is discharged so that recharging becomes necessary, and no practical problem occurs even if determination as to whether or not recharging is necessary is delayed to some extent). Therefore, the second cycle T20 of full-charge detection is set at a value (e.g., 10 minutes) longer than the first cycle T10. This enables intermittent power transmission to be performed in a cycle corresponding to the objective so that power consumption can be minimized.

Figure 9:
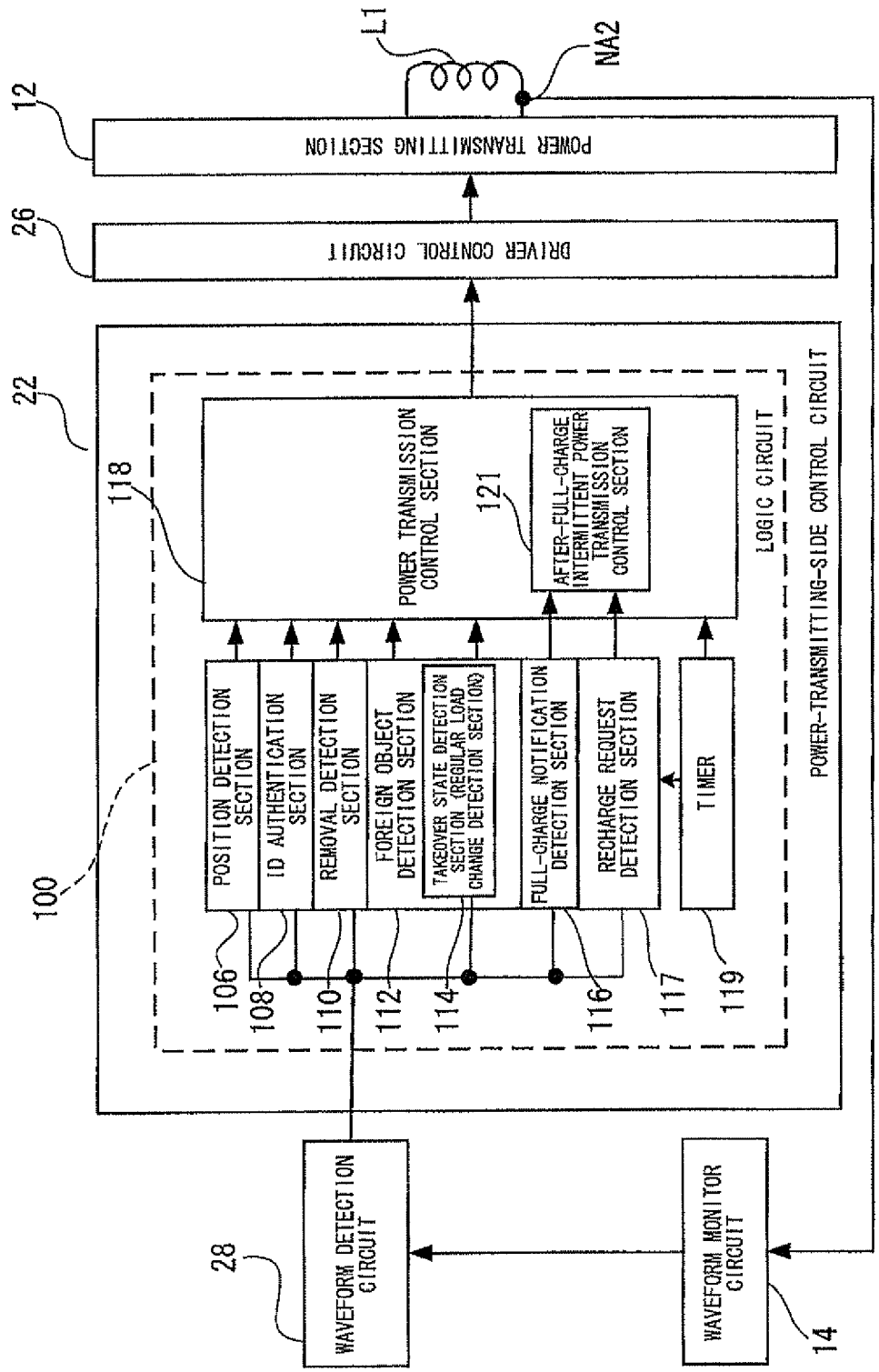
FIG. 9 is a circuit diagram showing an example of the configuration of a power-transmitting-side control circuit.

Example of configuration of power-transmitting-side control circuit in automatic mode FIG. 9 is a circuit diagram showing an example of the configuration of the power-transmitting-side control circuit in the automatic mode. As shown in FIG. 9, the power-transmitting-side control circuit 22 includes a logic circuit 100. The logic circuit 100 includes a position detection section 106, an ID authentication section 108, a removal detection section 110, a foreign object detection section 112 (including a takeover state detection section 114), a full-charge notification (power transmission stop request) detection section 116, a recharge request detection section 117, a time-management timer 119, and a power transmission control section 118 that ON/OFF-controls power transmission (temporary power transmission and normal power transmission) based on the detection result of each section. The power transmission control section 118 includes an after-full-charge intermittent power transmission control section 121.

Figure 10:
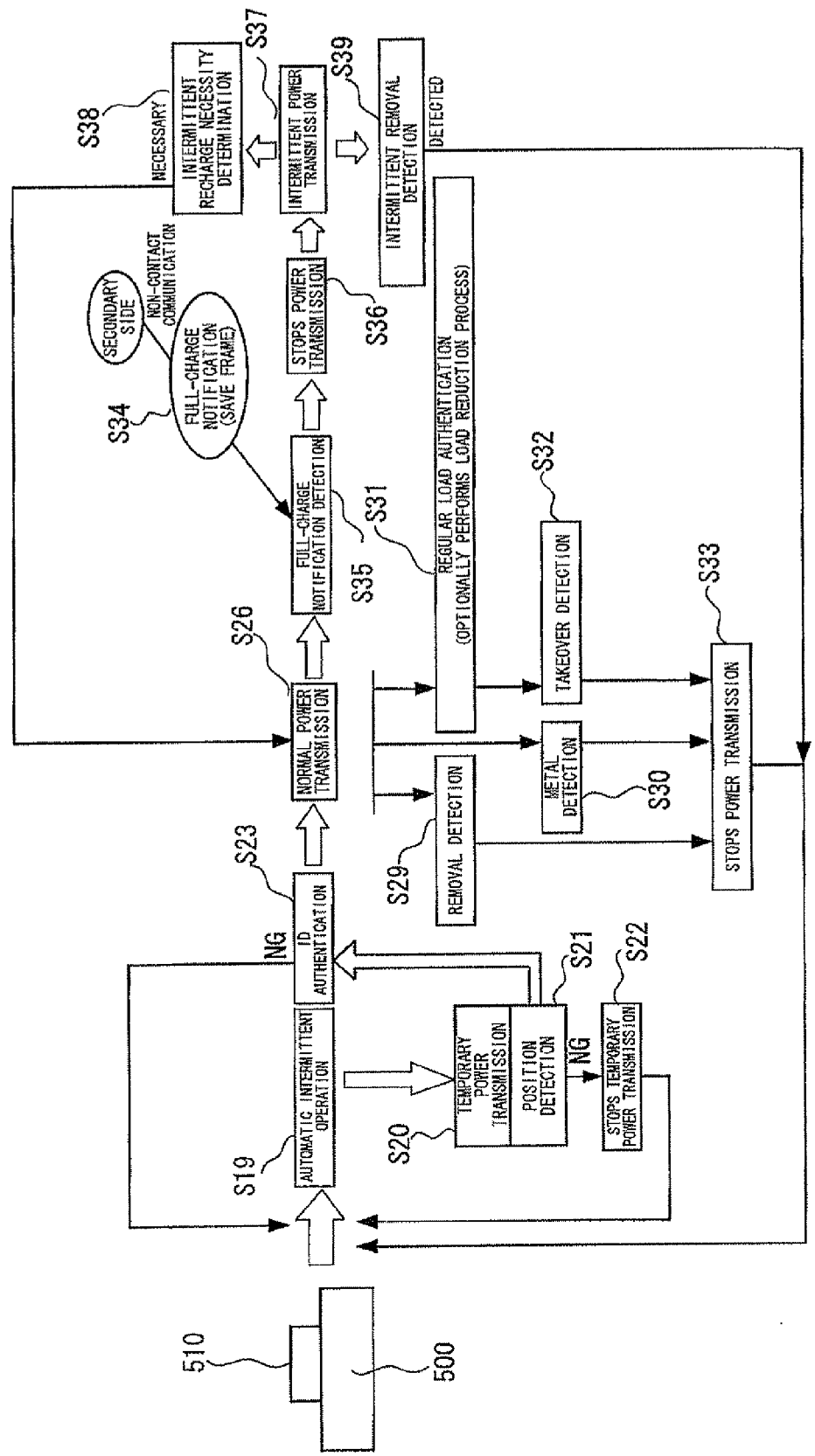
FIG. 10 is a view showing a basic sequence example of a non-contact power transmission system.

Basic sequence example of non-contact power transmission system in automatic mode FIG. 10 is a view showing a basic sequence example of the non-contact power transmission system in the automatic mode. The user places the power-receiving-side instrument 510 at a predetermined position of the charger 500, for example. The power transmitting device 10 performs the automatic intermittent operation to always perform intermittent temporary power transmission (steps S19 and S20). The position of the power-receiving-side instrument 510 that has received temporary power transmission is detected (step S21). When the position of the power-receiving-side instrument 510 is inappropriate, the power transmitting device 10 stops temporary power transmission (step S22).

When the power-receiving-side instrument 510 is placed at an appropriate position, the power transmitting device 10 performs ID authentication (step S23). Specifically, the power receiving device 40 transmits the ID authentication information (e.g., manufacturer information, instrument ID number, and rating information) to the power transmitting device 10.

When ID authentication has been completed successfully, the power transmitting device 10 starts normal power transmission for the power receiving device 40 (step S26). The power transmitting device 10 performs removal detection (step S29), metal foreign object detection (step S30), secondary-side regular load authentication (including an optional secondary-side load reduction process: step S31), and takeover state detection (step S32) during normal power transmission, and stops normal power transmission when one of these states has been detected (step S33). The term "load reduction" accompanying secondary-side regular load authentication refers to a process that reduces (or stops) power supplied to the load when performing load modulation to apparently reduce the load state, since the primary-side instrument may not successfully receive a modulation signal when load modulation is performed in a state in which the load state is heavy (described later with reference to FIG. 23).

In FIG. 10, when the power receiving device 40 has detected a full-charge state, the power receiving device 40 creates the full-charge notification (save frame; power transmission stop request frame), and transmits the full-charge notification to the power transmitting device 10 (step S34). When the power transmitting device 10 has detected the full-charge notification (power transmission stop request frame) (step S35), the power transmitting device 10 stops normal power transmission, and performs intermittent power transmission after full-charging (step S37). The power transmitting device 10 intermittently determines whether or not recharging is necessary (step S38). When the power transmitting device 10 has determined that recharging is necessary, the power transmitting device 10 resumes normal power transmission (step S26). The power transmitting device 10 detects whether or not the power-receiving-side instrument 510 has been removed after full-charging (step S39). When the power transmitting device 10 has detected that the power-receiving-side instrument 510 has been removed, the power transmitting device 10 returns to the initial state.

Figure 11:
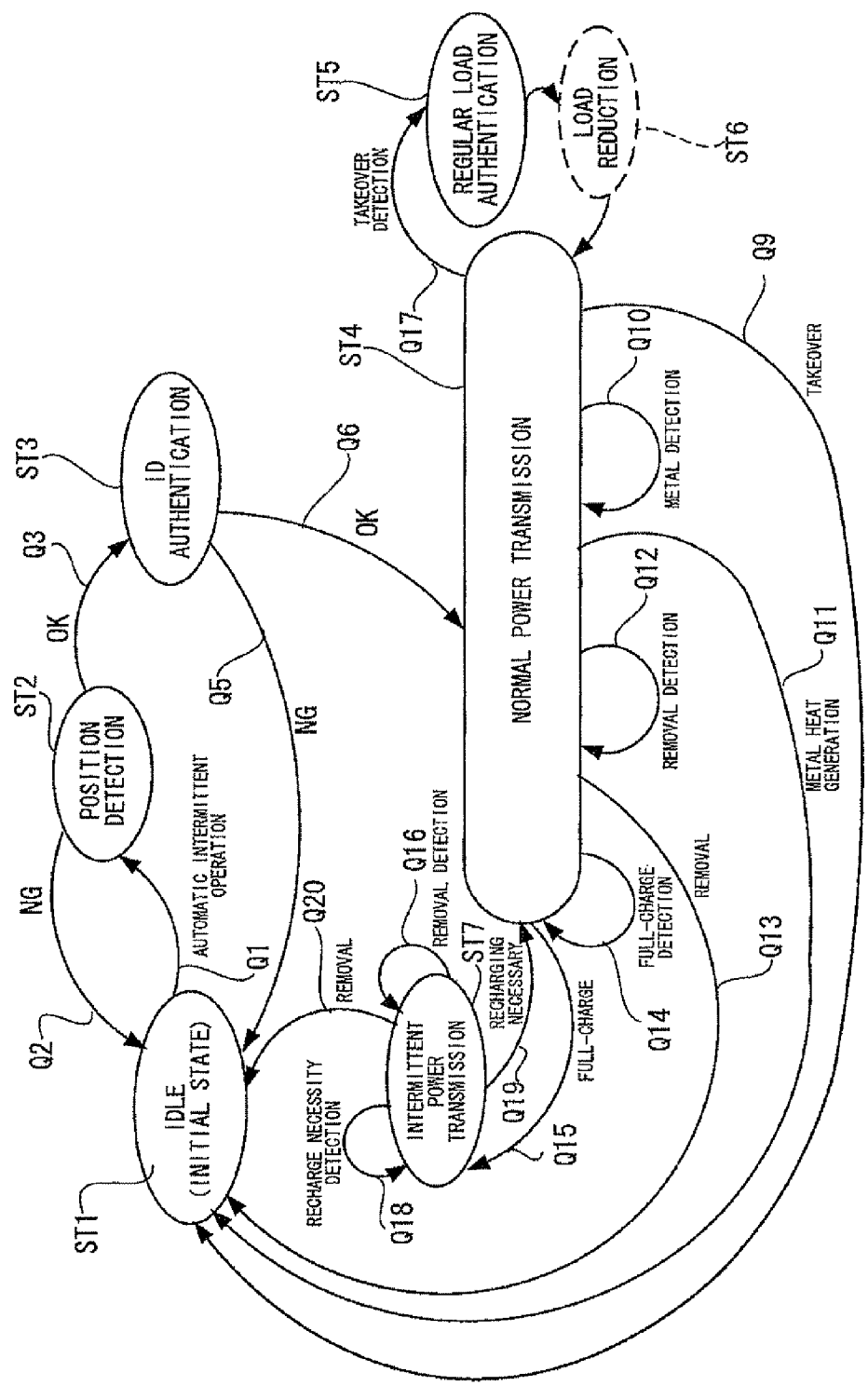
FIG. 11 is a state transition diagram showing the state transition of a non-contact power transmission system that performs the basic sequence shown in FIG. 10.

FIG. 11 is a state transition diagram showing the state transition of the non-contact power transmission system that performs the sequence shown in FIG. 10. As shown in FIG. 11, the state of the non-contact power transmission system is roughly divided into an initial state (idle state: ST1), a position detection state (ST2), an ID authentication state (ST3), a power transmission (normal power transmission) state (ST4), a regular load authentication state (ST5) (and a load reduction state (ST6)), and an intermittent power transmission state after fall-charging (ST7).

The non-contact power transmission system transitions from the state ST1 to the state ST2 when installation of the power-receiving-side instrument has been detected by the automatic intermittent operation (Q1), and returns to the state ST1 (Q2) when the position detection result is inappropriate (NG). When the position detection result is appropriate (OK), the non-contact power transmission system transitions to the state ST3. When ID authentication has been completed successfully (Q6), the non-contact power transmission system transitions to the normal power transmission state (ST4).

The non-contact power transmission system performs removal detection (Q12), metal detection (Q10), takeover state detection (Q17), and full-charge detection (Q14) in the normal power transmission state (ST4). The non-contact power transmission system returns to the initial state when one of these states has been detected (Q9, Q11, and Q13). When a full-charge state has been detected (Q14), the non-contact power transmission system transitions to the intermittent power transmission state ST7 (Q15). The non-contact power transmission system performs recharging necessity detection Q18 and removal detection Q16 in the intermittent power transmission state ST7. When removal of the power-receiving-side instrument 510 has been detected, the non-contact power transmission system returns to the initial state (Q20). When recharging is necessary, the non-contact power transmission system resumes normal power transmission (Q19).

The non-contact power transmission system that performs the basic sequence shown in FIGS. 10 and 11 can automatically detect installation of the power-receiving-side instrument (power transmission target). Therefore, the user need not operate a switch and the like. As a result, a convenient non-contact power transmission system is implemented. Since normal power transmission is performed after ID authentication has been completed successfully, power is not transmitted to an inappropriate instrument. Therefore, reliability and safety are improved. Various detection operations (i.e., removal detection, metal foreign object detection, takeover state detection based on secondary-side regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety). Moreover, since intermittent power transmission for monitoring the load state after full-charging (e.g., intermittent power transmission for removal detection and intermittent power transmission for recharge necessity determination) is performed when a full-charge state (a state in which the load is in a given state in a broad sense) has been detected, the operation that maintains the power-receiving-side instrument in an optimum state is continuously performed even after full-charging. This further satisfies the user.

Figure 12:
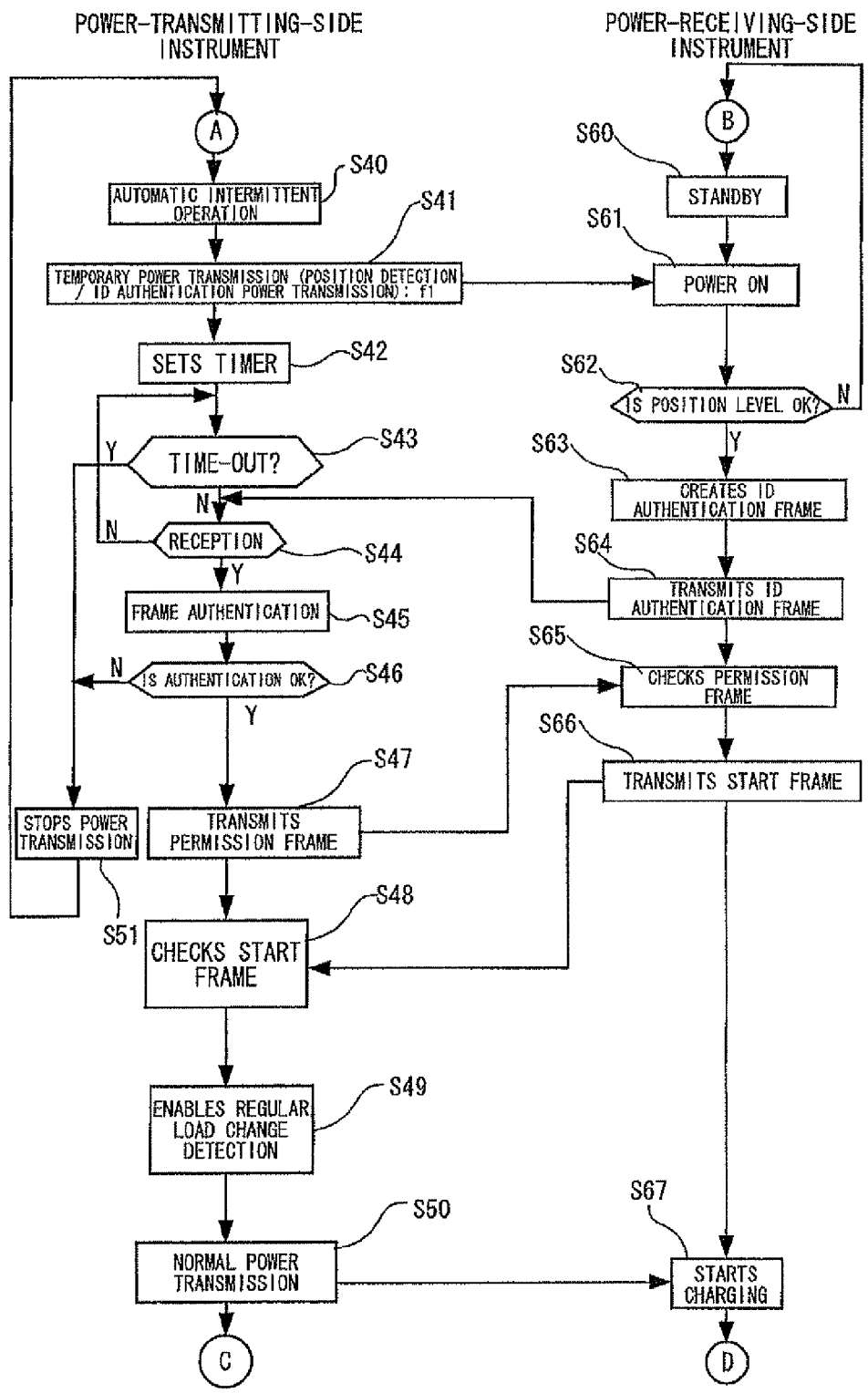
FIG. 12 is a flowchart showing an operation example of a non-contact power transmission system that performs the basic sequence shown in FIG. 10.
Figure 13:
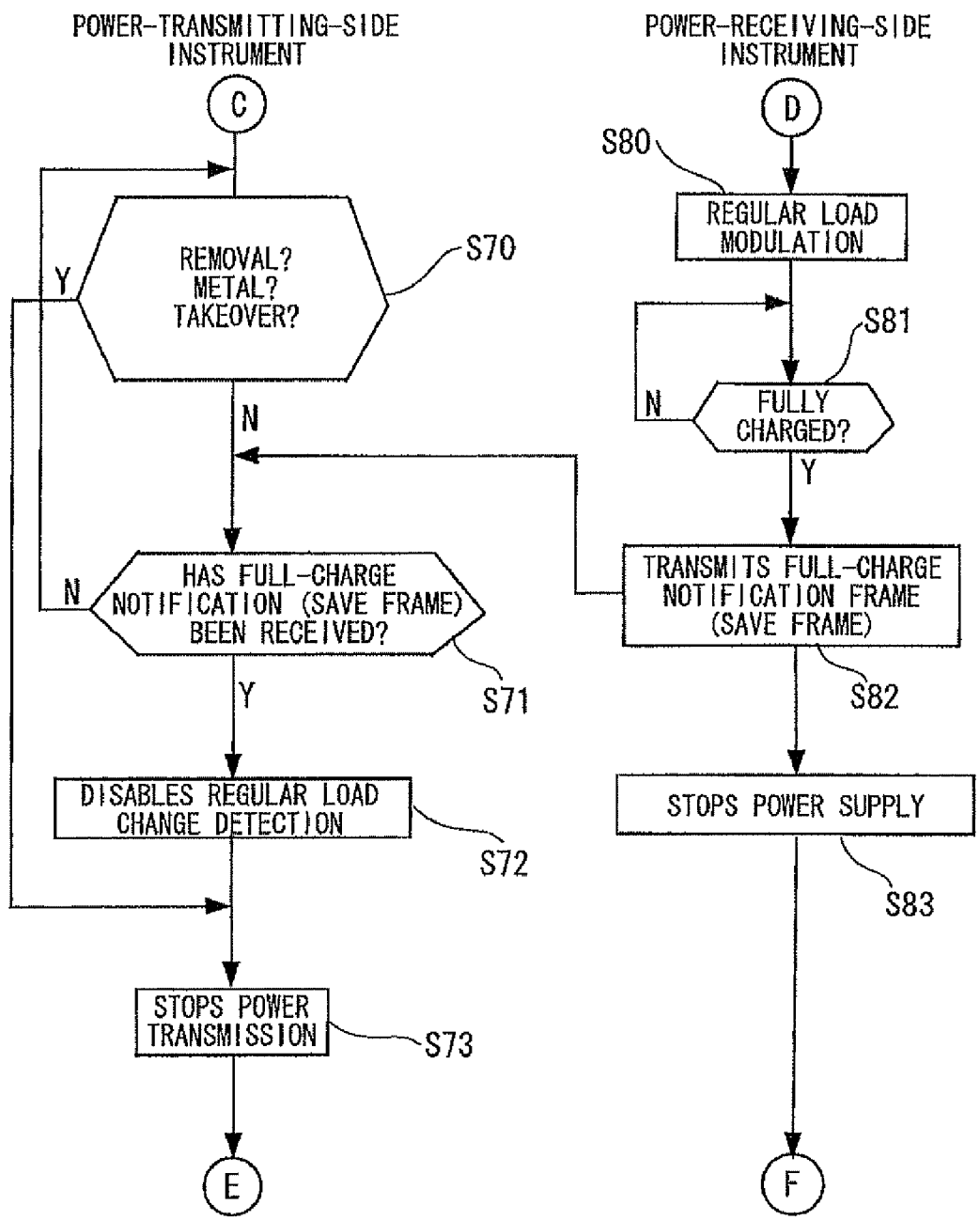
FIG. 13 is a flowchart showing an operation example of a non-contact power transmission system that performs the basic sequence shown in FIG. 10.

FIGS. 12 and 13 are flowcharts showing an operation example of the non-contact power transmission system that performs the basic sequence shown in FIG. 10. In FIGS. 12 and 13, the left side shows a power-transmitting-side (primary side) operation flow, and the right side shows a power-receiving-side (secondary-side) operation flow.

As shown in FIG. 12, the power-transmitting-side control circuit 22 performs the automatic intermittent operation (step S40). Specifically, the power-transmitting-side instrument performs temporary power transmission at given time intervals (e.g., the transmission frequency is f1; step S41), and a timer starts a count operation (step S42).

The power-receiving-side instrument transitions from a standby state (step S60) to a power-ON state (step S61) when the power-receiving-side instrument has received temporary power transmission, and determines the position level (position detection). When the position level is inappropriate (NG), the power-receiving-side instrument returns to the initial state (step S60). When the position level is appropriate (OK), the power-receiving-side instrument generates the ID authentication frame (S63), and transmits the ID authentication frame (step S64).

The power-transmitting-side instrument receives the ID authentication frame (step S44), and determines whether or not a timeout has occurred (step S43). When the power-transmitting-side instrument cannot receive the ID authentication frame within a given period of time, the power-transmitting-side instrument stops temporary power transmission (step S51), and returns to the initial state.

When the power-transmitting-side instrument has received the ID authentication frame within a given period of time, the power-transmitting-side instrument performs a frame authentication process (step S45). When authentication has succeeded (OK), the power-transmitting-side instrument transmits a permission frame to the power-receiving-side instrument (step S47). When authentication has failed (NG), the power-transmitting-side instrument stops temporary power transmission (step S51), and returns to the initial state.

The power receiving device 40 checks the permission frame transmitted from the power transmitting device 10 (step S65), and transmits a start frame to the power transmitting device 10 (step S66).

The power transmitting device 10 checks the start frame (step S48), enables regular load change detection (takeover state detection) (step S49), and starts normal power transmission (step S50). The power receiving device 40 receives normal power transmission, and starts charging the load (e.g., battery) (step S67).

FIG. 13 shows the subsequent flow. The power transmitting device 10 waits for the full-charge notification (power transmission stop request) from the power receiving device 40 (step S71) while performing removal detection, metal foreign object detection, and takeover state detection (step S70).

The power receiving device 40 performs regular load modulation for takeover detection while charging the load (step S80), and detects whether or not the load has been fully charged (step S81). Specifically, the full-charge detection circuit 62 determines that the load has been fully charged when the light-emitting diode LEDR has been turned OFF for a given period of time (e.g., 5 seconds). When the power receiving device 40 has detected that the load has been fully charged, the power receiving device 40 transmits the full-charge notification frame (save frame; power transmission stop request) to the power transmitting device 10 (step S82).

When the power transmitting device 10 has received the full-charge notification frame (save frame; power transmission stop request) from the power receiving device 40, the power transmitting device 10 disables regular load change detection (step S72), and stops power transmission (step S73).

Takeover State Detection

The details of takeover state detection (measures against takeover heat generation) are described below. The takeover state is considered to be a special form of foreign object insertion. The takeover state refers to a state in which the power-transmitting-side instrument continuously performs normal power transmission while erroneously regarding a foreign object as the power-receiving-side instrument. For example, when a thin metal sheet has been inserted between the primary coil and the secondary coil to block the primary coil and the secondary coil, since a considerable load is always present with respect to the power-transmitting-side instrument, it is difficult to detect removal of the power-receiving-side instrument, for example.

Measures Against Takeover Heat Generation

The takeover state is described in detail below. For example, a large foreign object may be inserted between the primary coil L1 and the secondary coil L2 after the power receiving device (or the power-receiving-side instrument) has been authenticated and normal power transmission has started. A metal foreign object can be detected by monitoring the induced voltage in the primary coil (L1), as described with reference to FIG. 17.

However, when a metal foreign object (e.g., thin metal sheet) that blocks the primary coil and the secondary coil has been inserted between the power-transmitting-side instrument and the power-receiving-side instrument (see FIG. 19B), the energy transmitted from the primary-side instrument is consumed by the metal foreign object (i.e., the metal foreign object serves as a load). Therefore, the power transmitting device 10 regards the metal foreign object as the load (power-receiving-side instrument). Accordingly, a situation in which removal of the power-receiving-side instrument cannot be detected based on the induced voltage in the primary coil L1 as described with reference to FIG. 18 may occur, for example. In this case, power transmission from the power transmitting device 10 is continuously performed although the power-receiving-side instrument is absent so that the temperature of the metal foreign object increases to a large extent.

A phenomenon in which a metal foreign object takes over the power-receiving-side instrument 510 in this way is referred to as "takeover (phenomenon)". In order to improve the safety and reliability of the non-contact power transmission system to a practical level, it is necessary to take sufficient measures against such takeover heat generation. A foreign object may be inserted accidentally or intentionally. When a foreign object that may take over the power-receiving-side instrument 510 has been inserted, a skin burn or damage to or destruction of the instrument may occur due to heat generation. Therefore, sufficient safety measures against foreign object insertion must be taken for the non-contact power transmission system. Measures against takeover heat generation are described in detail below.

Figure 19A:
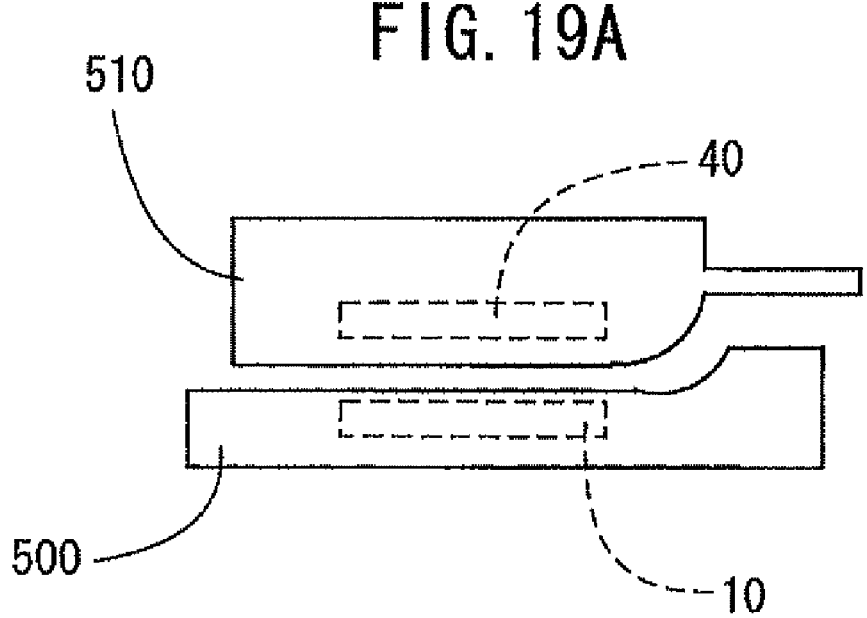
FIGS. 19A and 19B are cross-sectional views of electronic instruments that form a non-contact power transmission system which are illustrative of foreign object insertion (takeover state) after normal power transmission has started.
Figure 19B:
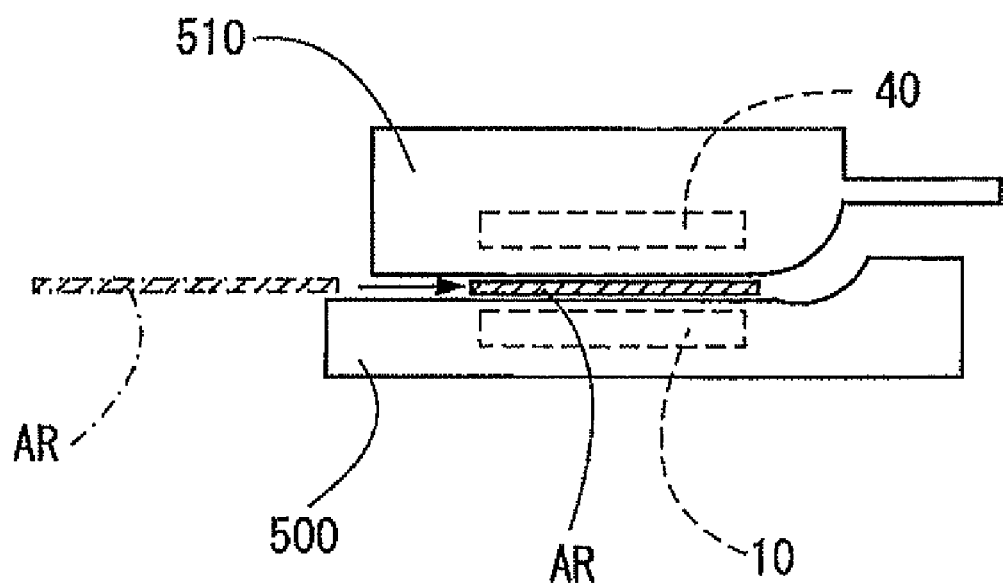

FIGS. 19A and 19B are cross-sectional views showing electronic instruments that form a non-contact power transmission system which are illustrative of insertion of a foreign object (takeover state) after normal power transmission has started.

In FIG. 19A, the portable telephone 510 (electronic instrument including the power receiving device 40) is placed at a predetermined position on the cradle 500 (electronic instrument including the power transmitting device 10). Non-contact power transmission is performed from the cradle 500 (charger) to the portable telephone 510 through the primary coil L1 and the secondary coil L2 so that the secondary battery (e.g., battery pack) 94 provided in the portable telephone 510 is charged.

In FIG. 19B, a thin sheet-shaped metal foreign object (conductive foreign object) AR is intentionally inserted between the cradle 500 (charger) and the portable telephone 510 during normal power transmission. When the foreign object AR has been inserted, power supplied from the primary-side instrument (cradle 500) to the secondary-side instrument (portable telephone terminal 510) is almost entirely consumed by the foreign object (AR) (i.e., the transmitted power is taken over), whereby the foreign object AR is likely to generate heat. Therefore, when the state shown in FIG. 19B has occurred, the power transmitting device 10 included in the primary-side instrument (cradle 500) must detect insertion of the foreign object AR and immediately stop normal power transmission.

However, it is difficult to detect the takeover state shown in FIG. 19B using the metal foreign object detection method described with reference to FIG. 17.

For example, the amplitude of the voltage induced in the primary coil L1 increases as the load of the power receiving device increases, and the amplitude of the voltage induced in the primary coil L1 decreases as the load of the power receiving device decreases. If the secondary battery 94 of the portable telephone 510 is normally charged, the load of the power receiving device 40 gradually decreases with the passage of time. When the load of the power receiving device 40 has rapidly increased, the power transmitting device 10 can detect the rapid increase in load since the power transmitting device 10 monitors a change in the load of the power receiving device 40. However, the power transmitting device 10 cannot determine whether the increase in load has occurred due to the load (secondary battery 94 of portable telephone terminal), mispositioning between the portable telephone terminal 510 and the cradle 500, or insertion of a foreign object. Therefore, insertion of a foreign object cannot be detected using the method in which the power transmitting device 10 merely detects a change in the load of the power receiving device 40.

In the invention, the power receiving device 40 intermittently changes the power-receiving-side load with respect to the power transmitting device 10 during normal power transmission while supplying power to the load (e.g., secondary battery) (regular load modulation operation) to transmit information to the power transmitting device 10.

The following items are confirmed when the power transmitting device 10 has detected the information due to an intermittent change in load at a given timing.

(1) The instrument (i.e., portable telephone 510) including the power receiving device 40 is appropriately placed on the instrument (i.e., cradle 500) including the power transmitting device 10.

(2) The instrument (including the secondary battery of the portable telephone 510) including the power receiving device 40 is operating normally.

(3) The foreign object AR is not inserted.

When the foreign object AR has been inserted during normal power transmission, the information transmitted from the power receiving device 40 is blocked by the foreign object AR and does not reach the power transmitting device 10. Specifically, the power transmitting device 10 cannot detect an intermittent (e.g., regular) change in the load of the power receiving device. It is most likely that an intermittent change in load cannot be detected after the above-mentioned items (1) to (3) have been confirmed because the foreign object AR has been inserted (item (3)). Specifically, the power transmitting device 10 can determine that the power transmitting device 10 has become unable to detect an intermittent change in load due to insertion of the foreign object AR.

Figure 20A:
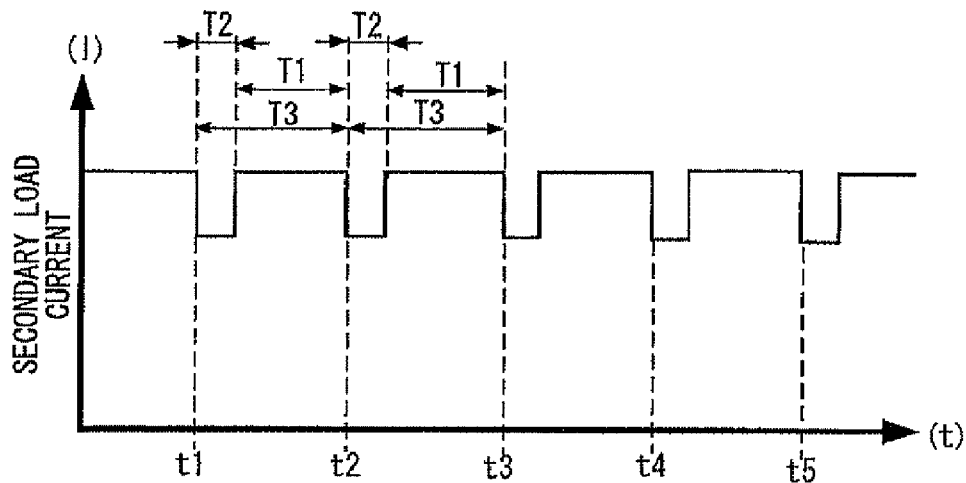
FIGS. 20A and 20B are views illustrative of a specific embodiment when intermittently changing the load of a power receiving device so that insertion of a foreign object can be detected.
Figure 20B:
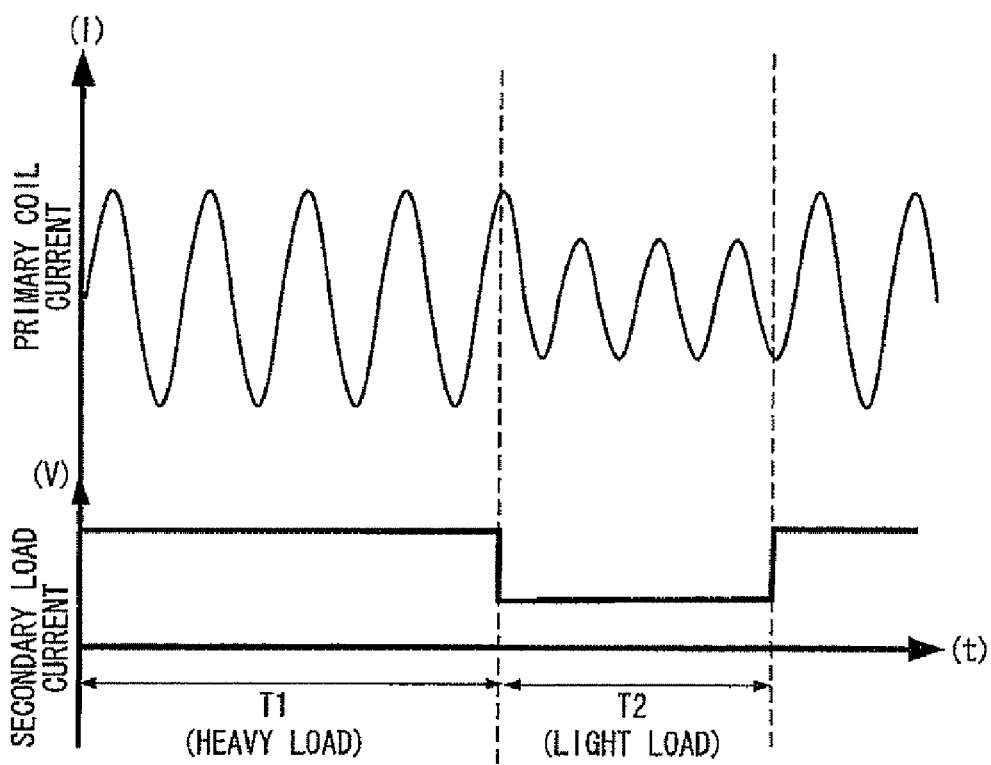

FIGS. 20A and 20B are views illustrative of a specific embodiment when intermittently changing the power-receiving-side load so that insertion of a foreign object can be detected.

In FIG. 20A, an intermittent change in the power-receiving-side load is indicated by a change in secondary current (current that flows through the secondary coil L2). As shown in FIG. 20A, the power-receiving-side load intermittently changes at times t1, t2, t3, t4, t5, . . . .

In FIG. 20A, the load changes in a cycle T3. The load decreases in a period T2 starting from the time t1, and increases in the subsequent period T1, for example. Such a cyclic change in load is repeated in the cycle T3.

FIG. 20B shows a change in primary coil voltage (induced voltage at one end of the primary coil) with respect to a change in secondary load current. The secondary-side load is heavy in the period T1, and is light in the period T2, as described above. The amplitude (peak value) of the induced voltage (primary coil voltage) at one end of the primary coil (L1) changes corresponding to the change in secondary-side load. Specifically, the amplitude increases in the period T1 in which the load is heavy, and decreases in the period T2 in which the load is light. Therefore, the power transmitting device 10 can detect a change in the load of the power receiving device 40 by detecting the peak of the primary coil voltage using the waveform detection circuit 28 (see FIG. 3), for example. Note that the load change detection method is not limited to the above-described method. For example, the phase of the primary coil voltage or the phase of the primary coil current may be detected.

The load can be easily modulated by switching the transistor, for example. The peak voltage of the primary coil or the like can be accurately detected using an analog or digital basic circuit. Therefore, the above method does not impose load on the instrument to a large extent while facilitating implementation. The above-described method is also advantageous in terms of a reduction in mounting area and cost.

As described above, insertion of a foreign object can be easily and accurately detected without adding a special configuration by employing a novel method in which the power receiving device 40 transmits information obtained by intermittently (and cyclically) changing the load during normal power transmission and the power transmitting device 10 detects the change in load.

Specific Example of Detection of Foreign Object Insertion

Figure 21:
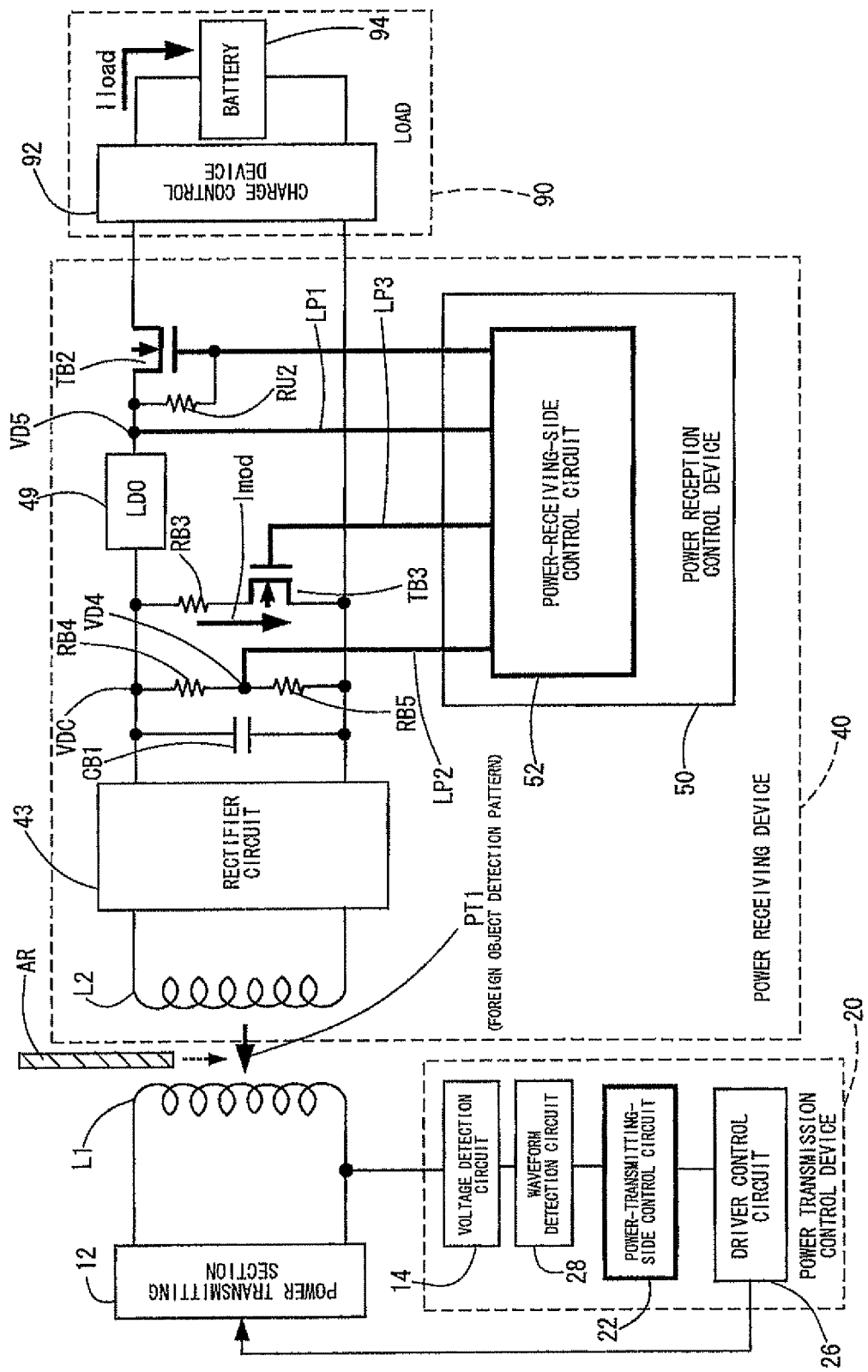
FIG. 21 is a circuit diagram showing the main configuration of the non-contact power transmission system shown in FIG. 3 relating to detection of foreign object insertion (takeover state).

FIG. 21 is a circuit diagram showing the main configuration of the non-contact power transmission system shown in FIG. 3 relating to detection of foreign object insertion (takeover state). In FIG. 21, the same sections as in FIG. 3 are indicated by the same reference symbols. In FIG. 21, a bold line indicates a portion that plays an important role in detecting foreign object insertion.

A notable circuit configuration of the power receiving device 40 shown in FIG. 21 includes the load modulation transistor TB3 of the load modulation section 46 (see FIG. 3), the power supply control transistor TB2 of the power supply control section 48 (see FIG. 3), and the power-receiving-side control circuit 52 that ON/OFF-controls these transistors (TB2 and TB3). It is also important that the voltages at the input terminal and the output terminal of the series regulator (LDO) 49 are input to the power-receiving-side control circuit 52 through the signal lines LP2 and LP1 so that the load state (degree of load) of the battery 94 (secondary battery) included in the load 90 can be detected by monitoring the voltage across the series regulator (LDO) 49.

The configuration of the power transmission control device 20 of the power transmitting device 10 (see FIG. 3) is also important. Specifically, it is important that the peak value (amplitude) of the induced voltage in the primary coil (L1) is detected by the waveform detection circuit 28 and a change in the load of the power receiving device 40 is detected by the power-transmitting-side control circuit 22.

In FIG. 21, the power receiving device 40 modulates the load during normal power transmission (continuous power transmission after authentication), and transmits a foreign object detection pattern PT1 to the power transmitting device 10. The power-transmitting-side control circuit 22 of the power transmitting device 10 (successively or intermittently) monitors a change in the load of the power receiving device 40 during normal power transmission. The power-transmitting-side control circuit 22 determines that the foreign object AR has been inserted when the power-transmitting-side control circuit 22 has become unable to receive the foreign object detection pattern PT1, and stops normal power transmission.

Specific Embodiment of Foreign Object Detection Pattern PT1

Figure 22A:
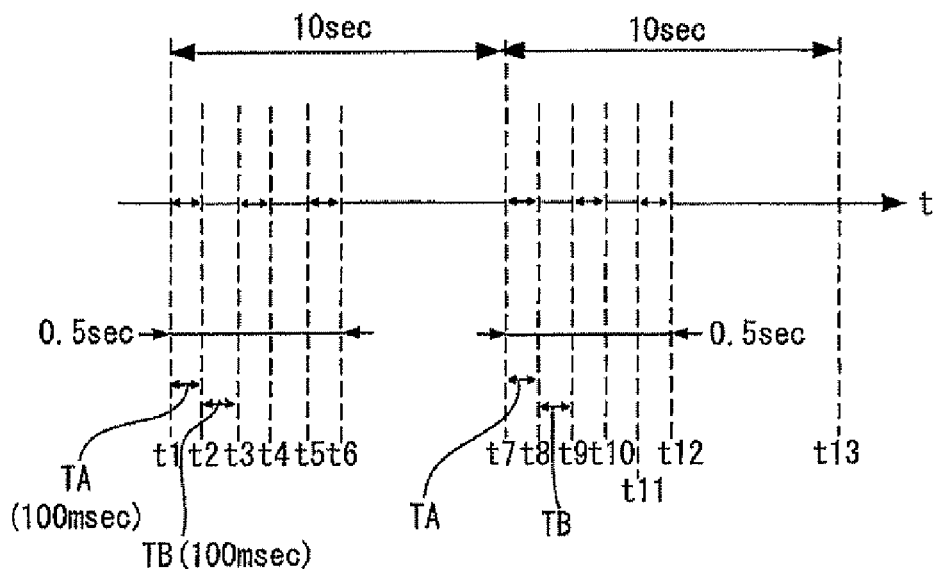
FIGS. 22A and 22B are views illustrative of a specific preferred embodiment of load modulation that enables foreign object detection.
Figure 22B:
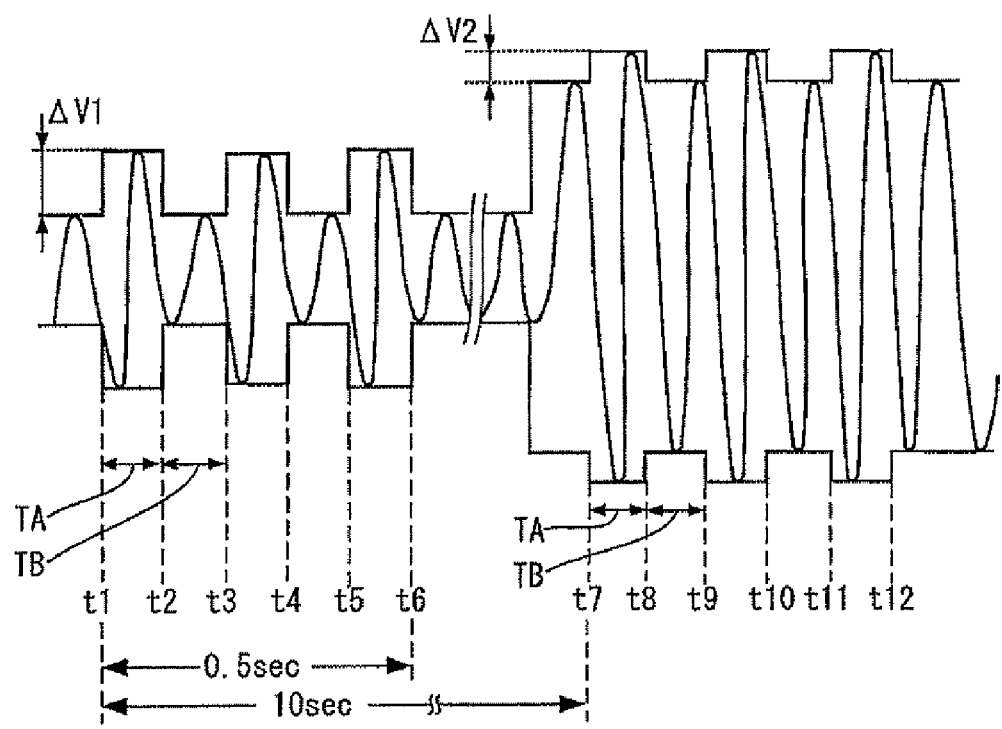

FIGS. 22A and 22B are views illustrative of a specific preferred embodiment of load modulation that enables foreign object detection. FIG. 22A is a view showing a load modulation timing example, and FIG. 22B is a view showing a change in the load of the power receiving device detected by the power transmitting device in detail.

As shown in FIG. 22A, load modulation that enables foreign object detection is cyclically (regularly) performed in a cycle of 5 seconds (10 seconds), for example.

Load modulation that enables foreign object detection is performed in a period from a time t1 to a time t6 and a period from a time t7 to a time t12. The period from the time t1 to the time t6 (from the time t7 to the time t12) is 0.5 seconds. The degree of load is changed in units of 0.1 seconds (100 msec) obtained by equally dividing 0.5 seconds by five.

In FIG. 22A, a bold bidirectional line indicates a period in which the load is heavy. Specifically, the load increases in a period from the time t1 to the time t2, a period from the time t3 to the time t4, a period from the time t5 to the time t6, a period from the time t7 to the time t8, a period from the time t9 to the time t10, and a period from the time t11 to the time t12. A period in which the load increases is referred to as a period TA.

The load decreases in a period from the time t2 to the time t3, a period from the time t4 to the time t5, a period from the time t8 to the time t9, and a period from the time t10 to the time t11. A period in which the load decreases is referred to as a period TB.

In FIG. 22A, the power-receiving-side load is intermittently changed cyclically (i.e., in cycle units (in units of one cycle)) during normal power transmission, and the load is intermittently changed a plurality of times at given intervals within one cycle.

The power transmitting device 10 and the power receiving device 40 can transfer the information relating to a change in load in synchronization by cyclically changing the load (i.e., the power transmitting device 10 can easily determine the timing at which the load of the power receiving device 40 changes).

In FIG. 22A, the load is intermittently changed a plurality of times at given intervals only in a given period (from the time t1 to the time t6) within one cycle (e.g., from the time t1 to the time t7). Specifically, load modulation is performed only in the first period (0.5 sec) of one cycle (10 sec). The reasons that the load is modulated in this manner are as follows.

Specifically, since a change in load (load modulation) during normal power transmission may affect power supply to the load (battery 94 shown in FIG. 21), it is undesirable to frequently change the load to a large extent. Therefore, one cycle of load modulation is increased to some extent (a foreign object can be detected even if the cycle of load modulation is increased to some extent).

The load is intermittently changed a plurality of times at given intervals only in a given period within one cycle. Specifically, when the load change interval is increased to a large extent, the power transmitting device may not appropriately detect an intermittent change in the load of the power receiving device due to a change in the load state of the load with the passage of time or a change in surrounding conditions. Therefore, one cycle is increased (10 seconds in FIG. 22A), and the load is intermittently modulated a plurality of times (five times in FIG. 22A) only in a short period (0.5 seconds in FIG. 22A) within one cycle, for example.

The power transmitting device 10 can detect a foreign object (AR) with high accuracy while minimizing an effect on power supply to the load (94) (e.g., charging a battery pack) by performing load modulation in this manner.

FIG. 22B shows an example of a change in the amplitude of the induced voltage at one end of the primary coil (L1) of the power transmitting device 10 corresponding to the load of the power receiving device. In FIG. 22B, the load state of the load (battery 94) differs between a load modulation period (t1 to t6) in the first cycle and a load modulation period (t7 to t12) in the second cycle. The load state of the load battery 94) increases in the second cycle so that the peak value of the primary coil voltage increases.

At the time t1 to the time t6 in FIG. 22B, the difference between the primary coil voltage in the period TA in which the load increases and the primary coil voltage in the period TB in which the load decreases is $\Delta V1$. The power-transmitting-side control circuit 22 of the power transmitting device 10 can detect a change in the load of the power receiving device 40 from the difference $\Delta V1$ in the amplitude of the primary coil voltage.

In the second load modulation period (t7 to t12), since the load state of the load (battery 94) increases so that a charging current (Iload) supplied to the load 94 increases, the ratio of a modulation current (Imod) due to load modulation to the charging current (Iload) decreases so that the difference in primary coil voltage caused by turning the modulation current (Imod) ON/OFF decreases to $\Delta V2$ ($\Delta V2 < \Delta V1$). Specifically, the modulation current (Imod) is buried in the charging current (Iload) supplied to the load (battery 94). Therefore, when the load (battery 94) is heavy, it is difficult for the power transmitting device 10 to detect a change in load as compared with the case where the load is light. In this embodiment, the load state of the load (battery 94) is compulsorily reduced by reducing the amount of power supplied to the load (battery 94) so that the primary-side device can easily detect a change in load due to load modulation. The load reduction measures are described below.

Compulsory Load Reduction Measures

In the invention, since load modulation is performed without stopping power supply to the load 94 during normal power transmission, transmission of the signal due to load modulation to the power transmitting device 10 is always affected by the state of power supply to the load 94 (i.e., the load state of the load).

As described above, even if a small current is turned ON/OFF for load modulation when a large amount of charging current is supplied to the load 94 (e.g., battery pack), since the amount of ON/OFF current (Imod) is smaller than the amount of charging current (Iload) supplied to the load (battery 94), it is difficult for the power transmitting device 10 to detect a change in load due to load modulation (i.e., it is difficult for the power transmitting device 10 to detect whether a change in load is noise or a signal due to load modulation). On the other hand, the relative ratio of the ON/OFF current (Imod) due to load modulation increases when the amount of current supplied to the load 94 is small (when the load is light), so that the power transmitting device 10 can easily detect a change in load due to the ON/OFF operation.

According to this embodiment, the power receiving device 40 monitors the load state of the load 94 during normal power transmission, and the amount of power supplied to the load 94 is compulsorily reduced based on the above consideration when the load 94 is heavy (i.e., a large amount of current is supplied to the load 94) when the power receiving device 40 performs load modulation that enables foreign object detection. The amount of power supplied to the load 94 may be reduced by temporarily (or intermittently) stopping power supply.

Since the load state of the load 94 is apparently reduced by reducing the amount of power supplied to the load 94, the power transmitting device 10 can easily detect the signal due to load modulation. Therefore, the foreign object detection accuracy is maintained at a desired level even when the load 94 is heavy. Since at least a minimum amount of power is always supplied to the load 94 even when compulsorily reducing the load 94, a problem in which the electronic circuit (charge control device 92) of the load 94 cannot operate does not occur.

Moreover, since load modulation that enables detection of foreign object insertion is intermittently performed at appropriate intervals taking the effect on power supply to the load 94 into consideration, power supply to the load 94 is not adversely affected even if the load is compulsorily reduced. For example, a problem in which the charging time of the battery pack increases to a large extent does not occur.

Therefore, the load change detection accuracy of the power transmitting device 10 can be maintained at a desired level even if the load 94 is heavy by causing the power receiving device 40 to monitor the state of the load 94 and compulsorily reduce the load state of the load 94, as required, when performing load modulation which enables detection of insertion of a foreign object.

FIGS. 23A to 23E are views illustrative of the load reduction operation. FIG. 23A is a view showing a state in which the load state of the load is light. FIG. 23B is a view showing a state in which the load state of the load is heavy. FIG. 23C is a view showing a change in primary coil voltage in the state shown in FIG. 23B. FIG. 23D is a view showing a state in which the load is reduced by causing the power supply control transistor to be turned ON/OFF or setting the power supply control transistor in a half ON state. FIG. 23E is a view showing a change in primary coil voltage in the state shown in FIG. 23D.

In FIG. 23A, since the load (battery) 94 is light (i.e., the charging current Iload supplied to the load is small), the power transmitting device 10 can sufficiently detect a change in load due to load modulation without causing the power receiving device 40 to perform the operation of reducing the load. Therefore, the power supply control transistor TB2 is always turned ON. The load modulation transistor TB3 is intermittently turned ON/OFF to implement load modulation.

In FIG. 23B, since the load (battery) 94 is heavy (i.e., the charging current Iload supplied to the load is large), a change in modulation current (Imod) due to the ON/OFF operation is observed to only a small extent. As shown in FIG. 23C, when the load increases, the difference in amplitude of the primary coil voltage decreases from $\Delta V1$ to $\Delta V2$. Therefore, it becomes difficult to detect a change in load due to load modulation.

In FIG. 23D, the power receiving device 40 performs the operation that reduces the load when performing load modulation. In FIG. 23D, the power receiving device 40 causes the power supply control transistor TB2 to be successively turned ON/OFF, or sets the power supply control transistor TB2 in a half ON state.

Specifically, the amount of power supplied to the load 94 can be compulsorily reduced (power supply may be temporarily stopped) using a digital method which causes the power receiving device 40 to successively turn the power supply control transistor TB2 provided in a power supply path ON/OFF to intermittently supply power to the load 94. An operation of successively switching a transistor is generally employed for a digital circuit, and is easily implemented. Moreover, it is possible to accurately reduce the amount of power supplied to the load by selecting the switching frequency.

The amount of power supplied to the load 94 can also be reduced using an analog method in which an intermediate voltage between a complete ON voltage and a complete OFF voltage is supplied to the gate of the power supply control transistor (PMOS transistor) to set the PMOS transistor in a half ON state. This method has an advantage in that the on-resistance of the power supply control transistor (PMOS transistor) can be finely adjusted by controlling the gate voltage.

In FIG. 23E, the amplitude of the primary coil voltage in a state in which the load is heavy changes from V10 to V20 by compulsorily reducing the load. In FIG. 19E, "X" indicates the amount by which the load 94 is compulsorily reduced. The difference in amplitude of the primary coil voltage increases from $\Delta V2$ (see FIG. 23C) to $\Delta V3$ ($\Delta V3 > \Delta V2$) by compulsorily reducing the load 94, whereby the power transmitting device 10 can easily detect a change in the load of the power receiving device 40 due to load modulation.

The power transmitting device can reliably detect a change in load even when the load is heavy by causing the power receiving device to reduce the load (including temporarily stopping the load current) while performing load modulation.

Specific Operation of Power Transmitting Device

A specific operation of the power transmission control device 20 shown in FIG. 21 is described below. As described above, the regular load change detection section 114 (see FIG. 9) of the power-transmitting-side control circuit 22 included in the power transmission control device 20 determines that a foreign object (AR) has been inserted between the primary coil (L1) and the secondary coil (L2) when the regular load change detection section 14 cannot detect an intermittent change in the load of the power receiving device 40 during normal power transmission, and stops power transmission. This reliably prevents heat generation from the foreign object (AR), a skin burn, and damage to and destruction of the instrument. Therefore, highly reliable foreign object insertion measures are implemented for a non-contact power transmission system.

Since it is necessary to carefully determine the presence or absence of insertion of a foreign object, it is preferable that the power-transmitting-side control circuit 22 detect a change in load in cycle units and determine that a foreign object has been inserted between the primary coil and the secondary coil when the power-transmitting-side control circuit 22 cannot detect a change in load over a given number of cycles.

For example, the power-transmitting-side control circuit 22 detects a change in the load of the power receiving device in cycle units, and stops normal power transmission when the power-transmitting-side control circuit 22 cannot detect a change in load over a given number of cycles (e.g., three cycles).

This increases the foreign object insertion detection accuracy, thereby preventing a situation in which the power-transmitting-side control circuit 22 erroneously stops normal power transmission when a change in load cannot be detected due to an accidental factor.

A change in the load of the power receiving device 40 can be detected by detecting the waveform of the induced voltage in the primary coil (L1). The waveform can be detected by the waveform detection circuit 22.

Since the peak value (amplitude) of the waveform of the induced voltage in the primary coil (L1) increases when the load of the power receiving device 40 is heavy and decreases when the load of the power receiving device 40 is light, a change in the load of the power receiving device 40 can be detected by detecting the peak of the waveform. Note that the load change detection method is not limited to the above-described method. For example, a change in load may be detected by detecting the phase of the induced voltage or current in the primary coil.

According to this embodiment, a novel power receiving device 10 having a function of detecting foreign object insertion (takeover) by regular load authentication is implemented. According to this embodiment, insertion of a foreign object between the primary coil and the secondary coil can be accurately detected by simple signal processing while reducing the number of parts to implement highly reliable safety measures relating to non-contact power transmission.

Moreover, the power transmission stop function due to regular load authentication can be utilized to compulsorily stop inappropriate power transmission in addition to detect the takeover state. For example, power transmission from the power-transmitting-side instrument is reliably stopped even when removal of the power-receiving-side instrument has not been detected for some reason or the power-receiving-side instrument cannot perform regular load modulation due to breakage or failure. Therefore, the safety and the reliability of the non-contact power transmission system are remarkably improved by providing the regular load authentication function.

Figure 14:
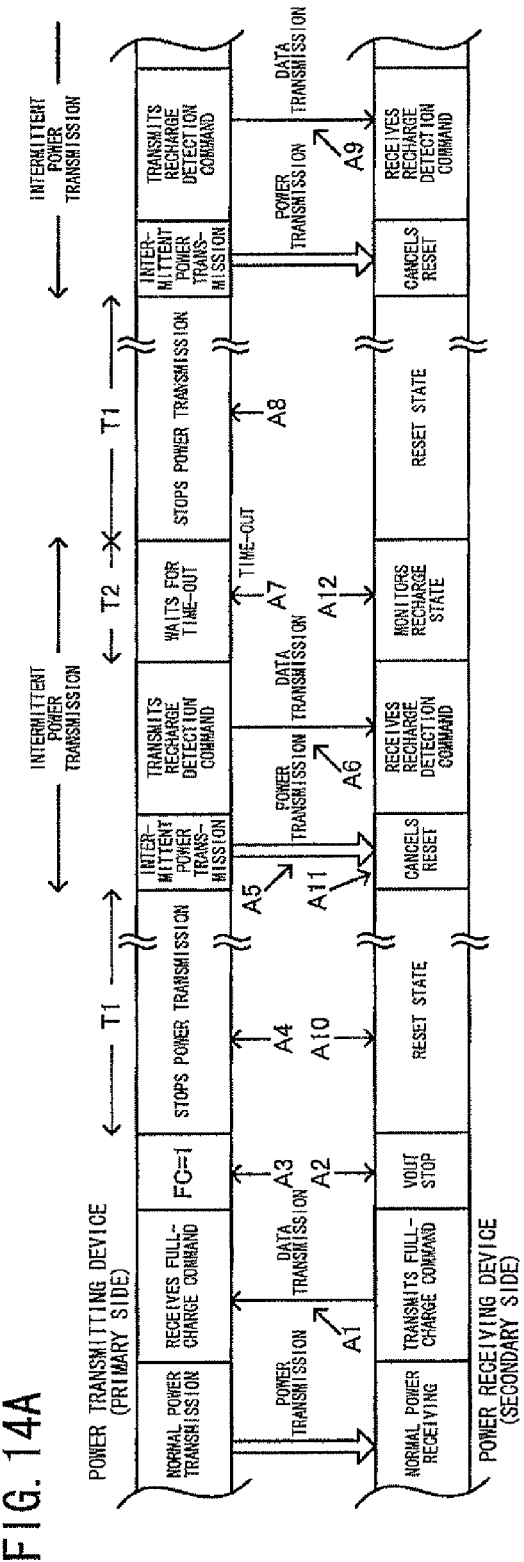
FIGS. 14A and 14B are sequence diagrams showing a series of processes of the non-contact power transmission system that manages recharging after full-charging.

Recharge necessity determination after full-charging and removal detection after full-charging The following description focuses on recharge necessity detection after full-charging and removal detection after full-charging. For example, when the second automatic mode switch SW2a has been turned ON in the non-contact power transmission system shown in FIG. 1C, recharge necessity determination after full-charging and removal detection after full-charging must be automatically performed in addition to automatic installation detection, full-charge detection, and automatic suspension of normal power transmission. In this case, the power-transmitting-side control circuit 22 performs operations shown in FIGS. 14 and 15. These operations are described below.

Recharging after Full-Charging

Recharging after full-charging is described below. When the portable telephone (power-receiving-side instrument) that has been fully charged is placed on the charger (cradle) for a long period of time, the voltage of the battery may decrease due to discharging so that the battery may require recharging, for example. In this embodiment, the power transmitting device can automatically detect necessity of recharging after full-charging.

FIGS. 14A and 14B are sequence diagrams showing a series of processes of the non-contact power transmission system that manages recharging after full-charging. The process shown in FIG. 14B is performed after the process shown in FIG. 14A.

The non-contact power transmission system transitions to a post-full-charge standby mode when the battery 94 (see FIG. 3) has been fully charged. In the post-full-charge standby mode, the power transmitting device 10 intermittently transmits power to the power receiving device 40 while notifying the power receiving device 40 that the power transmitting device 10 is set in the post-full-charge standby mode.

When the power receiving device 40 has been notified that the power transmitting device 10 is set in the post-full-charge standby mode, the power receiving device 40 checks the battery voltage VBAT. When the battery voltage VBAT is equal to or less than the recharge voltage (e.g., 3.9 V), the power receiving device 40 determines that the battery 94 requires recharging, and transmits a recharge command to the power transmitting device 10. Therefore, the power transmitting device 10 resumes normal power transmission to the power receiving device 40. As a result, the battery 94 is recharged. The post-full-charge standby mode is canceled at this time. When the battery voltage VBAT is higher than the recharge voltage, the post-full-charge standby mode is maintained. The details are described below.

When the power receiving device 40 has detected that the battery 94 of the load has been fully charged, the power-transmitting-side control circuit 22 shown in FIG. 3 stops normal power transmission to the power receiving device 40 and performs intermittent power transmission. When the power receiving device 40 has detected that the battery 94 requires recharging during the intermittent power transmission period, the power-transmitting-side control circuit 22 resumes normal power transmission to the power receiving device 40.

When the battery 94 has been fully charged so that the power transmitting device 10 has stopped normal power transmission and then intermittently transmitted power, the power-receiving-side control circuit 52 shown in FIG. 3 transmits a recharge command that indicates information relating to the recharge state of the battery 94 to the power transmitting device 10 in the intermittent power transmission period. In this case, the full-charge state of the battery 94 is detected by the full-charge detection circuit 62, and the recharge state of the battery 94 is monitored by the recharge monitor circuit 64. The term "information relating to the recharge state" refers to information used to determine whether or not the battery 94 requires recharging, and includes information relating to whether or not the battery 94 requires recharging and information relating to the battery voltage VBAT after the battery 94 has been fully charged.

Specifically, as indicated by A1 in FIG. 14A, when the battery 94 has been fully charged, the power-receiving-side control circuit 52 transmits a full-charge command (full-charge information) which indicates that the battery 94 has been fully charged to the power transmitting device 10 by means of load modulation performed by the load modulation section 46, for example. As indicated by A2, the control circuit 52 then stops outputting (supplying) the voltage VOUT to the charge control device 92. For example, the control circuit 52 determines that the battery 94 has been fully charged (charging has been completed) when the full-charge detection circuit 62 has detected that the light-emitting device LEDR used to display the charge state has been turned OFF for 5 seconds, for example. The control circuit 52 then generates a frame for transmitting the full-charge command, and transmits the generated frame to the power transmitting device 10 by means of load modulation by controlling a signal P3Q.

When the power-transmitting-side control circuit 22 has received the full-charge command during normal power transmission to the power receiving device 40, the control circuit 22 sets a full-charge flag FC to "1", as indicated by A3 in FIG. 14A, and stops power transmission to the power receiving device 40 for the first period T1 (e.g., 1 second), as indicated by A4. The control circuit 22 then resumes power transmission (intermittent power transmission), as indicated by A5. The control circuit 22 transmits a recharge detection command which instructs the power receiving device 40 to perform detection of the recharge state of the battery 94 (detection of whether or not the battery 94 requires recharging or detection of the battery voltage after the battery 94 has been fully charged) in the intermittent power transmission period after resuming power transmission, as indicated by A6. Specifically, the power transmitting device 10 generates a frame of the recharge detection command using the method described with reference to FIG. 4A, and transmits the generated frame to the power receiving device 40. When the control circuit 22 has not received the recharge command from the power receiving device 40 until a timeout wait period T2 (e.g., 30 msec; T2<T1 (power transmission suspension period)) has elapsed after the control circuit 22 has transmitted the recharge detection command, the control circuit 22 determines that a timeout has occurred, as indicated by A7. When a timeout has occurred, the control circuit 22 again stops power transmission to the power receiving device 40 for the period T1, as indicated by A8, and again transmits the recharge detection command to the power receiving device 40 in the intermittent power transmission period after resuming power transmission, as indicated by A9. Note that the power transmission suspension period T1 may be referred to as a first period, and the timeout wait period T2 may be referred to as a second period.

As indicated by A10 in FIG. 14A, when power transmission from the power transmitting device 10 has been stopped after the power reception control device 50 has transmitted the full-charge command, the power reception control device 50 is reset. Specifically, the power supply voltage becomes 0 V since power is not supplied from the power transmitting device 10 so that the power reception control device 50 is reset. When the power-receiving-side control circuit 52 has received the recharge detection command from the power transmitting device 10 after the reset state has been canceled by intermittent power transmission from the power transmitting device 10, as indicated by A11, the power-receiving-side control circuit 52 monitors the recharge state of the battery 94, as indicated by A12. Specifically, the power-receiving-side control circuit 52 monitors and determines whether or not the battery 94 requires recharging. Alternatively, the power-receiving-side control circuit 52 may monitor the battery voltage VBAT and transmit information relating to the battery voltage VBAT to the power transmitting device 10. The power-receiving-side control circuit 52 monitors the recharge state of the battery 94 based on the monitoring result of the recharge monitor circuit 64 shown in FIG. 3.

At B1 in FIG. 14B, the power-receiving-side control circuit 52 transmits the recharge command which indicates information relating to the recharge state of the battery 94 to the power transmitting device 10. For example, when the power-receiving-side control circuit 52 has determined that the battery 94 requires recharging based on the monitoring result of the recharge monitoring circuit 64, the power-receiving-side control circuit 52 transmits the recharge command to the power transmitting device 10. When the power-transmitting-side control circuit 22 has received the recharge command from the power receiving device 40, the power-transmitting-side control circuit 22 resets the full-charge flag FC to "0", as indicated by B2, and resumes normal power transmission to the power receiving device 40, as indicated by B3. Specifically, the power-transmitting-side control circuit 22 resumes normal power transmission when the power-transmitting-side control circuit 22 has determined that the battery 94 requires recharging based on the recharge command. As a result, the battery 94 starts to be recharged so that the battery 94 of which the voltage has decreased can be recharged.

Figure 15:
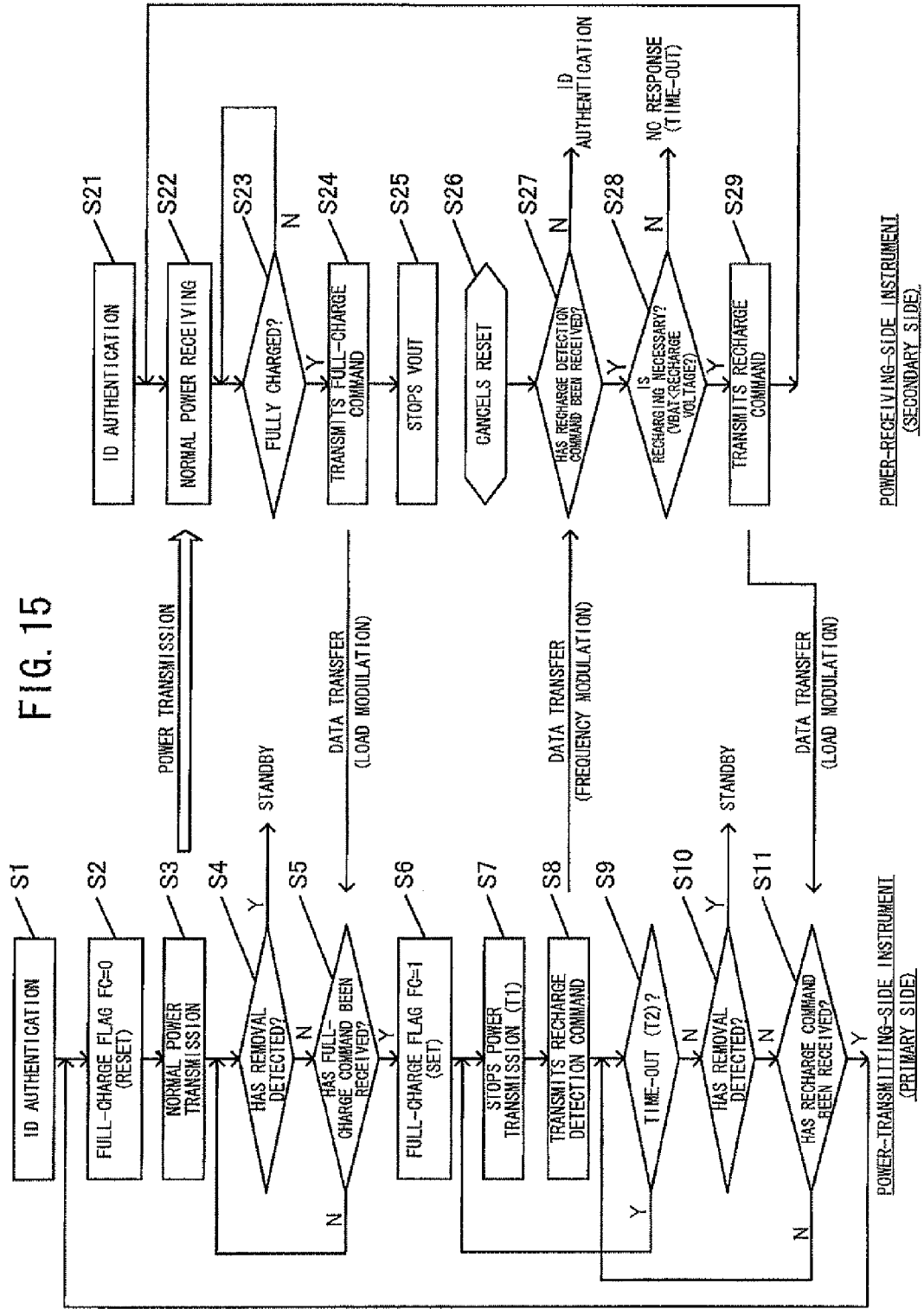
FIG. 15 is a flowchart showing the process of a non-contact power transmission system that automatically performs ID authentication, normal power transmission, full-charge detection, and recharge management.

FIG. 15 shows a summary of the process of the non-contact power transmission system that automatically performs ID authentication, normal power transmission, full-charge detection, and recharge management. FIG. 15 is a flowchart showing the process of the non-contact power transmission system that automatically performs ID authentication, normal power transmission, full-charge detection, and recharge management.

The power-transmitting-side process is as follows. When the power-transmitting-side instrument (primary-side instrument) has completed ID authentication with regard to the power-receiving-side instrument (secondary-side instrument), the power-transmitting-side instrument resets the full-charge flag FC to "0" (steps S1 and S2). The power-transmitting-side instrument then starts normal power transmission to the power-receiving-side instrument (step S3). The power-transmitting-side instrument then performs removal (leave) detection (step S4). When the power-transmitting-side instrument has detected removal (leave) of the power-receiving-side instrument, the power-transmitting-side instrument transitions to the normal standby mode. Specifically, the power-transmitting-side instrument detects removal when the portable telephone 510 has been physically separated from the charger 500 in FIG. 2A (or FIG. 2B) so that a magnetic flux of the primary coil does not pass through the secondary coil L2, and then transitions to the normal standby mode. In the normal standby mode, the power-transmitting-side instrument does not perform intermittent power transmission, differing from the post-full-charge standby mode. The power-transmitting-side instrument completely stops power transmission until the portable telephone 510 is again placed on the charger 500.

The power-transmitting-side instrument determines whether or not the full-charge command has been received from the power-receiving-side instrument (step S5). When the power-transmitting-side instrument has determined that the full-charge command has not been received from the power-receiving-side instrument, the power-transmitting-side instrument returns to the step S4. When the power-transmitting-side instrument has determined that the full-charge command has been received from the power-receiving-side instrument, the power-transmitting-side instrument sets the full-charge flag FC to "1" (step S6). The power-transmitting-side instrument then stops power transmission to the power-receiving-side instrument during the first period (power transmission suspension period) T1 (step S7). The period T1 is measured by a count process based on a power-transmitting-side clock signal.

When the first period T1 has elapsed, the power-transmitting-side instrument resumes power transmission (intermittent power transmission), and transmits the recharge detection command to the power-receiving-side instrument (step S8). Specifically, the power-transmitting-side instrument generates a frame that instructs detection of the recharge state, and transmits the generated frame to the power-receiving-side instrument by frequency modulation. The power-transmitting-side instrument then waits for expiration of the second period (timeout wait period) T2 (i.e., waits for a timeout to occur) (step S9). Specifically, the power-transmitting-side instrument waits for the power-receiving-side instrument to operate upon cancellation of the reset state due to intermittent power transmission and transmit the recharge command. The power-transmitting-side instrument performs removal detection until the second period T2 expires (step S10). When the power-transmitting-side instrument has detected removal, the power-transmitting-side instrument transitions to the normal standby mode. The power-transmitting-side instrument monitors whether or not the recharge command has been received from the power-receiving-side instrument until the second period T2 expires (step S11). When the power-transmitting-side instrument has not received the recharge command from the power-receiving-side instrument, the power-transmitting-side instrument returns to the step S9. When the second period T2 has elapsed (i.e., timeout has occurred), the power-transmitting-side instrument returns to the step S7, and again stops power transmission to the power-receiving-side instrument. The power-transmitting-side instrument performs intermittent power transmission after the power transmission suspension period T1 has expired, and again transmits the recharge detection command to the power-receiving-side instrument (step S8). As described above, the power-transmitting-side instrument repeatedly stops power transmission and performs intermittent power transmission until the power-transmitting-side instrument receives the recharge command from the power-receiving-side instrument.

When the power-transmitting-side instrument has received the recharge command from the power-receiving-side instrument in the step S11, the power-transmitting-side instrument returns to the step S2, and resets the full-charge flag FC to "0". The power-transmitting-side instrument then resumes normal power transmission for recharging the battery 94 (step S3). As a result, the battery 94 of which the voltage has decreased starts to be recharged.

The power-receiving-side process is as follows. When the power-transmitting-side instrument has completed ID) authentication, the power-receiving-side instrument starts normal power receiving (steps S21 and S22). The power-receiving-side instrument then determines whether or not the battery 94 has been fully charged. When the battery 94 has been fully charged, the power-receiving-side instrument transmits the full-charge command to the power-transmitting-side instrument (steps S23 and S24). Specifically, the power-receiving-side instrument generates a frame which indicates that the battery 94 has been fully charged, and transmits the generated frame to the power-transmitting-side instrument by load modulation. The power-transmitting-side instrument sets the full-charge flag FC to "1", and stops power transmission (steps S6 and S7). The power-receiving-side instrument stops outputting the voltage VOUT to the charge control device 92 (step S25). Specifically, the power-receiving-side instrument causes the transistors TB2 and TB1 shown in FIG. 3 to be turned OFF to electrically disconnect the load 90. More specifically, the control circuit 52 causes the transistor TB2 to be turned OFF by setting the signal P1Q at the H level.

When the power-transmitting-side instrument has stopped power transmission in the step S7 in FIG. 15, the power-receiving-side instrument is reset since power is not supplied to the power-receiving-side instrument. When the power-transmitting-side instrument starts intermittent power transmission, power is supplied to the power-receiving-side instrument. Therefore, the power-receiving-side power supply voltage rises, whereby the reset state is canceled (step S26). The power-receiving-side instrument then determines whether or not the recharge detection command has been received (step S27). When the power-receiving-side instrument has not received the recharge detection command, the power-receiving-side instrument transitions to a normal ID authentication process. Specifically, a normal standby mode process is performed.

When the power-receiving-side instrument has received the recharge detection command, the power-receiving-side instrument determines whether or not the battery 94 requires recharging (step S28). Specifically, the power-receiving-side instrument determines whether or not the battery voltage VBAT is lower than the recharge voltage (e.g., 3.9 V). When the power-receiving-side instrument has determined that the battery 94 does not require recharging, the power-receiving-side instrument does not respond to the power-transmitting-side instrument. Therefore, the power-transmitting-side instrument determines that a timeout has occurred in the step S9, and stops power transmission so that the power-receiving-side instrument is reset.

When the power-receiving-side instrument has determined that the battery 94 requires recharging in the step S28, the power-receiving-side instrument transmits the recharge command (step S29). When the power-transmitting-side instrument has received the recharge command, the power-transmitting-side instrument resets the full-charge flag FC to "0" and resumes normal power transmission (steps S2 and S3). The power-receiving-side instrument also resumes normal power receiving (step S22) so that the post-full-charge standby mode is canceled.

According to this embodiment, when the power-receiving-side instrument has detected that the battery 94 has been fully charged, the power-transmitting-side instrument stops power transmission (step S7). The power-receiving-side instrument stops outputting the voltage VOUT to the charge control device 92 (step S25), and transitions to the post-full-charge standby mode. In the post-full-charge standby mode, since the power-transmitting-side instrument stops power transmission, the power reception control device 50 is reset. Moreover, since the power-receiving-side instrument stops outputting the voltage VOUT, the charge control device 92 is also reset. Therefore, a standby current that flows through the power reception control device 50 and the charge control device 92 can be significantly reduced so that power consumption can be reduced.

According to this embodiment, after the power-receiving-side instrument has been reset, the power-transmitting-side instrument performs intermittent power transmission and transmits the recharge detection command (step S8). The power-receiving-side instrument monitors the recharge state based on the received recharge detection command when the reset state has been canceled (steps S27 and S28). When the power-receiving-side instrument has determined that recharging is necessary, the power-receiving-side instrument transmits the recharge command (step S29).

Specifically, since the power-receiving-side instrument is reset when power transmission has been stopped, the power-receiving-side instrument cannot store information relating to the full-charge state or the recharge state. On the other hand, the power-transmitting-side instrument can store such information. This embodiment focuses on this point. Specifically, the power-transmitting-side instrument transmits the recharge detection command to the power-receiving-side instrument in the intermittent power transmission period after power transmission has been stopped. This enables the power-receiving-side instrument released from the reset state to start monitoring the recharge state based on the recharge detection command from the power-transmitting-side instrument as a trigger, even if the power-receiving-side instrument does not store the information relating to the full-charge state or the recharge state. When the power-receiving-side instrument has determined that recharging is necessary, the power-receiving-side instrument can notify the power-transmitting-side instrument that recharging is necessary by transmitting the recharge command. This makes it possible to appropriately recharge the battery 94 after the battery 94 has been fully charged.

When the power-transmitting-side instrument has not received the recharge command within the period T2 so that a timeout has occurred, the power-transmitting-side instrument stops power transmission (steps S9 and S7). Specifically, the power-transmitting-side instrument repeatedly stops power transmission and performs intermittent power transmission until the power-transmitting-side instrument receives the recharge command. Therefore, it suffices that the power-receiving-side instrument operate only in the intermittent power transmission period. The standby current in the post-full-charge standby mode can be significantly reduced by sufficiently increasing the power transmission suspension period T1. Therefore, the battery 94 can be optimally recharged while minimizing unnecessary power consumption.

Removal Detection after Full-Charging

When the power-receiving-side instrument 510 has been removed after full-charging, it is unnecessary to perform intermittent power transmission. Therefore, it is necessary to detect removal of the power-receiving-side instrument 510 after full-charging in order to prevent unnecessary power transmission. The details of removal detection after full-charging are described below.

Whether or not the power-receiving-side instrument has been removed after full-charging may be detected by causing the power transmitting device 10 to perform intermittent power transmission to the power receiving device 40, and determining whether or not the power transmitting device 10 can detect the ID authentication information from the power receiving device 40, for example. Specifically, normal power transmission is stopped when the battery 94 has been fully charged. Therefore, the charge control device 92 (see FIG. 3) provided in the load 90 is reset and returns to the initial state. When the power transmitting device 10 has performed intermittent power transmission at given intervals after the battery has been fully charged, the power receiving device 40 that has received power by intermittent power transmission operates, and transmits the ID authentication information relating to the power-receiving-side instrument 510 (or the power receiving device 40) to the power transmitting device 10 (see the step S4 in FIG. 4). Therefore, when the power-receiving-side instrument 510 has not been removed, the ID authentication information should be transmitted to the power transmitting device 10 from the power receiving device 40 within a given period after intermittent power transmission has started. When the ID authentication information has not been transmitted from the power receiving device 40 within the given period, the power transmitting device 10 determines that the power-receiving-side instrument 510 has been removed. Note that removal of the power-receiving-side instrument 510 can also be detected by observing the alternating-current waveform at the coil end of the primary coil L1 (i.e., the amplitude of the alternating-current voltage), as shown in FIG. 19.

In this embodiment, intermittent power transmission for removal detection is performed in addition to intermittent power transmission for recharge necessity detection. The first cycle T10 of removal detection after full-charging is set at a value (e.g., 5 seconds) longer than the cycle (e.g., 0.3 seconds) of temporary power transmission to suppress an increase in power consumption. Since the frequency of recharge necessity detection after full-charging can be further reduced, the second cycle T20 of full-charge detection is set at a value (e.g., 10 minutes) longer than the first cycle T10. This enables secondary-side instrument installation detection, recharge necessity detection after full-charging, and removal detection after full-charging to be achieved in optimum cycles while minimizing power consumption. Moreover, removal (leave) of the power-receiving-side instrument after full-charging can be detected by means of software without using special hardware. This prevents a situation in which unnecessary power transmission is performed when the power-receiving-side instrument is not installed.

As described above, a highly convenient non-contact power transmission system is implemented when the automatic mode is selected. According to at least one of the above-described embodiments, the following main effects can be obtained. Note that the following effects are not necessarily achieved at the same time. Accordingly, the following effects do not in any way limit the technical scope of the invention.

(1) Since the non-contact power transmission system set in the automatic mode automatically detects installation of the power-receiving-side instrument and starts normal power transmission, the user need not operate a switch or the like. Therefore, convenience to the user is improved.

(2) Since normal power transmission is performed after ID authentication, normal power transmission is not performed for an instrument that is inappropriate for the system. Therefore, reliability and safety are improved.

(3) Various detection operations (i.e., removal detection, metal foreign object detection, takeover state detection based on power-receiving-side regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety).

(4) The safety of the system is significantly improved by utilizing the measures against takeover heat generation in addition to the normal foreign object measures. Moreover, since the power receiving device reduces the load when performing intermittent load modulation (regular load modulation) for takeover detection, the power transmitting device can reliably detect a change in load. Therefore, the takeover state detection accuracy can be improved.

(5) Since recharge management (and removal detection) is automatically performed after full-charging, the battery is necessarily maintained in a full-charge state even if the power-receiving-side instrument is placed on the charger for a long period of time. Therefore, the user can safely utilize the non-contact power transmission system, and is very satisfied.

(6) The non-contact power transmission system according to the invention has the automatic mode (automatic execution mode). In the automatic mode, all of the above-described operations are automatically performed. Therefore, a highly convenient non-contact power transmission system that does not impose a burden on the user is implemented.

(7) Since detection of installation of the power-receiving-side instrument, recharge management after full-charging, and removal detection after full-charging are performed based on intermittent power transmission from the power transmitting device, power consumption is reduced. Therefore, a non-contact power transmission system with low power consumption is implemented. The power consumption of the non-contact power transmission system can be further reduced by individually optimizing the cycle of intermittent power transmission corresponding to the objective.

(8) The size and the cost of the non-contact power transmission system can be reduced due to a simple device configuration.

Third Embodiment

This embodiment illustrates the operation of the non-contact power transmission system in the switch mode.

Outline of operation of power transmitting device in switch mode

Figure 24:
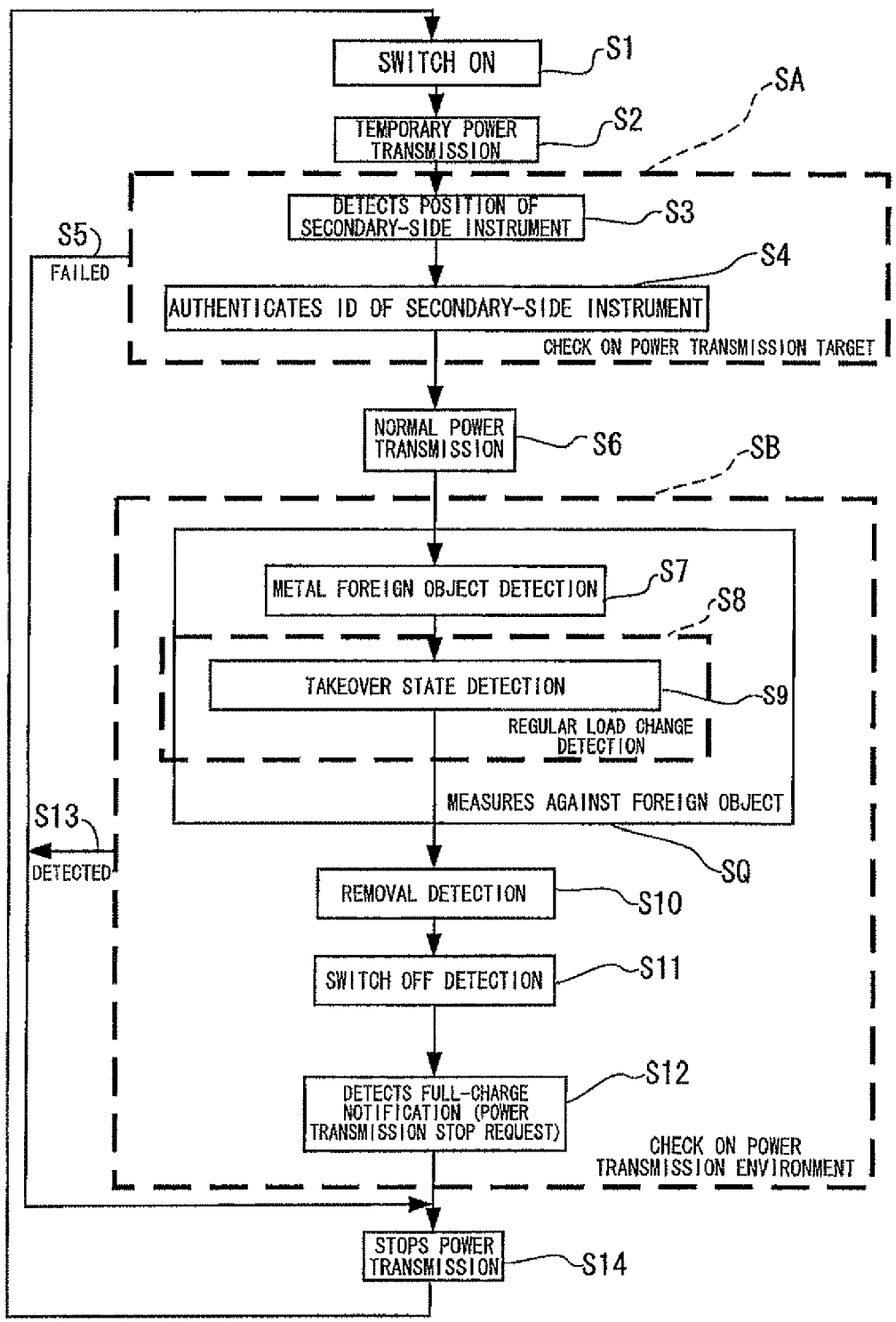
FIG. 24 is a flowchart showing an outline of an example of the operation of a power transmitting device in a switch mode.

FIG. 24 is a flowchart showing an outline of an example of the operation of the power transmitting device in the switch mode. The operation of the power transmitting device 10 is roughly divided into a check on the power transmission target before power transmission (step SA) and a check on the power transmission environment during power transmission (including before power transmission) (step SB) (these steps are enclosed by bold dotted lines).

The power transmitting device 10 starts temporary power transmission when the switch (SW1) has been turned ON (steps S1 and S2).

The power transmitting device 10 then checks whether or not the power-receiving-side instrument 510 is placed at an appropriate position (step S3), and performs ID authentication on the power-receiving-side instrument 510 (the power receiving device 40) to determine whether or not the power-receiving-side instrument 510 is an appropriate power transmission target (step S4). A situation in which the user must again press the switch (SW1) due to an accidental ID authentication mistake is prevented by allowing a plurality of retries during ID authentication. Therefore, convenience to the user is improved.

When the power transmitting device 10 has failed in position detection or ID authentication (step S5), the power transmitting device 10 stops temporary power transmission, and returns to the initial state in which the power transmitting device 10 waits for the switch to be turned ON (i.e., a state in which the power transmitting device 10 waits for the step S1 to occur).

The position detection circuit 56 included in the power receiving device 40 shown in FIG. 3 checks whether or not the power-receiving-side instrument is placed at an appropriate position (position detection) based on the direct-current voltage (ADIN) obtained by rectifying the induced voltage in the secondary coil (L2).

The power transmitting device 10 starts normal power transmission (charge power transmission) after ID authentication (step S6). The power transmitting device 10 detects whether or not a metal foreign object is present (metal foreign object detection) (step S7), and detects whether or not a takeover state has occurred (takeover state detection) by means of regular load change detection (steps S8 and S9). The power transmitting device 10 detects whether or not the power-receiving-side instrument has been removed (leave detection) (step S10), detects whether or not the switch has been turned OFF (switch OFF detection) (step S11), and detects whether or not a full-charge notification (power transmission stop request) has been received (full-charge notification detection) (step S12). When the power transmitting device 10 has detected one of the above-mentioned states (step S13), the power transmitting device 10 stops normal power transmission (step S14), and returns to the initial state (i.e., a state in which the power transmitting device 10 waits for the step S1 to occur).

A metal foreign object (step S7) and a takeover state (step S10) may be detected based on a change in the waveform of an induced voltage signal of the primary coil (L1).

Figure 25:
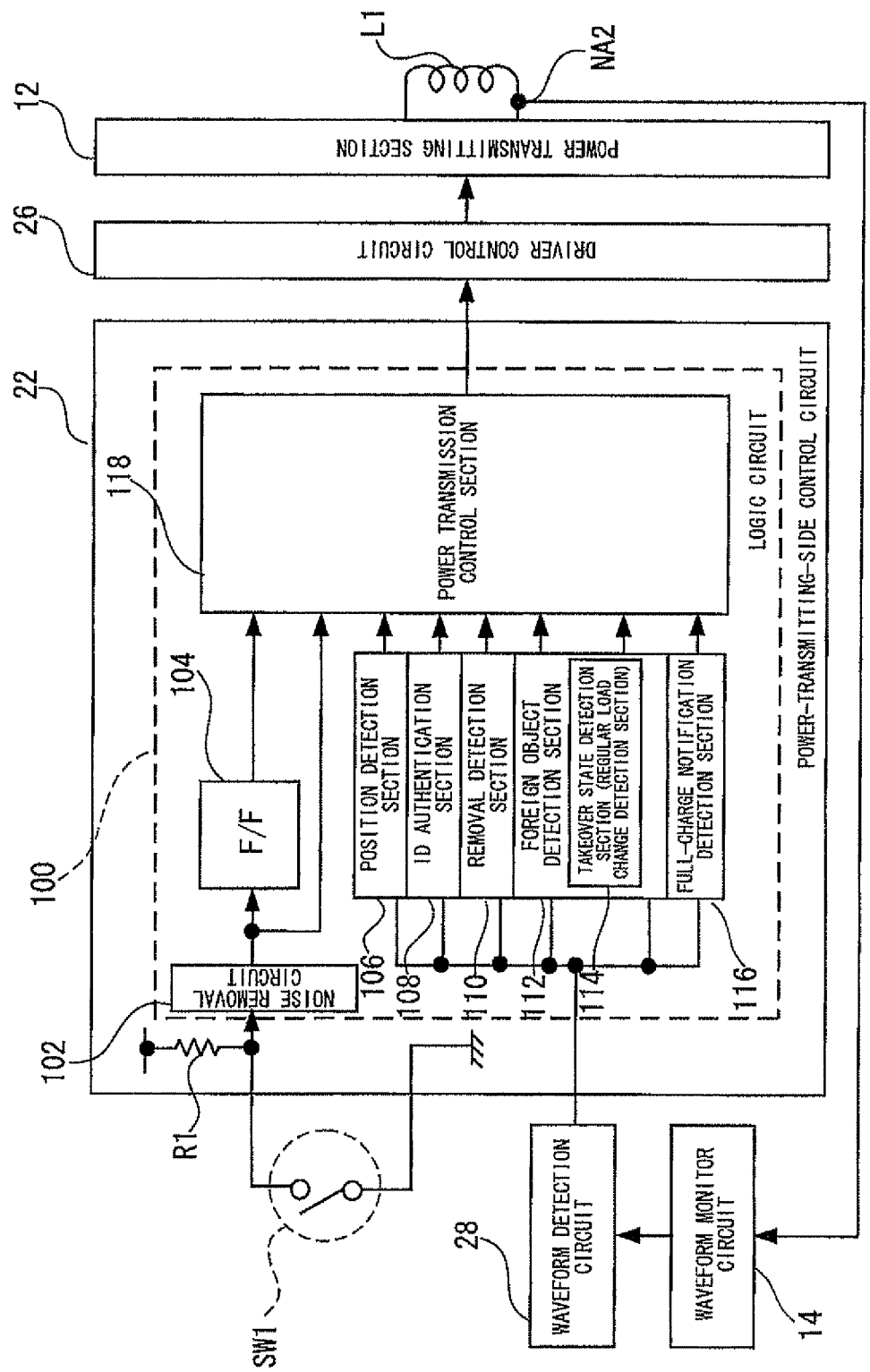
FIG. 25 is a circuit diagram showing an example of the configuration of a power-transmitting-side control circuit in a switch mode.

Example of Configuration of Power-Transmitting-Side Control Circuit in Switch Mode FIG. 25 is a circuit diagram showing an example of the configuration of the power-transmitting-side control circuit in the switch mode. As shown in FIG. 25, the power-transmitting-side control circuit 22 includes a logic circuit 100.

The logic circuit 100 includes a noise removal circuit 102 that removes noise which occurs when the switch SW is turned ON/OFF, a flip-flop (F/F) 104 that stores information as to whether the present state is the power transmission state or the initial state, a position detection section 106, an ID authentication section 108, a removal (leave) detection section 110, a foreign object detection section 112 (including a takeover state detection section 114), a full-charge notification (power transmission stop request) detection section 116, and a power transmission control section 118 that ON/OFF-controls power transmission based on the detection result of each section.

Basic Sequence Example of Non-Contact Power Transmission System

Figure 26:
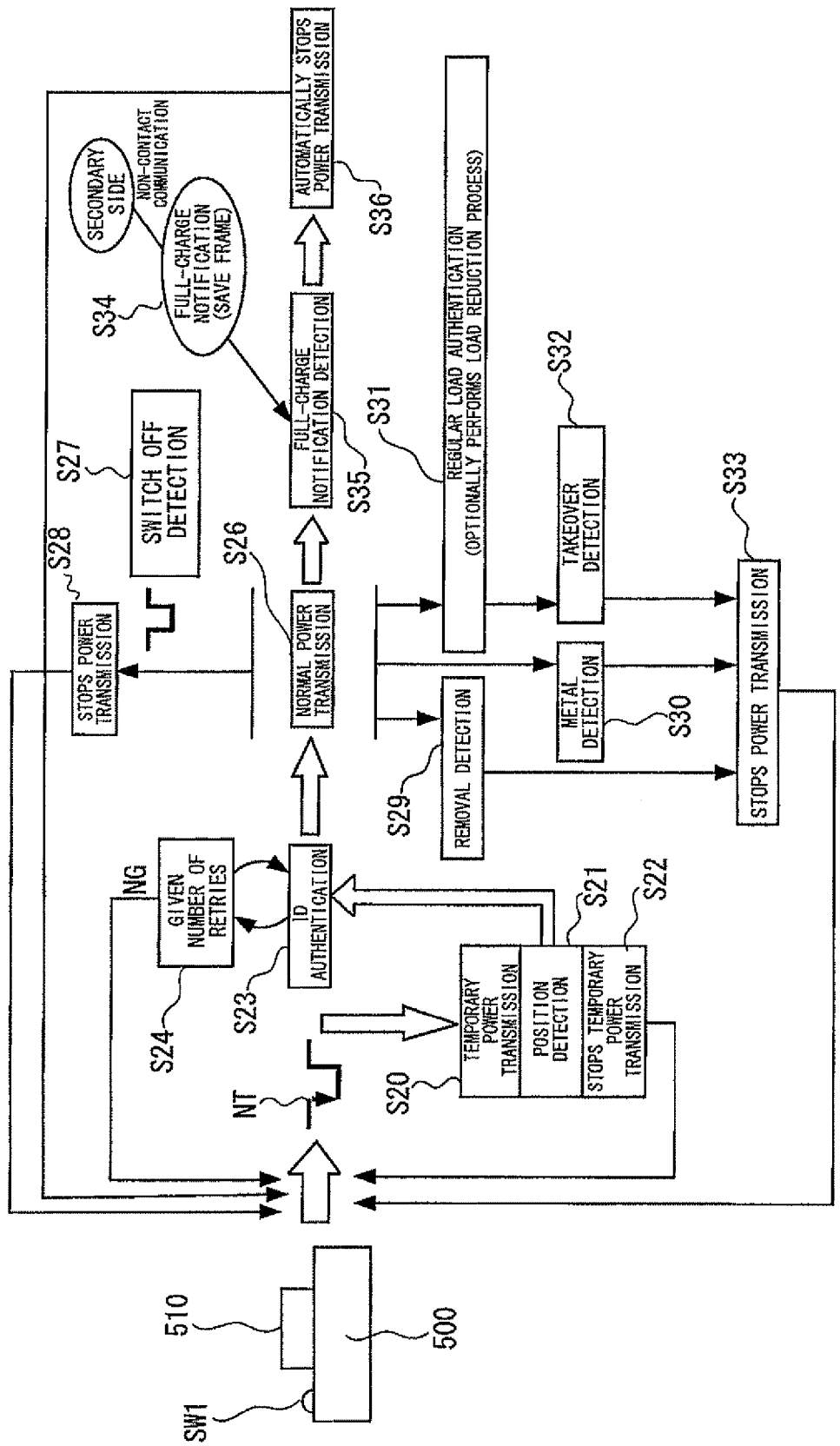
FIG. 26 is a view showing a basic sequence example of a non-contact power transmission system.

FIG. 26 is a view showing a basic sequence example of the non-contact power transmission system. The power-transmission-side electronic instrument (power-transmitting-side instrument) 500 is provided with the switch SW1 (left side). The user places the power-receiving-side electronic instrument (power-receiving-side instrument) 510 at a predetermined position, and presses the switch SW1. The power transmitting device 10 starts temporary power transmission based on the edge (e.g., negative edge NT) that occurs due to the operation of the switch SW1 as a trigger (step S20), and the position of the power-receiving-side instrument 510 is detected (step S21). When the position of the power-receiving-side instrument 510 is inappropriate, the power transmitting device 10 stops temporary power transmission (step S22).

When the power-receiving-side instrument 510 is placed at an appropriate position, the power transmitting device 10 performs ID authentication (step S23). Specifically, ID authentication information (e.g., manufacturer information, instrument ID number, and rating information) is transmitted from the power-receiving-side instrument to the power-transmitting-side instrument. Since ID authentication may fail accidentally, it is desirable to allow a given number of (e.g., three) retries and determine that ID authentication has failed when ID authentication has failed (NG) successively taking convenience to the user (making it unnecessary to press the switch SW1 a number of times) into consideration.

After ID authentication, the power transmitting device 10 starts normal power transmission for the power receiving device 40 (step S26). When it has been detected that the switch (SW1) has been pressed (compulsory OFF) during normal power transmission (step S27), the power transmitting device 10 stops normal power transmission and returns to the initial state (step S28).

The power transmitting device 10 performs removal detection (step S29), metal foreign object detection (step S30), secondary-side regular load authentication (including a secondary-side load reduction process: step S31), and takeover state detection (step S32), and stops normal power transmission when one of these states has been detected (step S33). The term "load reduction" accompanying secondary-side regular load authentication refers to a process that reduces (or stops) power supplied to the load when performing load modulation to apparently reduce the load state, since the primary-side instrument may not successfully receive a modulation signal when load modulation is performed in a state in which the load state is heavy (described later with reference to FIG. 17).

In FIG. 26, when the power receiving device 40 has detected that a full-charge state has occurred, the power receiving device 40 creates a full-charge notification (save frame; power transmission stop request frame) and transmits the full-charge notification to the power-transmitting-side instrument (step S34). When the power transmitting device 10 has detected the full-charge notification (power transmission stop request frame) (step S35), the power transmitting device 10 stops normal power transmission and returns to the initial state (step S36).

Figure 27:
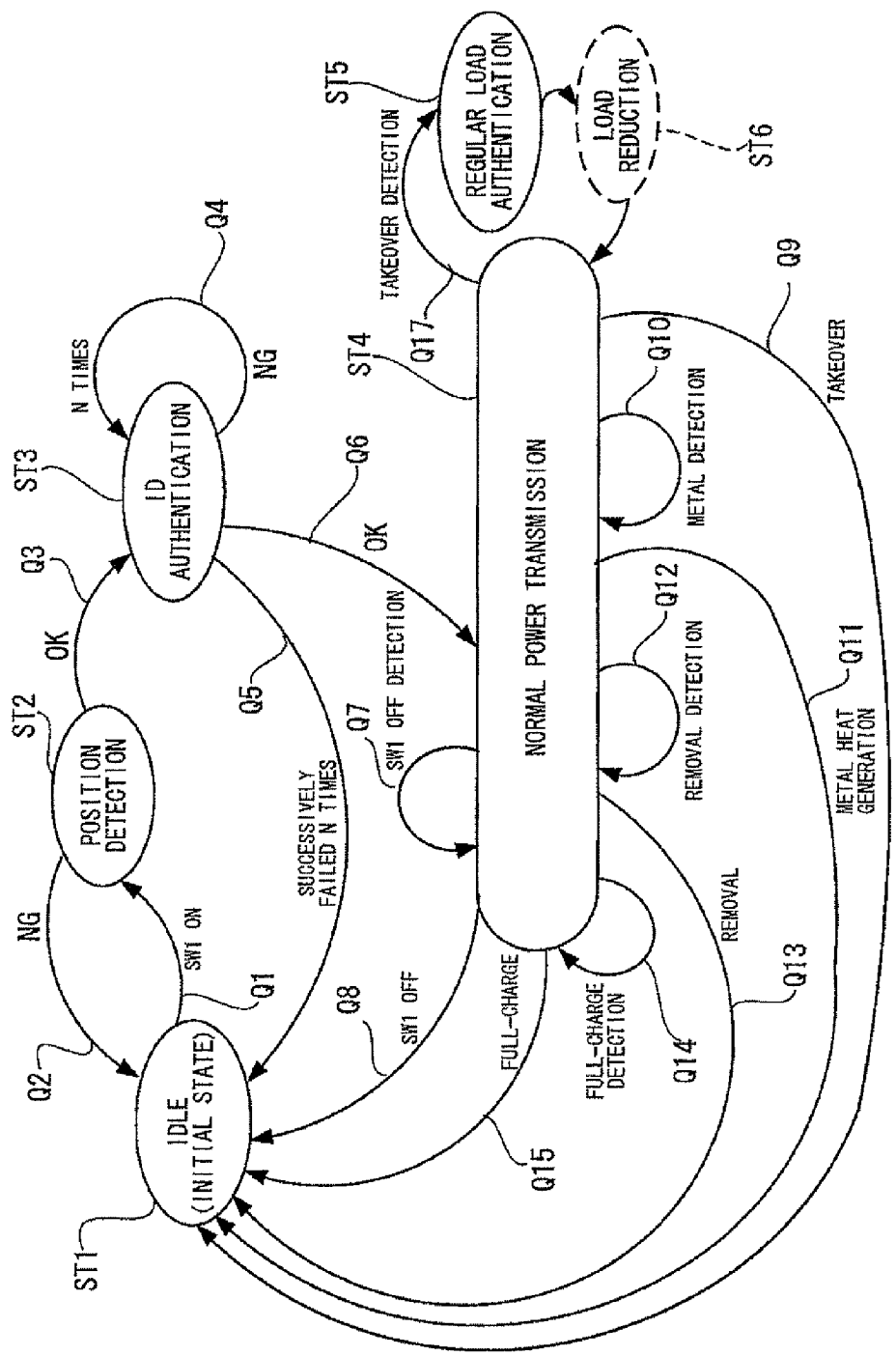
FIG. 27 is a state transition diagram showing the state transition of a non-contact power transmission system that performs the sequence shown in FIG. 26.

FIG. 27 is a state transition diagram showing the state transition of the non-contact power transmission system that performs the sequence shown in FIG. 26. As shown in FIG. 27, the state of the non-contact power transmission system is roughly divided into an initial state (idle state: ST1), a position detection state (ST2), an ID authentication state (ST3), a power transmission (normal power transmission) state (ST4), and a regular load authentication state (ST5) (and a load reduction state (ST6)).

The non-contact power transmission system transitions from the state ST1 to the state ST2 when the switch has been turned ON (Q1), and returns to the state ST1 (Q2) when the position detection result is inappropriate (NG). When the non-contact power transmission system has succeeded in position detection (Q3), the non-contact power transmission system monitors whether or not ID authentication successively fails a plurality of times (Q4). When ID authentication has failed successively (Q5), the non-contact power transmission system returns to the state ST1. When ID authentication has succeeded (Q6), the non-contact power transmission system transitions to the state ST4.

The non-contact power transmission system performs switch (SW1) OFF detection (Q7), removal detection (Q12), metal detection (Q10), takeover state detection (Q17), and full-charge detection (Q14). The non-contact power transmission system returns to the initial state when one of these states has been detected (Q8, Q9, Q11, Q13, or Q15).

Since the non-contact power transmission system that performs the basic sequence shown in FIG. 26 starts power transmission only when the switch has been turned ON, a reduction in power consumption and an improvement in safety can be achieved. Since the non-contact power transmission system stops power transmission and returns to the initial state (switch ON wait state) when the full-charge notification (power transmission stop request) has been received, unnecessary power transmission is not performed. Therefore, a reduction in power consumption and an improvement in safety can be achieved.

Since normal power transmission is performed after ID authentication has been completed successfully, power is not transmitted to an inappropriate instrument. Therefore, reliability and safety are improved.

Various detection operations (i.e., removal detection, metal foreign object detection, takeover state detection based on secondary-side regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety).

Figure 28:
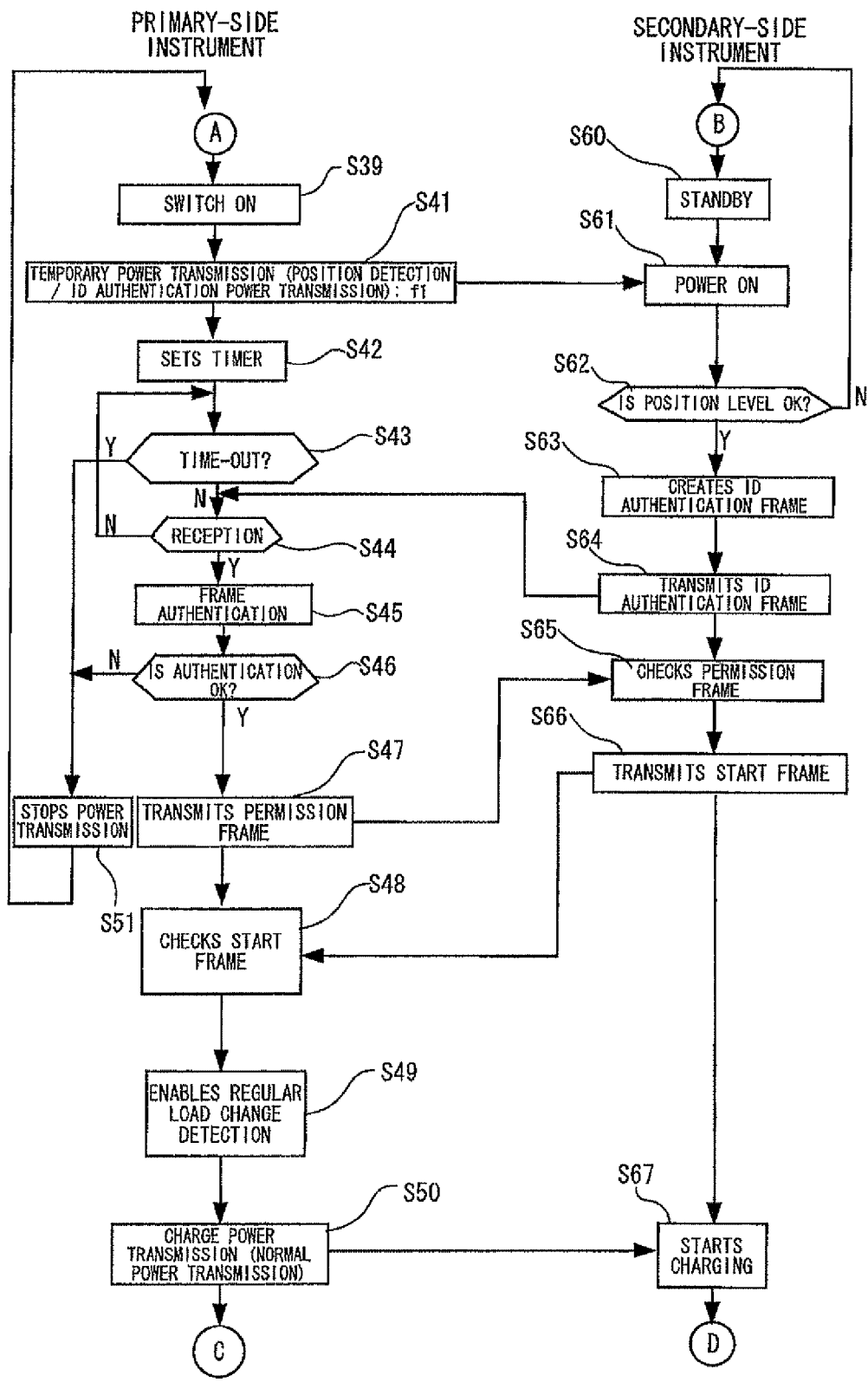
FIG. 28 is a flowchart showing an operation example of a non-contact power transmission system that performs the basic sequence shown in FIG. 26.
Figure 29:
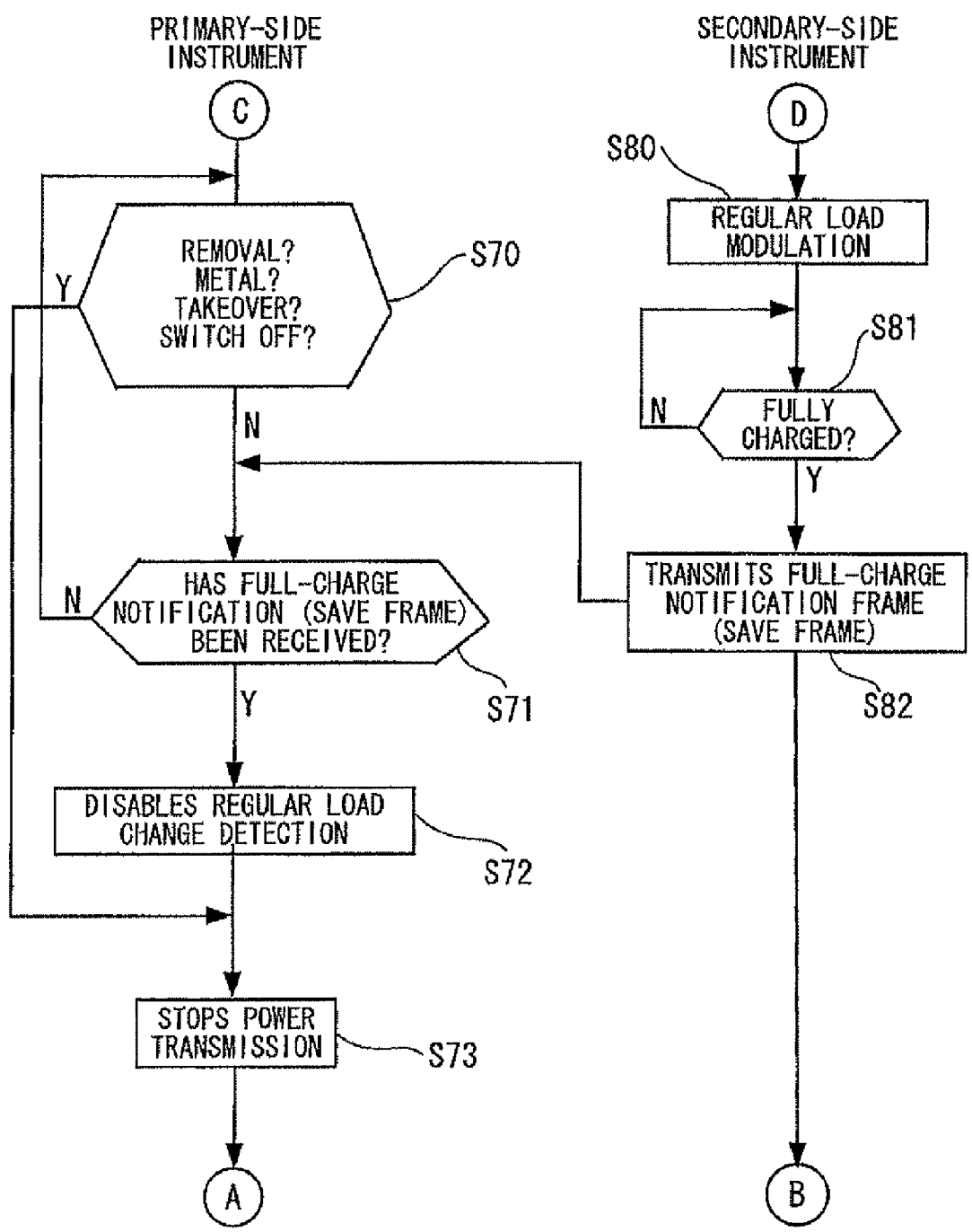
FIG. 29 is a flowchart showing an operation example of a non-contact power transmission system that performs the basic sequence shown in FIG. 26.

FIGS. 28 and 29 are flowcharts showing an operation example of the non-contact power transmission system that performs the basic sequence shown in FIG. 26. In FIGS. 28 and 29, the left side shows the primary-side operation flow, and the right side shows the secondary-side operation flow.

As shown in FIG. 28, when the switch SW1 has been turned ON (step S40), the power-transmitting-side instrument starts temporary power transmission (e.g., the transmission frequency is f1; step S41), and a timer starts a count operation (step S42). The power-receiving-side instrument transitions from a standby state (step S60) to a power-ON state (step S61) when the power-receiving-side instrument has received temporary power transmission, and determines the position level (position detection). When the position level is inappropriate (NG), the power-receiving-side instrument returns to the initial state (step S60). When the position level is appropriate (OK), the power-receiving-side instrument creates the ID authentication frame (S63), and transmits the ID authentication frame (step S64).

The power-transmitting-side instrument receives the ID authentication frame (step S44), and determines whether or not a time-out has occurred (step S43). When the power-transmitting-side instrument cannot receive the ID authentication frame within a given period of time, the power-transmitting-side instrument stops power transmission (step S49). When the power-transmitting-side instrument has received the ID authentication frame within a given period of time, the power-transmitting-side instrument performs a frame authentication process (step S45). When authentication has succeeded (OK), the power-transmitting-side instrument transmits a permission frame to the power-receiving-side instrument (step S47). When authentication has failed (NG), the power-transmitting-side instrument stops power transmission (step S51).

The power-receiving-side instrument checks the permission frame transmitted from the power-transmitting-side instrument (step S65), and transmits a start frame to the power-transmitting-side instrument (step S66).

The power-transmitting-side instrument checks the start frame (step S48), enables regular load change detection (takeover state detection) (step S49), and starts charge power transmission (normal power transmission) (step S50). The power-receiving-side instrument receives charge power transmission (normal power transmission), and starts charging the load (e.g., battery) (step S67). FIG. 29 shows the subsequent flow. The power-transmitting-side instrument waits for the full-charge notification (power transmission stop request) from the power-receiving-side instrument (step S71) while performing removal detection, metal foreign object detection, takeover state detection, and switch OFF detection (step S70).

The power-receiving-side instrument performs regular load modulation for takeover detection while charging the load (step S80), and detects whether or not the load has been fully charged (step S81). When the power-receiving-side instrument has detected that the battery has been fully charged, the power-receiving-side instrument transmits the full-charge notification frame (save frame; power transmission stop request) to the power-transmitting-side instrument (step S82).

When the power-transmitting-side instrument has received the full-charge notification frame (save frame; power transmission stop request) from the power-receiving-side instrument, the power-transmitting-side instrument disables regular load change detection (step S72), and stops power transmission (step S73).

As described above, the user can utilize the non-contact power transmission system set in the switch mode as the user wishes. Moreover, power consumption can be reduced. Specifically, the non-contact power transmission system set in the switch mode according to the second embodiment achieves the following main effects. Note that the following effects are not necessarily achieved at the same time. Accordingly, the following effects do not in any way limit the technical scope of the invention.

(1) Since the non-contact power transmission system set in the switch mode starts power transmission only when the switch has been turned ON, an improvement in convenience to the user, a reduction in power consumption, and an improvement in safety can be achieved.

(2) Since the non-contact power transmission system stops power transmission and returns to the initial state (switch ON wait state) when the full-charge notification (power transmission stop request) has been received, unnecessary power transmission is not performed. Therefore, a reduction in power consumption and an improvement in safety can be achieved.

(3) Since normal power transmission is performed after ID authentication has been completed successfully, power is not transmitted to an inappropriate instrument. Therefore, reliability and safety are improved.

(4) Various detection operations (i.e., removal detection, metal foreign object detection, takeover state detection based on secondary-side regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety).

Although only some embodiments of the invention have been described in detail above, those skilled in the art would readily appreciate that many modifications are possible in the embodiments without materially departing from the novel teachings and advantages of the invention. Specifically, various modifications are possible without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. Any combinations of the embodiments and the modifications are also included within the scope of the invention.

The configurations and the operations of the power transmission control device, the power transmitting device, the power reception control device, and the power receiving device, and the power-receiving-side load detection method employed for the power transmitting device, are not limited to those described relating to the above embodiments. Various modifications and variations may be made.

Figure 30:
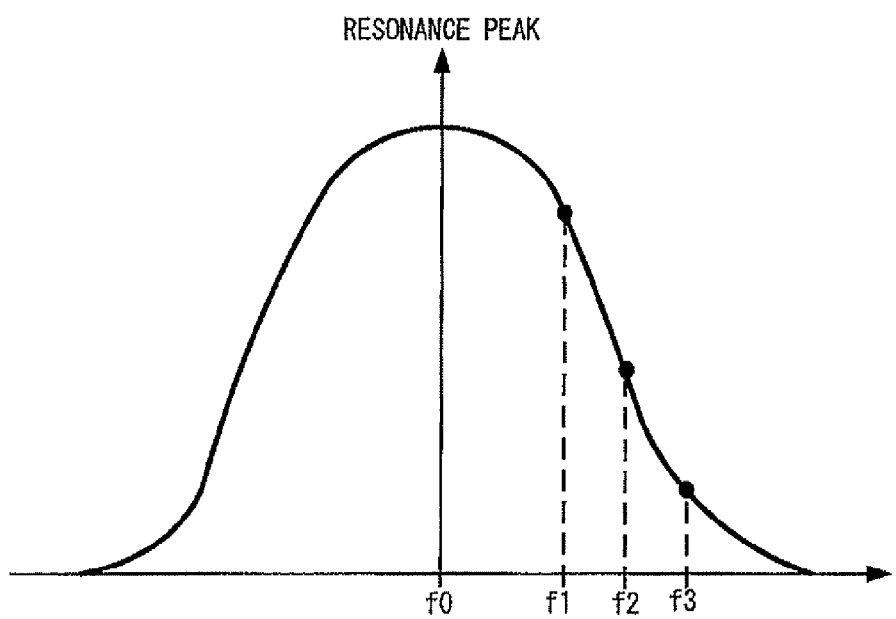
FIG. 30 is a view illustrative of the frequency of power-saving power transmission after full-charging.

In the automatic mode, continuous power transmission with a reduced amount of power (power-saving power transmission) may be utilized for recharge necessity determination after full-charging instead of intermittent power transmission. FIG. 30 is a view illustrative of the frequency of power-saving power transmission after full-charging. FIG. 30 shows the resonance characteristics of the primary coil L1. In FIG. 30, f0 is the resonance frequency when a load is connected, f1 is the frequency when transmitting data "1", f2 is the frequency when transmitting data "0", and f3 is the frequency during power-saving power transmission. In the power-saving mode, continuous power transmission is performed using the frequency f3 that differs from the resonance frequency f0 to the maximum extent. Since power-saving power transmission is continuous power transmission, power consumption increases to some extent as compared with intermittent power transmission. However, since the charge control device 92 provided in the load 90 always operates due to continuous power transmission even after full-charging, recharge necessity determination and removal detection can be continuously performed.

The invention achieves an effect of providing a convenient and highly reliable non-contact power transmission system with low power consumption. Therefore, the invention is useful for a power transmission control device (power transmission control IC), a power transmitting device (e.g., IC module), a non-contact power transmission system, an electronic instrument (e.g., portable terminal and charger), and the like.

The invention may also be applied to other power transmission systems (e.g., a cable power transmission system and a point-contact-type power transmission system that transmits power through a contact point) in addition to the non-contact power transmission system.

What is claimed is:

1. A power transmission control device provided in a power transmitting device of a non-contact power transmission system, the non-contact power transmission system performing non-contact power transmission from the power transmitting device to a power receiving device via a primary coil and a secondary coil that are electromagnetically coupled, the power transmission control device comprising:
an operation mode switch terminal that receives an operation mode switch control signal, the operation mode switch control signal switching an automatic mode to a switch mode, the power transmitting device starting normal power transmission in the automatic mode after installation of a power-receiving-side instrument that includes the power receiving device, in an area in which power transmitted via non-contact power transmission can be received, has been automatically detected, the power transmitting device supplying power to a load of the power-receiving-side instrument at the normal power transmission, and the power transmitting device starting the normal power transmission in the switch mode after an operation trigger switch has been turned ON;
an operation trigger terminal that receives an operation trigger signal, the operation trigger signal occurring due to an operation of the operation trigger switch; and
a power-transmitting-side control circuit that controls power transmission to the power receiving device and changes an operation mode of the power transmitting device based on the operation mode switch control signal.

2. The power transmission control device as defined in claim 1, the power-transmitting-side control circuit causing the power transmitting device to perform intermittent temporary power transmission when the automatic mode has been selected based on the operation mode switch control signal, detecting a response from the power receiving device that has received the intermittent temporary power transmission to detect the installation of the power-receiving-side instrument, causing the power transmitting device to continuously perform the normal power transmission to the power receiving device when the installation of the power-receiving-side instrument has been detected, and causing the power transmitting device to continuously perform the intermittent temporary power transmission when the installation of the power-receiving-side instrument has not been detected; and the power-transmitting-side control circuit causing the power transmitting device to repeatedly start and stop power transmission to the power receiving device each time the operation trigger signal is input to the operation trigger terminal when the switch mode has been selected based on the operation mode switch control signal.

3. The power transmission control device as defined in claim 2, the power-transmitting-side control circuit performing an ID authentication process before the normal power transmission regardless of whether the automatic mode or the switch mode has been selected to determine whether or not the power-receiving-side instrument has adaptability to the non-contact power transmission system, and causing the power transmitting device to perform the normal power transmission when the ID authentication process has been completed successfully.

4. The non-contact power transmission system as defined in claim 3, the power-transmitting-side control circuit causing the power transmitting device to perform the intermittent temporary power transmission when the automatic mode has been selected based on the operation mode switch control signal, detecting the installation of the power-receiving-side instrument depending on whether or not ID authentication information has been received from the power receiving device within a given period of time from a start time of the intermittently temporary power transmission, causing the power transmitting device to perform the normal power transmission to the power receiving device when the installation of the power-receiving-side instrument has been detected on condition that the ID authentication process has been completed successfully, and causing the power transmitting device to continuously perform the intermittent temporary power transmission when the ID authentication information has not been received from the power receiving device within the given period of time from the start time of the temporary power transmission or the ID authentication process has not been completed successfully.

5. The power transmission control device as defined in claim 4, the power-transmitting-side control circuit causing the power transmitting device to stop the normal power transmission and perform power transmission for removal detection after full-charging and power transmission for recharge necessity determination after full-charging when the power-transmitting-side control circuit has detected a full-charge notification from the power receiving device during the normal power transmission, causing the power transmitting device to perform the intermittent temporary power transmission when removal of the power receiving device has been detected based on a signal transmitted from the power receiving device that has received the power transmission for removal detection after full-charging, and causing the power transmitting device to resume the normal power transmission when the power-transmitting-side control circuit has determined that recharging is necessary based on a signal transmitted from the power receiving device that has received the power transmission for recharge necessity determination after full-charging.

6. The power transmission control device as defined in claim 3, the power-transmitting-side control circuit causing the power transmitting device to perform the intermittent temporary power transmission that enables the ID authentication process to the power receiving device when the operation trigger switch provided in a power-transmitting-side instrument has been turned ON when the switch mode has been selected based on the operation mode switch control signal, performing the ID authentication process based on ID authentication information when the ID authentication information has been received from the power receiving device that has received the intermittent temporary power transmission within a given period of time from a start time of the intermittent temporary power transmission, causing the power transmitting device to perform the normal power transmission to the power receiving device when the ID authentication process has been completed successfully, and causing the power transmitting device to stop the temporary power transmission and return to an initial state when the ID authentication information has not been received from the power receiving device within the given period of time from the start time of the temporary power transmission or the ID authentication process has not been completed successfully, the power transmitting device waiting for the operation trigger switch to be turned ON in the initial state without performing the intermittent temporary power transmission.

7. The power transmission control device as defined in claim 6, the power-transmitting-side control circuit causing the power transmitting device to stop the normal power transmission and return to the initial state when a full-charge notification has been received from the power receiving device after the normal power transmission has started.

8. The power transmission control device as defined in claim 1, the power-transmitting-side control circuit determining the presence or absence of a foreign object based on a change of waveform of an induced voltage signal of the primary coil, and causing the power transmitting device to stop the normal power transmission when a foreign object has been detected during the normal power transmission.

9. The power transmission control device as defined in claim 1, the power-transmitting-side control circuit detecting the presence or absence of a takeover state, the takeover state being a state that the power transmitting device continuously performing the normal power transmission while erroneously recognizing a foreign object placed between the primary coil and the secondary coil as the power-receiving-side instrument, and causing the power transmitting device to stop the normal power transmission when the takeover state has been detected during the normal power transmission.

10. The power transmission control device as defined in claim 9, the power-transmitting-side control circuit detecting an intermittent change in a power-receiving-side load, and detecting the presence or absence of the takeover state based on the presence or absence of an intermittent change in the power-receiving-side load during the normal power transmission.

11. A power transmitting device comprising:

the power transmission control device as defined in claim 1; and a power transmitting section that generates an alternating-current voltage and supplies the alternating-current voltage to the primary coil.

12. An electronic instrument comprising:

the power transmitting device as defined in claim 11;

an operation mode switch that generates the operation mode switch control signal; and the operation trigger switch.

13. The electronic instrument as defined in claim 12, the operation mode switch being provided in an area in which a user can operate the operation mode switch.

14. The electronic instrument as defined in claim 12, the operation mode switch being provided in an area in which a user cannot operate the operation mode switch.

15. The electronic instrument as defined in claim 12, further comprising:

a plurality of operation mode switches.

16. A non-contact power transmission system performing non-contact power transmission, the system comprising:
a power transmitting device; and
a power receiving device, the power transmitting device including a power-transmitting-side control device that controls power transmission to the power receiving device based on an induced voltage in a primary coil, the primary coil being electromagnetically coupled to a secondary coil, the power-transmitting-side control device including:
an operation mode switch terminal that receives an operation mode switch control signal, the operation mode switch control signal switching an automatic mode to a switch mode, the power transmitting device set in the automatic mode automatically detecting installation of a power-receiving-side instrument that includes the power receiving device, performing an ID authentication process, and starting normal power transmission, and the power transmitting device set in the switch mode starting power transmission when an operation trigger switch has been turned ON, performing the ID authentication process, and starting the normal power transmission;
an operation trigger terminal that receives an operation trigger signal, the operation trigger signal occurring due to an operation of the operation trigger switch; and
a power-transmitting-side control circuit that controls power transmission to the power receiving device and changes an operation mode of the power transmitting device based on the operation mode switch control signal, the power receiving device including a power supply control section that controls power supply to a load, and a power reception control device that controls the power receiving device, the power-transmitting-side control circuit of the power transmitting device causing the power transmitting device to perform intermittent temporary power transmission when the automatic mode has been selected based on the operation mode switch control signal, and detecting installation of a power-receiving-side instrument that includes the power receiving device depending on whether or not ID authentication information has been received from the power receiving device that has received the intermittent temporary power transmission within a given period of time from a start time of the intermittent temporary power transmission, causing the power transmitting device to perform the normal power transmission to the power receiving device when the installation of the power-receiving-side instrument has been detected on condition that the ID authentication process has been completed successfully, causing the power transmitting device to perform the intermittent temporary power transmission when the ID authentication information has not been received from the power receiving device within the given period of time from the start time of the intermittent temporary power transmission or the ID authentication process has not been completed successfully; and
the power-transmitting-side control circuit causing the power transmitting device to perform the intermittent temporary power transmission that enables the ID authentication process to the power receiving device when a switch provided in a power-transmitting-side instrument has been turned ON when the switch mode has been selected based on the operation mode switch control signal, performing the ID authentication process based on the ID authentication information when the ID authentication information has been received from the power receiving device that has received the intermittent temporary power transmission within a given period of time from a start time of the intermittent temporary power transmission, causing the power transmitting device to perform the normal power transmission to the power receiving device after the ID authentication process has been completed successfully, and causing the power transmitting device to return to an initial state when the ID authentication information has not been received from the power receiving device within the given period of time from the start time of the intermittent temporary power transmission or the ID authentication process has not been completed successfully, the power transmitting device waiting for the switch to be turned ON in the initial state without performing the intermittent temporary power transmission.

17. The non-contact power transmission system as defined in claim 16, when the automatic mode has been selected based on the operation mode switch control signal, the power-transmitting-side control circuit causing the power transmitting device to stop the normal power transmission and perform power transmission for removal detection after full-charging and power transmission for recharge necessity determination after full-charging when the power-transmitting-side control circuit has detected a full-charge notification transmitted from the power receiving device during the normal power transmission, causing the power transmitting device to perform the intermittent temporary power transmission when removal of the power receiving device has been detected based on a signal transmitted from the power receiving device that has received the power transmission for removal detection after full-charging, and causing the power transmitting device to resume the normal power transmission when the power-transmitting-side control circuit has determined that recharging is necessary based on a signal transmitted from the power receiving device that has received the power transmission for recharge necessity determination after full-charging.

* * * * *